US010317007B2

(12) United States Patent
Kludt et al.

(10) Patent No.: US 10,317,007 B2
(45) Date of Patent: *Jun. 11, 2019

(54) SUPPORT ASSEMBLY

(71) Applicant: Daktronics, Inc., Brookings, SD (US)

(72) Inventors: Kory D. Kludt, Sioux Falls, SD (US); Jon Michael Mammenga, Sioux Falls, SD (US); Nathan W. Hart, Sioux Falls, SD (US); Michael A. Hulscher, Sioux Falls, SD (US)

(73) Assignee: Daktronics, Inc., Brookings, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,305

(22) Filed: Dec. 22, 2017

(65) Prior Publication Data
US 2018/0119874 A1    May 3, 2018

Related U.S. Application Data

(63) Continuation of application No. 15/261,482, filed on Sep. 9, 2016, now Pat. No. 9,879,821, which is a
(Continued)

(51) Int. Cl.
*A47B 96/00*    (2006.01)
*A47B 57/54*    (2006.01)
(Continued)

(52) U.S. Cl.
CPC ............ *F16M 13/02* (2013.01); *F16B 2/065* (2013.01); *F16B 2/12* (2013.01); *G09F 9/33* (2013.01);
(Continued)

(58) Field of Classification Search
CPC .... F16B 2/02; F16B 2/12; F16B 2/065; G09F 9/33; A47B 57/54; A47B 57/545;
(Continued)

(56) References Cited

U.S. PATENT DOCUMENTS

| 2,053,547 A | 9/1936 | Austin |
| 2,164,846 A | 7/1939 | Thompson |

(Continued)

FOREIGN PATENT DOCUMENTS

| EP | 1524640 A2 | 4/2005 |
| JP | 8140023 A2 | 5/1996 |

(Continued)

OTHER PUBLICATIONS

U.S. Appl. No. 10/688,304, filed Oct. 17, 2003, Electronic Display Moodule Having a Four-Point Latching System for Incorporation Into an Electronic Sign and Process.

(Continued)

*Primary Examiner* — Tan Le
(74) *Attorney, Agent, or Firm* — Schwegman Lundberg & Woessner, P.A.

(57) ABSTRACT

An electronic sign having slotted frame cabinets, whereby each slotted frame cabinet can conveniently be attached to one or more vertically or horizontally positioned adjacent slotted frame cabinets by using connecting components which are generally located around the periphery of one or more slotted frame cabinets. Connecting components including splice bars, splice plates, and mounting clamps are aligned in, positioned along, and secured to backing bars which are co-located in backing bar slots in one or more of the slotted frame cabinets. Lift eyes can be variably located in one or more lift eye slots. The use of externally located connecting components, which do not extend through the cabinetry, minimize the entry of environmental elements into the interior of the electronic sign. Multiple slotted frame cabinets can be connected without the removal of LED display panels. Bracket assemblies and clamping assemblies are provided.

20 Claims, 47 Drawing Sheets

Related U.S. Application Data continuation of application No. 14/251,101, filed on Apr. 11, 2014, now Pat. No. 9,447,799, which is a continuation of application No. 12/471,233, filed on May 22, 2009, now Pat. No. 8,702,048.

(60) Provisional application No. 61/128,663, filed on May 23, 2008.

(51) Int. Cl.

| | |
|---|---|
| F16M 13/02 | (2006.01) |
| F16B 2/12 | (2006.01) |
| F16B 2/02 | (2006.01) |
| H05K 7/14 | (2006.01) |
| G09F 9/33 | (2006.01) |
| F16B 2/06 | (2006.01) |
| A47B 57/58 | (2006.01) |

(52) U.S. Cl.
CPC .............. A47B 57/54 (2013.01); A47B 57/58 (2013.01); F16B 2/02 (2013.01); Y10T 403/1683 (2015.01); Y10T 403/7067 (2015.01)

(58) Field of Classification Search
CPC ... A47B 57/58; A47B 96/00; Y10T 403/1683; Y10T 403/7067; F16M 13/02
USPC ............ 248/222.14, 223.41, 225.11, 226.11, 248/229.12, 229.22; 361/679.01; 403/374.3
See application file for complete search history.

(56) References Cited

U.S. PATENT DOCUMENTS

| | | | |
|---|---|---|---|
| 3,594,761 A | 7/1971 | Boesen | |
| 3,778,915 A | 12/1973 | Freeman et al. | |
| 3,870,389 A | 3/1975 | Killam | |
| 4,234,914 A | 11/1980 | Boesen | |
| 4,285,379 A | 8/1981 | Kowalski | |
| 4,830,531 A | 5/1989 | Condit et al. | |
| 4,936,565 A | 6/1990 | Fredrickson | |
| 4,964,231 A | 10/1990 | De Maat et al. | |
| 5,154,385 A | 10/1992 | Lindberg et al. | |
| 5,172,504 A | 12/1992 | De Maat et al. | |
| 5,246,194 A | 9/1993 | Garcia | |
| 5,268,828 A | 12/1993 | Miura | |
| 5,271,586 A | 12/1993 | Schmidt | |
| 5,321,417 A | 6/1994 | Voelzke et al. | |
| 5,372,341 A | 12/1994 | Witherbee et al. | |
| 5,409,335 A | 4/1995 | Beck | |
| 5,492,476 A | 2/1996 | Ball et al. | |
| RE35,479 E | 3/1997 | Witherbee et al. | |
| 5,647,152 A | 7/1997 | Miura | |
| 5,692,855 A | 12/1997 | Burton | |
| 5,715,619 A | 2/1998 | Polisois et al. | |
| 5,794,372 A | 8/1998 | Grana | |
| 5,832,646 A | 11/1998 | Albin et al. | |
| 5,975,657 A | 11/1999 | Lacour | |
| 6,050,659 A | 4/2000 | Lacour | |
| 6,076,295 A | 6/2000 | Garfinkle | |
| 6,154,945 A | 12/2000 | Voelzke | |
| 6,161,262 A | 12/2000 | Pfister | |
| 6,169,632 B1 | 1/2001 | Kurtenbach et al. | |
| 6,290,426 B1 | 9/2001 | van Gijsel et al. | |
| 6,314,669 B1 | 11/2001 | Tucker | |
| 6,334,285 B1 | 1/2002 | Kirschner | |
| 6,508,494 B1 | 1/2003 | Reuter et al. | |
| 6,561,117 B1 | 5/2003 | Kell | |
| 6,588,711 B2 | 7/2003 | Onishi | |
| D482,403 S | 11/2003 | Rose | |
| 6,658,776 B1 | 12/2003 | Pynenburg et al. | |
| 6,677,918 B2 | 1/2004 | Yuhara et al. | |
| 6,726,117 B2 | 4/2004 | Herb | |
| 6,729,054 B1 | 5/2004 | VanderTuin | |
| 6,741,222 B1 | 5/2004 | Tucker | |
| 6,751,914 B2 | 6/2004 | Zeh et al. | |
| 6,813,853 B1 | 11/2004 | Tucker | |
| 7,055,271 B2 | 6/2006 | Lutz et al. | |
| 7,091,933 B2 | 8/2006 | McClintock et al. | |
| 7,180,252 B2 | 2/2007 | Lys et al. | |
| 7,226,025 B2 | 6/2007 | Sato et al. | |
| 7,249,624 B2 | 7/2007 | Zeh et al. | |
| 7,373,747 B1 | 5/2008 | Wiemer et al. | |
| 7,401,995 B2 | 7/2008 | Senakiewich, II | |
| 7,510,156 B1 | 3/2009 | Yaeger | |
| 7,537,188 B2 | 5/2009 | Root et al. | |
| 7,594,787 B2 | 9/2009 | Womack et al. | |
| 7,677,182 B2 | 3/2010 | Mueller et al. | |
| 7,694,444 B2 | 4/2010 | Miller et al. | |
| 7,926,213 B1 * | 4/2011 | Kludt ......................... | F16B 2/12 40/605 |
| 8,702,048 B2 | 4/2014 | Kludt et al. | |
| 8,844,180 B2 | 9/2014 | Kludt et al. | |
| 8,899,544 B2 | 12/2014 | Meredith, Jr. | |
| 8,984,818 B2 | 3/2015 | Mcpheeters et al. | |
| 9,447,799 B2 * | 9/2016 | Kludt ......................... | F16B 2/12 |
| 9,879,821 B2 * | 1/2018 | Kludt ......................... | F16B 2/12 |
| 2003/0070368 A1 | 4/2003 | Shingleton | |
| 2003/0182871 A1 | 10/2003 | Gresham et al. | |
| 2003/0217495 A1 | 11/2003 | Nagamine et al. | |
| 2004/0139638 A1 | 7/2004 | Liao | |
| 2006/0226314 A1 | 10/2006 | Dube et al. | |
| 2008/0060234 A1 | 3/2008 | Chou | |
| 2009/0230265 A1 * | 9/2009 | Newman ................. | H02S 20/00 248/229.11 |
| 2009/0289160 A1 | 11/2009 | Kludt et al. | |
| 2010/0192505 A1 | 8/2010 | Schaefer et al. | |
| 2011/0019348 A1 * | 1/2011 | Kludt ......................... | F16B 2/12 361/679.01 |
| 2014/0042286 A1 | 2/2014 | Jaffari | |
| 2014/0306080 A1 | 10/2014 | Kludt et al. | |
| 2015/0016034 A1 | 1/2015 | Kludt et al. | |
| 2016/0377222 A1 | 12/2016 | Kludt et al. | |
| 2017/0034930 A1 | 2/2017 | Kludt et al. | |

FOREIGN PATENT DOCUMENTS

| | | |
|---|---|---|
| JP | 11265153 A2 | 9/1999 |
| JP | 2001350434 A2 | 12/2001 |

OTHER PUBLICATIONS

U.S. Appl. No. 15/292,843, filed Oct. 13, 2016, Electronic Display Mounting System.
U.S. Appl. No. 14/499,150, filed Sep. 27, 2014, Electronic Display Mounting System.
"U.S. Appl. No. 10/688,304, Non-Final Office Action dated Jul. 14, 2005", 5 pgs.
"U.S. Appl. No. 10/688,304, Notice of Allowance dated Jan. 17, 2006", 4 pgs.
"U.S. Appl. No. 10/688,304, Response filed Feb. 28, 2005 to Office Action dated Feb. 18, 2005", 15 pgs.
"U.S. Appl. No. 10/688,304, Response filed Oct. 14, 2005 to Office Action dated Jul. 14, 2005", 14 pgs.
"U.S. Appl. No. 10/688,304, Restriction Requirement dated Feb. 18, 2005", 5 pgs.
"U.S. Appl. No. 11/809,107, Final Office Action dated May 21, 2009", 7 pgs.
"U.S. Appl. No. 11/809,107, Non-Final Office Action dated Nov. 12, 2008", 6 pgs.
"U.S. Appl. No. 11/809,107, Notice of Allowance dated Nov. 27, 2009", 6 pgs.
"U.S. Appl. No. 11/809,107, Response filed Feb. 12, 2009 to Non-Final Office Action dated Nov. 12, 2008", 10 pgs.
"U.S. Appl. No. 11/809,107, Response filed Aug. 21, 2009 to Final Office Action dated May 21, 2009", 12 pgs.
"U.S. Appl. No. 12/077,130 Non Final Office Action dated Dec. 24, 2009", 6 pgs.
"U.S. Appl. No. 12/077,130 Response filed Jun. 23, 2010 to Non Final Office Action dated Dec. 24, 2009", 9 pgs.

(56) References Cited

OTHER PUBLICATIONS

"U.S. Appl. No. 12/077,130, Notice of Allowance dated Dec. 13, 2010", 6 pgs.
"U.S. Appl. No. 12/077,130, Office Action dated Aug. 27, 2010", 6 pgs.
"U.S. Appl. No. 12/077,130, Response filed Sep. 27, 2010 to Notice of Non-Compliant Amendment dated Aug. 27, 2010", 10 pgs.
"U.S. Appl. No. 12/471,233, Response filed Mar. 9, 2012 to Non Final Office Action dated Nov. 3, 2011", 18 pgs.
"U.S. Appl. No. 12/471,233, Response filed Nov. 15, 2013 to Final Office Action dated Jul. 9, 2013", 16 pgs.
"U.S. Appl. No. 12/471,233, Examiner Interview Summary dated May 8, 2013", 3 pgs.
"U.S. Appl. No. 12/471,233, Final Office Action dated May 18, 2012", 13 pgs.
"U.S. Appl. No. 12/471,233, Final Office Action dated Jul. 9, 2013", 8 pgs.
"U.S. Appl. No. 12/471,233, Non Final Office Action dated Feb. 4, 2013", 10 pgs.
"U.S. Appl. No. 12/471,233, Non Final Office Action dated Nov. 3, 2011", 10 pgs.
"U.S. Appl. No. 12/471,233, Notice of Allowance dated Dec. 4, 2013", 10 pgs.
"U.S. Appl. No. 12/471,233, Preliminary Amendment filed Jul. 1, 2010", 9 pgs.
"U.S. Appl. No. 12/471,233, Response filed May 6, 2013 to Non Final Office Action dated Feb. 4, 2013", 16 pgs.
"U.S. Appl. No. 12/471,233, Response filed Sep. 26, 2012 to Final Office Action dated May 18, 2012", 15 pgs.
"U.S. Appl. No. 12/471,233, Response filed Sep. 12, 2011 to Restriction Requirement dated Aug. 17, 2011", 9 pgs.
"U.S. Appl. No. 12/471,233, Restriction Requirement dated Aug. 17, 2011", 8 pgs.
"U.S. Appl. No. 12/896,000, Response filed Nov. 1, 2011 to Non Final Office Action dated Oct. 7, 2011", 14 pgs.
"U.S. Appl. No. 12/896,000, Examiner Interview Summary dated Feb. 1, 2013", 3 pgs.
"U.S. Appl. No. 12/896,000, Final Office Action dated Feb. 13, 2012", 8 pgs.
"U.S. Appl. No. 12/896,000, Non Final Office Action dated Sep. 14, 2012", 8 pgs.
"U.S. Appl. No. 12/896,000, Non Final Office Action dated Oct. 7, 2011", 9 pgs.
"U.S. Appl. No. 12/896,000, Notice of Allowance dated May 27, 2014", 5 pgs.
"U.S. Appl. No. 12/896,000, Response filed Jan. 14, 2013 to Non final Office Action dated—Sep. 14, 2012", 14 pgs.
"U.S. Appl. No. 12/896,000, Response filed May 8, 2012 to Final Office Action dated Feb. 13, 2012", 12 pgs.
"U.S. Appl. No. 14/251,101, Advisory Action dated May 4, 16", 5 pgs.
"U.S. Appl. No. 14/251,101, Examiner Interview Summary dated Jan. 29, 2016", 3 pgs.
"U.S. Appl. No. 14/251,101, Final Office Action dated Dec. 11, 2015", 12 pgs.
"U.S. Appl. No. 14/251,101, Non Final Office Action dated Mar. 17, 2015", 9 pgs.
"U.S. Appl. No. 14/251,101, Non Final Office Action dated Jun. 3, 2016", 6 pgs.
"U.S. Appl. No. 14/251,101, Notice of Allowance dated Aug. 10, 2016", 8 pgs.
"U.S. Appl. No. 14/251,101, Preliminary Amendment filed Sep. 15, 2014", 7 pgs.
"U.S. Appl. No. 14/251,101, Response filed Jan. 20, 2015 to Restriction Requirement dated Jan. 5, 2015", 8 pgs.
"U.S. Appl. No. 14/251,101, Response filed Mar. 11, 2016 to Final Office Action dated Dec. 11, 2015", 18 pgs.
"U.S. Appl. No. 14/251,101, Response filed Jul. 1, 2016 to Non Final Office Action dated Jun. 3, 2016", 9 pgs.
"U.S. Appl. No. 14/251,101, Response filed Sep. 16, 2015 to Non Final Office Action dated Mar. 17, 2015", 17 pgs.
"U.S. Appl. No. 14/251,101, Restriction Requirement dated Jan. 5, 2015", 6 pgs.
"U.S. Appl. No. 14/499,150, Non Final Office Action dated Apr. 13, 2016", 14 pgs.
"U.S. Appl. No. 14/499,150, Preliminary Amendment filed Sep. 29, 2014", 7 pgs.
"U.S. Appl. No. 15/261,482, Final Office Action dated May 1, 2017", 10 pgs.
"U.S. Appl. No. 15/261,482, Non Final Office Action dated Oct. 6, 2016", 8 pgs.
"U.S. Appl. No. 15/261,482, Notice of Allowance dated Sep. 22, 2017", 9 pgs.
"U.S. Appl. No. 15/261,482, Response filed Aug. 1, 2017 to Final Office Action dated May 1, 2017", 13 pgs.
"U.S. Appl. No. 15/261,482, Response filed Jan. 6, 2017 to Non Final Office Action dated Oct. 6, 2016", 8 pgs.
"U.S. Appl. No. 15/292,843, Final Office Action dated Aug. 7, 2017", 10 pgs.
"U.S. Appl. No. 15/292,843, Non Final Office Action dated Feb. 21, 2018", 7 pgs.
"U.S. Appl. No. 15/292,843, Response filed Jun. 21, 2018 to Non Final Office Action dated Feb. 21, 2018", 7 pgs.
"U.S. Appl. No. 15/292,843, Response filed Nov. 7, 2017 to Final Office Action dated Aug. 7, 2017", 8 pgs.
"European Application Serial No. 08165444.4, European Search Report dated Mar. 4, 2009", 9 pgs.
"European Application Serial No. 08165444.4, Response filed Sep. 4, 2009", 27 pgs.
"Europeean Application Serial No. 04256340.3, European Search Report dated Nov. 6, 2006", 3 pgs.
"U.S. Appl. No. 15/292,842, Notice of Allowance dated Sep. 26, 2018", 5 pgs.

* cited by examiner

SUPPORT ASSEMBLY

CLAIM OF PRIORITY

This application is a continuation of and claims the benefit of priority to U.S. application Ser. No. 15/261,482, filed Sep. 9, 2016, entitled, "SUPPORT ASSEMBLY," which is a continuation of and claims the benefit of priority to U.S. application Ser. No. 14/251,1101, filed Apr. 11, 2014, entitled "SUPPORT ASSEMBLY," now issued as U.S. Pat. No. 9,447,799, which is a continuation of and claims the benefit of priority to U.S. application Ser. No. 12/471,233, filed May 22, 2009, entitled "SUPPORT ASSEMBLY," now issued as U.S. Pat. No. 8,702,048, which claims the benefit of priority to U.S. Provisional Application Ser. No. 61/128,663 filed on May 23, 2008, entitled "UNIVERSAL MOUNT," the specifications of which are herein incorporated by reference in their entirety.

CROSS REFERENCES TO RELATED APPLICATIONS

This patent application is related to U.S. patent application Ser. No. 12/077,130 filed Mar. 17, 2008, entitled "ELECTRONIC SIGN HAVING SLOTTED FRAME CABINETS," now U.S. Pat. No. 7,926,213.

This patent application is also related to U.S. patent application Ser. No. 11/809,107 filed May 31, 2007, entitled "ELECTRONIC SIGN HAVING A FORMED METAL CABINET," now U.S. Pat. No. 7,694,444.

This patent application is also related to U.S. patent application Ser. No. 10/688,304 filed Oct. 17, 2003, entitled "ELECTRONIC DISPLAY MODULE HAVING A FOUR-POINT LATCHING SYSTEM FOR INCORPORATION INTO AN ELECTRONIC SIGN AND PROCESS," now U.S. Pat. No. 7,055,271.

TECHNICAL FIELD

The present invention is for an electronic sign, and more particularly, for a support assembly usable with an electronic sign.

BACKGROUND

The invention is to be used as a replacement for current technology sign structures which are very labor intensive and which require welding, individual component fitting, drilling, and the like. Welding is very time-consuming and is a hard process to control with respect to uniformity and trueness of surfaces. Welding also reduces the strength characteristics of aluminum structures used therein and thereabout. The new invention uses structural rivets for cabinet component attachment, thus eliminating the need for welding. Joining of components such as, but not limited to, formed channels to the slotted frames of the slotted frame cabinet is accomplished by the use of prepunched and preformed components and rivets. The use of structural prepunched and preformed components with rivets allows for the automation of the entire process of fabrication. The prepunched holes used for the accommodation of rivets self-align the component parts, thus substantially reducing manufacturing labor.

The new invention eliminates the need for nutserts and other traditional fastening schemes used for splicing and joining adjacent slotted frame cabinets and eliminates the need for attaching clip angle supports to the rear of an electronic sign cabinet. It does this by having substantially continuous slotted frame cabinets which can accept external splicing and connection structures such as mounting clamps, splice plates, backing bars, and the like, which can conveniently splice, align and secure adjacent slotted frame cabinets together in vertical or horizontal relationships.

Previous devices relied on installing nutserts for splicing and attaching clip angles to the rear of a cabinet for mounting and/or installation purposes, each of which requires extra assembly steps and, when installed, do not have variable placement. The use of continuous horizontally aligned backing bar slots eliminates the requirement for the use of horizontal stringers on the rear of a sign structure which were used for mounting to various support structures.

Many previous devices fail to accommodate unequally spaced vertically aligned ground mounted support structure. The invention provides a solution for such variable positioning of ground mounted support structure by providing slot mounted positionable mounting clamps aligned at variable spacings in slots along the entire horizontal length of one or more joined slotted frame cabinets to accommodate variably spaced ground based support structures such as, but not limited to, vertically aligned I-beam supports.

Previous designs have been such that lift eyes penetrate the cabinet interior and are placed at predetermined points in the cabinet frame. The disadvantage of such a system is that it is labor intensive to attach the lift eyes. Furthermore, such through the cabinet structure mounting allows entry points for the elements. This present invention allows for flexibility in the lift eye location by allowing the lift eye to translate anywhere along a lift eye slot in the length of one or more of the cabinet sections. The lift structure does not communicate with the interior of the cabinet sections.

This invention also provides for a watertight assembly because the cabinet interior is not penetrated by the use of fasteners, such as used in previous devices. The slotted frame cabinet interior is not penetrated during factory or on-site installation since cabinet sections are spliced externally by components which align to or within externally located slots located along and about the cabinet frame.

Previous devices in the field required the removal of electronic display modules in order to splice cabinet sections, as splicing of one cabinet section to another required internal access to mounting hardware, connector plates, and the like. The present invention allows external connective splicing of vertically or horizontally adjacent cabinet sections without accessing the interior of a slotted frame cabinet.

Overview

The general purpose of the present invention is to provide an electronic sign having slotted frame cabinets. According to one or more embodiments of the present invention, there is provided an electronic sign comprised partly of slotted frame cabinets where the use of two or more slotted frame cabinets provides for a full complement of connective components, such as described herein. In the alternative, an individual slotted frame cabinet can be utilized to provide for a unitary electronic sign. Slotted frame cabinets which are central to the invention are constructed and joined together by using a plurality of similar profile geometrically configured components including a frame top, a frame bottom and frame ends, each of which has a plurality of external accessible slots extending along the length thereof. A plurality of formed vertically aligned channels and formed mid-channels are secured between the frame top and the frame bottom of each slotted frame cabinet which serve, in part, as a mounting structure for a front mounted panel, the latter of which accommodates a plurality of electronic display modules. The preformed vertically aligned channels also serve, in part, as a mounting structure for rear panels. A shroud surrounds the perimeter of the joined slotted frame cabinets.

The slotted frame cabinets are joined by unique components and methods. Horizontally adjacent and aligned slotted frame cabinets are joined by the use of one or more geometrically configured splice bars in vertical orientation which align in and between opposed like slots in the frame ends of adjacent horizontally slotted frame cabinets and, in cooperation therewith, are also joined by splice plates secured to opposed vertically aligned backing bars in opposed like backing bar slots in the frame ends of the adjacent slotted frame cabinets. Installation of the splice plates provides for self-alignment of the frame ends of horizontally adjacent slotted frame cabinets.

Vertically adjacent and aligned slotted frame cabinets are joined by the use of one or more geometrically configured splice bars in a horizontal orientation which is or are aligned in and between opposed like slots in the frame top and frame bottom of vertically adjacent slotted frame cabinets and, in cooperation therewith, are also joined by mounting clamps serving, in part, like splice plates secured to opposed horizontally aligned backing bars. Installation of the mounting clamps provides for self-alignment of the frame tops and bottoms of vertically adjacent slotted frame cabinets. The mounting clamps are also used to secure joined combinations of slotted frame cabinets; i.e., the electronic sign having slotted frame cabinets, to ground mounted support structure. The mounting clamps are horizontally positionable along the sign in order to collect to unequally spaced support structure. A lift eye slot is also included along the frame top to slidingly accommodate one or more lift eyes. Alternative embodiments include a multipurpose bracket assembly and various forms of clamping devices which are provided for use between the joined combinations of slotted frame cabinets; i.e., the electronic sign having slotted frame cabinets and ground mounted or suspended support structure. The forwardly located structure of the multipurpose bracket assembly adjustably secures to backing bar slots of one or more slotted frame cabinets by the use of position able horizontally aligned backing bars. The rearwardly located structure of the multipurpose interface includes a configured backing bar slot which is useful in the accommodation of the various configured clamping devices which can secure to vertically or horizontally oriented external ground mounted or suspended support structures.

One significant aspect and feature of the electronic sign having slotted frame cabinets of the present invention is the use of multiple slots along and about the perimeter to which a plurality of connection devices or other devices can be attached, captured and secured.

Still another significant aspect and feature of the present invention is the use of common geometry slotted frame components including a slotted frame top, a slotted frame bottom, and slotted frame ends which form connected inner panels where the slotted frame top and the slotted frame bottom serve as mounts for vertically aligned formed channels including formed mid-channels. The perimeter of the slotted frame components and the formed vertically aligned channels are not welded but are riveted in prepunched holes in order to automate the fabrication process and to improve reliability, manufacturability, tolerances, repeatability, and efficiency of assembly.

Another significant aspect and feature of the present invention is the use of adjacent perimeter splice bar slots in common with an interceding geometrically configured splice bar to align within and therebetween such slots to, in part, mutually secure the forward region of horizontally adjacent and aligned slotted frames ends or the forward region of vertically adjacent and aligned slotted frame tops and bottoms.

Another significant aspect and feature of the present invention is the use of backing bars residing in backing bar slots and used with splice plates to, in part, join the rearward portion of horizontally adjacent and aligned slotted frame cabinets.

Another significant aspect and feature of the present invention is the use of splice plates to align the fronts, rears and splice bar slots of the horizontally adjacent slotted frame cabinets.

Another significant aspect and feature of the present invention is the use of backing bars residing in backing bar slots and used with mounting clamps to join the rearward portion of vertically adjacent and aligned slotted frame cabinets.

Another significant aspect and feature of the present invention is the use of mounting clamps to align the fronts, rears and splice bar slots of the vertically adjacent slotted frame cabinets.

Another significant aspect and feature of the present invention is the use of backing bar mounting clamps and associated backing bare(s), the latter of which are horizontally positionable along backing bar slots along the horizontal length in order to align with variably spaced vertically aligned support structures such as, but not limited to, I-beams.

Yet another significant aspect and feature of the present invention is the use of a multipurpose bracket assembly and associated styles of clamping devices as an interface to attach the joined combinations of slotted frame cabinets forming an electronic sign to ground mounted or suspended support structures.

Yet another significant aspect and feature of the present invention is the use of clamping devices in use with associated styles of multipurpose bracket assemblies which can attach to support structures having different flange widths and thickness.

Another significant aspect and feature of the present invention is the use of multipurpose bracket assemblies having forwardly located structure which secures to backing bar slots of one or more slotted frame cabinets by the use of positionable horizontally aligned backing bars.

Another significant aspect and feature of the present invention is the use of multipurpose bracket assembly having a rearwardly located configured slot which can accommodate various configured clamping devices which can secure to vertically or horizontally oriented external ground mounted or suspended support structures.

Another significant aspect and feature of the present invention is the use of a clamping device in the form of rocker clamps in close association with a rearwardly located configured slot of one or more multipurpose bracket assemblies in order to provide for attachment to one or more I-beams or other suitably configured supports.

Another significant aspect and feature of the present invention is the use of one or more multipurpose bracket assemblies with one or more elongated multipurpose bracket assemblies in order to provide for greater spacing between the slotted frame cabinets of an electronic sign and one or more I-beams or other suitably configured supports.

Another significant aspect and feature of the present invention is the use of one or more clamping devices in the form of a multiple point clamping mechanisms in use with rearwardly located configured slots of one or more multipurpose bracket assemblies in order to provide for attachment to one or more I-beams or other suitably configured supports.

Another significant aspect and feature of the present invention is the use of a one or more clamping devices in the form of an extension fixture in use with one or more multipurpose bracket assemblies in order to provide for attachment to an other suitably configured support such as, but not limited to, a horizontally oriented support structure.

Another significant aspect and feature of the present invention is that the lift eyes can be situated at an appropriate location in one or more lift eye slots along the length of the slotted frame top of one or more horizontally adjacent slotted frame cabinets to evenly distribute the weight during installation and during display.

Another significant aspect and feature of the present invention is that any connection points, splice plates, splice bars, mounting clamps, lift eyes, and the like are external to the slotted frame cabinet structure and, as such, there is no structural penetration by water and other unwanted fluid or debris.

Another significant aspect and feature of the present invention is the ability to join vertically or horizontally adjacent slotted frame cabinets without the removal of display modules.

Having thus briefly described one or more embodiments of the present invention and having mentioned some significant aspects and features of the present invention, it is the principal object of the present invention to provide an electronic sign having slotted frame cabinets.

These and other examples, advantages, and features of the present support assembly and methods will be set forth in part in following Detailed Description. This introduction is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, like numerals can be used to describe similar components throughout the several views. Like numerals having different letter suffixes can be used to represent different instances of similar components. The drawings illustrate generally, by way of example, but not by way of limitation, various examples discussed in the present document.

DETAILED DESCRIPTION

Figure 1:
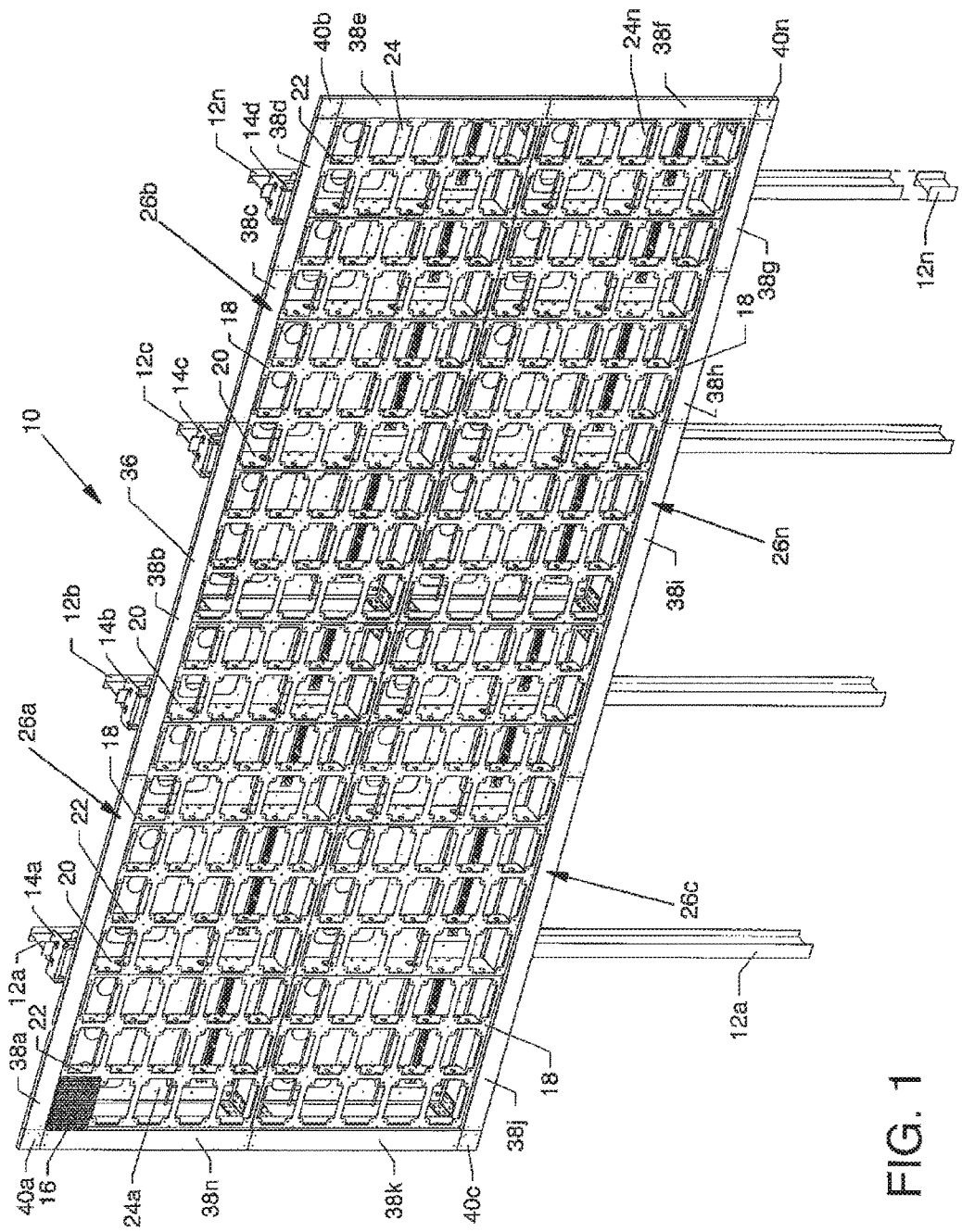
FIG. 1 is an isometric front view of an electronic sign having slotted frame cabinets, the present invention, mounted to a plurality of support structures.
Figure 2:
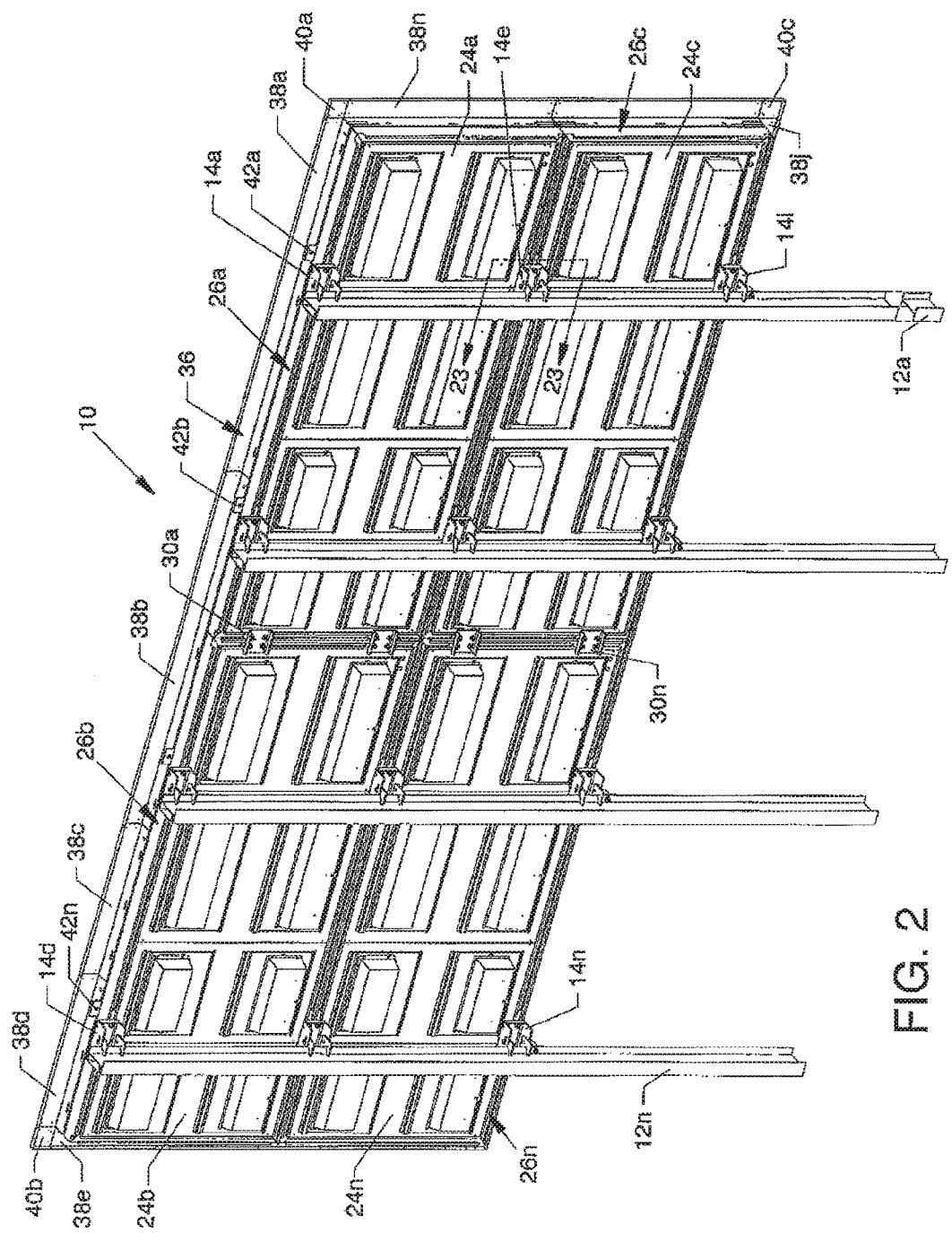
FIG. 2 is an isometric rear view of the electronic sign having slotted frame cabinets of FIG. 1 mounted to a plurality of support structures.

FIG. 1 is an isometric front view of an electronic sign having slotted frame cabinets 10, the present invention, mounted to a plurality of support structures 12a-12n by a plurality of like mounting clamps 14a-14n being part of and located along and about the rear of the invention, as also shown in FIG. 2. One of a plurality of like electronic display modules 16 (also known as LED modules) having a four-point latching system populate the front of the present invention and are removably attached to a plurality of mounting panels 18 extending along and about the front of the invention. The structure and relationship of the mounting panels 18 and the electronic display modules 16 are described in U.S. Pat. No. 7,055,271 entitled "Electronic Display Module Having a Four-Point Latching System for Incorporation into an Electronic Sign and Process" and is incorporated herein in its entirety.

Also visible is a plurality of vertically aligned formed channels 20 of full width and a plurality of vertically aligned formed mid-channels 22 of reduced width secured along and about the invention, as later described in detail. The front surfaces of the formed channels 20 and the formed mid-channels 22 serve as a mount for the mounting panel 18 and the rear surfaces of the formed channels 20 serve as a mount for a plurality of rear vent panels 24a-24n, as also shown in FIG. 2.

Figure 3:
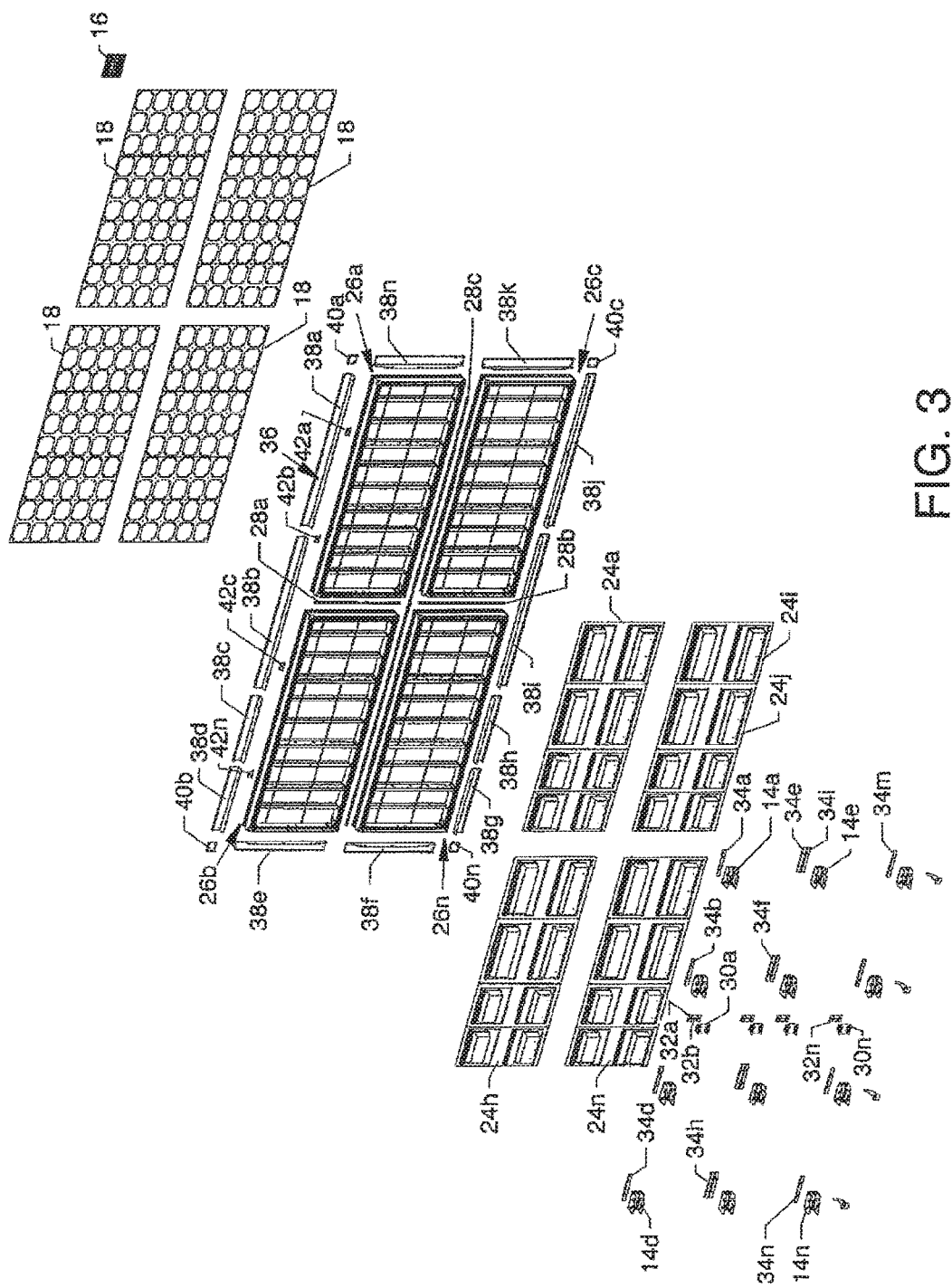
FIG. 3 is an exploded rear view of the invention components of FIG. 2.
Figure 4:
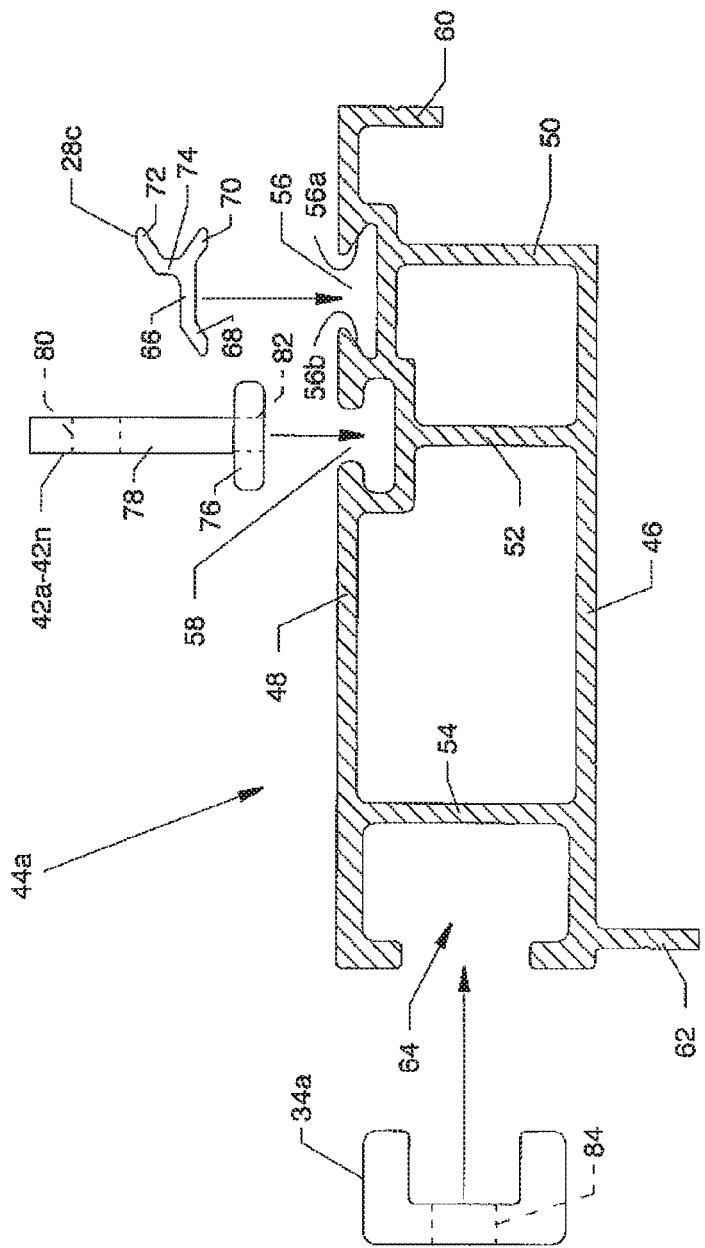
FIG. 4 is a cross section view of a horizontally oriented slotted frame top along line 4-4 of FIG. 5.

FIG. 2 is an isometric rear view of the electronic sign having slotted frame cabinets 10 of FIG. 1; and FIG. 3 is an exploded rear view of the invention components of FIG. 2. With reference to FIGS. 1, 2 and 3, the present invention is further described. Similarly constructed slotted frame cabinets 26 are central to the invention and can be designated as a plurality of slotted frame cabinets 26a-26n or, alternatively, as a slotted frame cabinet 26 as the construction is the same. The slotted frame cabinets 26a-26n can be arranged as shown in FIG. 3 and are connected by other components of the invention. One such connecting component is in the form of similarly shaped geometrically configured splice bars 28a, 28b and 28c, each having an elongated Y-shaped profile including similarly numbered features as shown in FIG. 4. Splice bars 28a and 28b are shown in vertical orientation and can be used, in part, to connect the adjacent frame ends of horizontally adjacent slotted frame cabinets 26a and 26b and, of course, the adjacent frame ends of horizontally adjacent slotted frame cabinets 26c and 26n, respectively, as later described in detail. Splice bar 28c, shown in horizontal orientation, can by itself, or if divided in halves, be used, in part, to connect the slotted frame bottom of cabinet 26a to the slotted frame top of the vertically adjacent cabinet 26c and, in part, to connect the slotted frame bottom of cabinet 26b to the slotted frame top of the vertically adjacent cabinet 26n, respectively, as later described in detail.

Other connection components are in the form of a plurality of splice plates 30a-30n in cooperation with a plurality of vertically oriented backing bars 32a-32n which, in part, are used to connect the adjacent frame ends of horizontally adjacent slotted frame cabinets 26a and 26b and, of course, the adjacent frame ends of horizontally adjacent slotted frame cabinets 26c and 26n. Other connection components are in the form of the plurality of mounting clamps 14a-14n used in cooperation with a plurality of horizontally oriented backing bars 34a-34n. Some of the mounting clamps 14a-14n and backing bars 34a-34n are used, in part, to connect vertically adjacent frame bottoms and frame tops of vertically adjacent slotted frame cabinet pair 26a-26c and pair 26b-26n. Some of the mounting clamps 14a-14n and backing bars 34a-34n are used to connect the frame tops of the slotted frame cabinets 26a and 26b to some of the support structures 12a-12n and some of the mounting clamps 14a-14n and backing bars 32a-32n are used to connect frame bottoms of the slotted frame cabinets 26c and 26n to some of the support structures 12a-12n. All of the mounting clamps 14a-14n and associated backing bars 34a-34n are used to connect the slotted frame cabinets 26a-26n to all of the support structures 12a-12n, respectively.

A multiple component shroud 36 surrounds the perimeter of the joined slotted frame cabinets 26a-26n. The shroud 36 is comprised of a plurality of elongated L-shaped shroud panels 38a-38n secured about the perimeter of the slotted frame cabinets 26a-26n and a plurality of shroud corners 40a-40n secured to some of the ends of the shroud panels 38a-38n. A plurality of positionable lift eyes 42a-42n are located along the top of the slotted frame cabinets 26a-26b, as described later in detail.

Each of the slotted frame cabinets 26a-26n uses a plurality of like structure slotted top, bottom and end components in the form of configured box tubes to form such slotted frame cabinets. FIG. 4 is a cross section view of a horizontally oriented slotted frame top 44a along line 4-4 of FIG. 5. A variety of panels and slots comprises the described cross section shown in FIG. 4. An inner panel 46 opposes an outer panel 48, which panels are mutually connected by a front panel 50, a mid-panel 52, and a back panel 54. The outer panel 48 includes an outwardly located splice bar slot 56 and an adjacent inwardly located lift eye slot 58. The splice bar slot 56 includes angled slot walls 56a and 56b. A forwardly located front mounting panel 60 extends perpendicularly from one end of the outer panel 48 and inwardly toward the center of the slotted frame cabinet 26. A rear mounting panel 62 extends perpendicularly from one end of the inner panel 46 and inwardly toward the center of the slotted frame cabinet 26. A rearwardly located backing bar slot 64 is located between the rear portions of the outer panel 48 and the inner panel 46. The cross section of a vertically oriented slotted frame end 44b, the cross section of a vertically oriented slotted frame end 44c, and the cross section of a vertically oriented slotted frame bottom 44d are substantially the same where each has a different orientation. All or some of the features described can be utilized for accommodating closely associated components, as described later in detail.

FIG. 4 also shows an end view of components which can be accommodated directly by the slots of the slotted frame top 44a. The same accommodating relationships also exist with the slotted frame end 44b, the slotted frame end 44c, and the slotted frame bottom 44d, as applicable. The splice bar 28c, which is shown in a horizontal orientation, has a plurality of panels extending at angles from a central panel 66, including opposed panels 68 and 70 extending from the central panel 66, and another panel 72 offset from the central panel 66 by a short panel 74. The opposed panels 68 and 70 of the splice bar 28c are aligned with and mutually secured within the angled slot walls 56b and 56a, respectively, of the splice bar slot 56. Interaction of the splice bar 28c and other splice bars with splice bar slots 56 is described later in detail. Splice bars 28a and 28b have the same profile but are used in vertical orientation. An end view of the lift eyes 42a-42n, each having a horizontally orientated base panel 76, a connected vertically oriented panel 78, and a hole 80 extending through the panel 78, is also shown. The base panels 76 of each of the lift eyes 42a-42n are slidingly accommodated by the lift eye slot(s) 58 of the slotted frame tops 44a. Threaded holes 82, one of which is shown, are included at opposing ends of the base panel 76 for the use of bolts (not shown) which can extend therethrough to contact the bottom of the lift eye slot 58 to provide a frictional engagement arrangement of the lift eyes 42a-42n in the lift eye slot 58. The backing bar 34a in the form of a channel is also shown which includes holes 84 extending therethrough. Backing bars 34a-34n are slidingly accommodated by backing bar slots 64 in each of the slotted frame tops 44a and slotted frame bottoms 44d. Backing bars 32a-32n, having the same cross section and shape as backing bars 34a-34n, are slidingly accommodated in some of the backing bars slots 64 of the slotted frame ends 44b and 44c.

Figure 5:
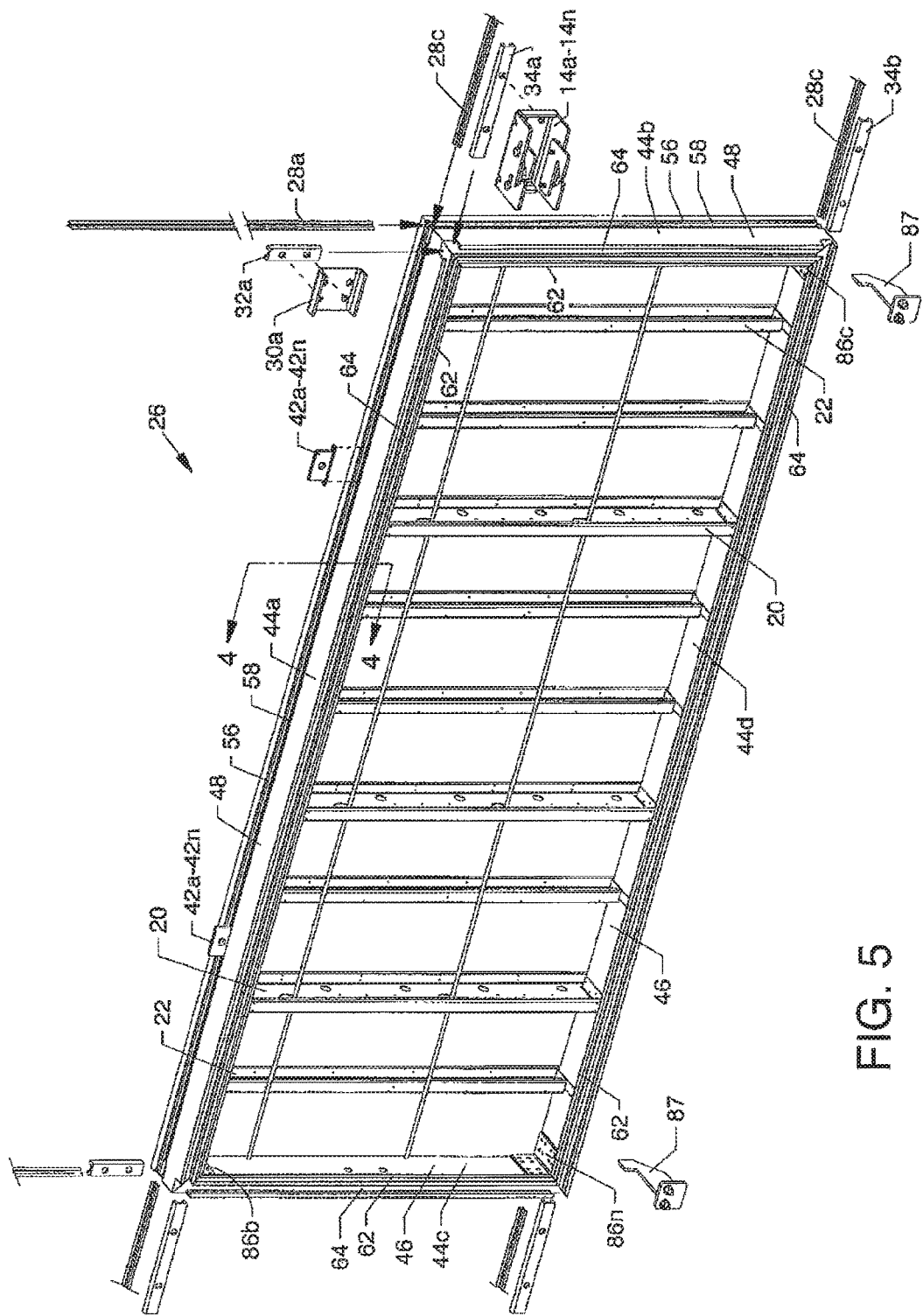
FIG. 5 is an isometric view of a single slotted frame cabinet and some associated components.

FIG. 5 is an isometric view of a single slotted frame cabinet 26 and some associated components, which view represents any one of the slotted frame cabinets 26a-26n. The ends of each of the slotted frame top 44a, the slotted frame ends 44b and 44c, and the slotted frame bottom 44d are miter cut and are suitably joined by right angle brackets 86a-86n connecting the inner panels 46. The inner panel 46 of the slotted frame top 44a and the opposed inner panel 46 of the slotted frame bottom 44d serve as mounts for the opposing ends of the preformed vertically oriented formed channels 20 and formed mid-channels 22, as described with reference to patent application Ser. No. 11/809,107 filed May 31, 2007, entitled "Electronic Sign Having a Formed Metal Cabinet."

Preferably, the general relationship and uses of several previously described components to a slotted frame cabinet 26, but not necessarily to any of the specific slotted frame cabinets 26a-26n, is demonstrated with certain exceptions below. For example:

1. As previously described, the lift eyes 42a-42n can align in the lift eye slots 58 when the slotted frame cabinet 26 is used as the slotted top frame cabinet 26a or 26b.

2. The splice bar slot 56 in the slotted frame top 44a and the splice bar slot 56 in the slotted frame bottom 44d can accommodate a splice bar 28c. However, the preferred mode of assembly is the use of a splice bar 28c to join the slotted frame top 44a of the lower slotted frame cabinets, such as horizontally adjacent slotted frame cabinets 26c and 26n, to the slotted frame bottoms 44d of the upper slotted frame cabinets, such as horizontally adjacent slotted frame cabinets 26a and 26b.

3. The splice bar slot 56 in the slotted frame end 44b and the splice bar slot 56 in the slotted frame end 44c can accommodate splice bars 28a or 28b. However, the preferred mode of assembly is the use splice bars 28a and 28b to join the slotted frame end 44c of the slotted frame cabinets, such as vertically adjacent slotted frame cabinets 26a and 26c to the slotted frame ends 44b of the slotted frame cabinets, such as vertically adjacent slotted frame cabinets 26b and 26n.

4. The backing bar slots 64 in the slotted frame top 44a and the backing bar slots 64 in the slotted frame bottom 44d can accommodate backing bars 34a-34n.

5. The backing bar slots 64 in the slotted frame ends 44b and 44c can accommodate backing bars 32a-32n.

6. The splice plates 30a-30n utilize pairs of backing bars 32a-32n for attachment to some of the backing bar slots 64, as described later in detail.

7. Individual mounting clamps 14a-14n utilize one or more backing bars 34a-34n for attachment to some of the backing bar slots 64, as described later in detail.

Support brackets 87 which can be secured at appropriate locations along the support structures 12a-12n are also shown. The support brackets 87 can be used as a support during installation of the electronic sign having slotted frame cabinets 10 on the support structures 12a-12n to provide either temporary or permanent support.

Figure 6:
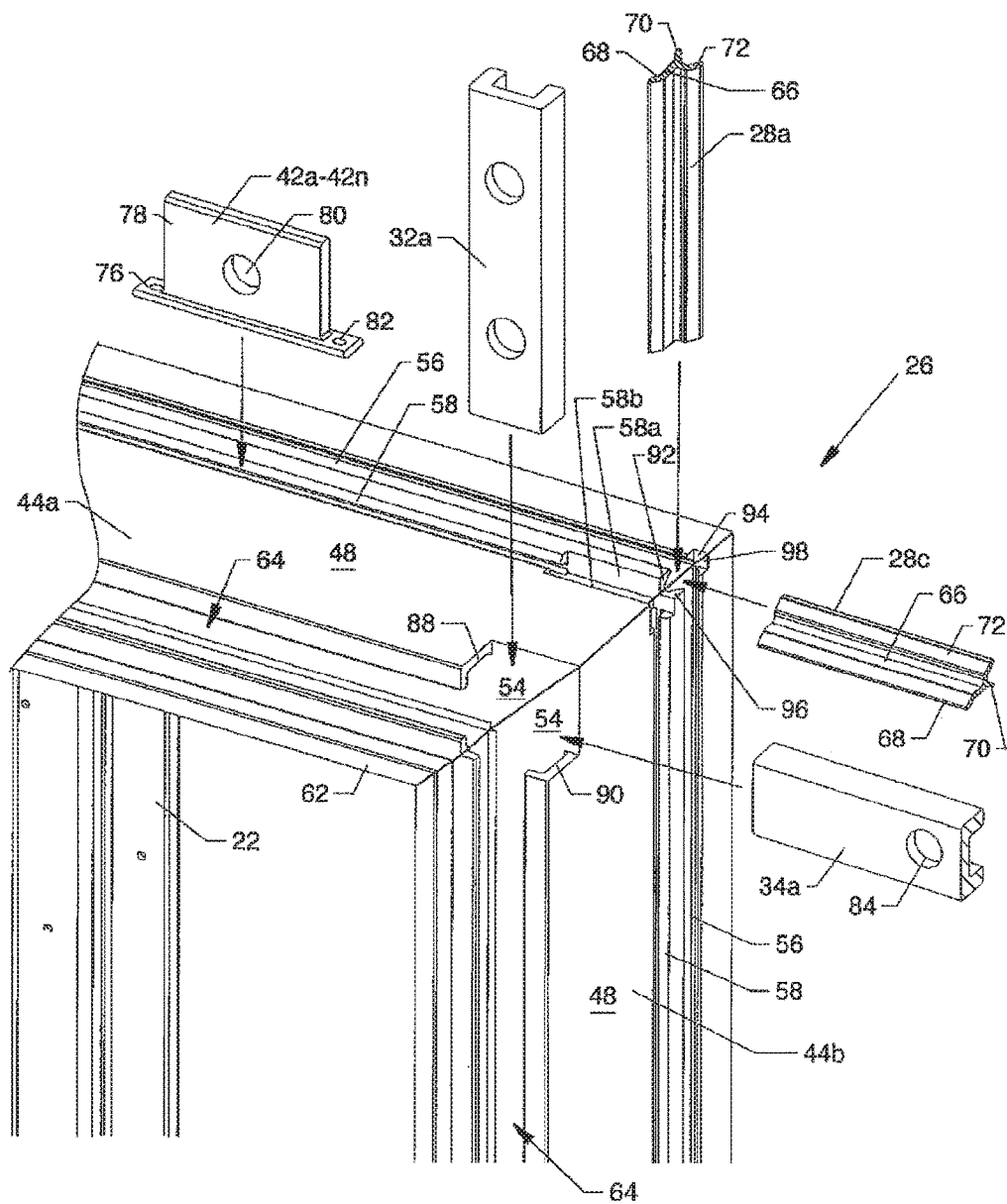
FIG. 6 is a rear view of a corner of the slotted frame cabinet of FIG. 5 showing the relationship of several splice bars, backing bars, and lift eyes thereto.

FIG. 6 is a rear view of a corner of the slotted frame cabinet 26 of FIG. 5 showing the relationship of several splice bars 28a, 28c, backing bars 34a and 32a, and lift eyes 42a-42n thereto. A cutout 88 is provided at the corner of the outer panel 48 in the slotted frame top 44a in order that the vertically oriented backing bar 32a can be inserted into the backing bar slot 64 of the slotted frame end 44b of the representative slotted frame cabinet 26. Another cutout similar to cutout 88 (not shown) is located at the opposite end of the outer panel 48 of the slotted frame top 44a for accommodating another of the vertically oriented backing bars 32a-32n. Cutouts similar to cutout 88 are not provided at the bottom ends of the slotted frame ends 46b and 46c in order that backing bars 32a-32n will not fall out of the backing bar slots 64 during assembly.

A cutout 90 is provided at the top corner of the outer panel 48 in the slotted frame end 44b and another cutout similar to 90 (not shown) is located at the bottom corner in the slotted frame end 44b in order that the horizontally oriented backing bars 34a-34n can be inserted into the backing bar slot 64 of the slotted frame top 44a of the representative slotted frame cabinet 26 and into the backing bar slot 64 of the slotted frame bottom 44d of the representative slotted frame cabinet 26. The slotted frame end 44c is a mirror image of the slotted frame end 44b and is constructed and used in the same fashion as the slotted frame bottom 44d.

Figure 7:
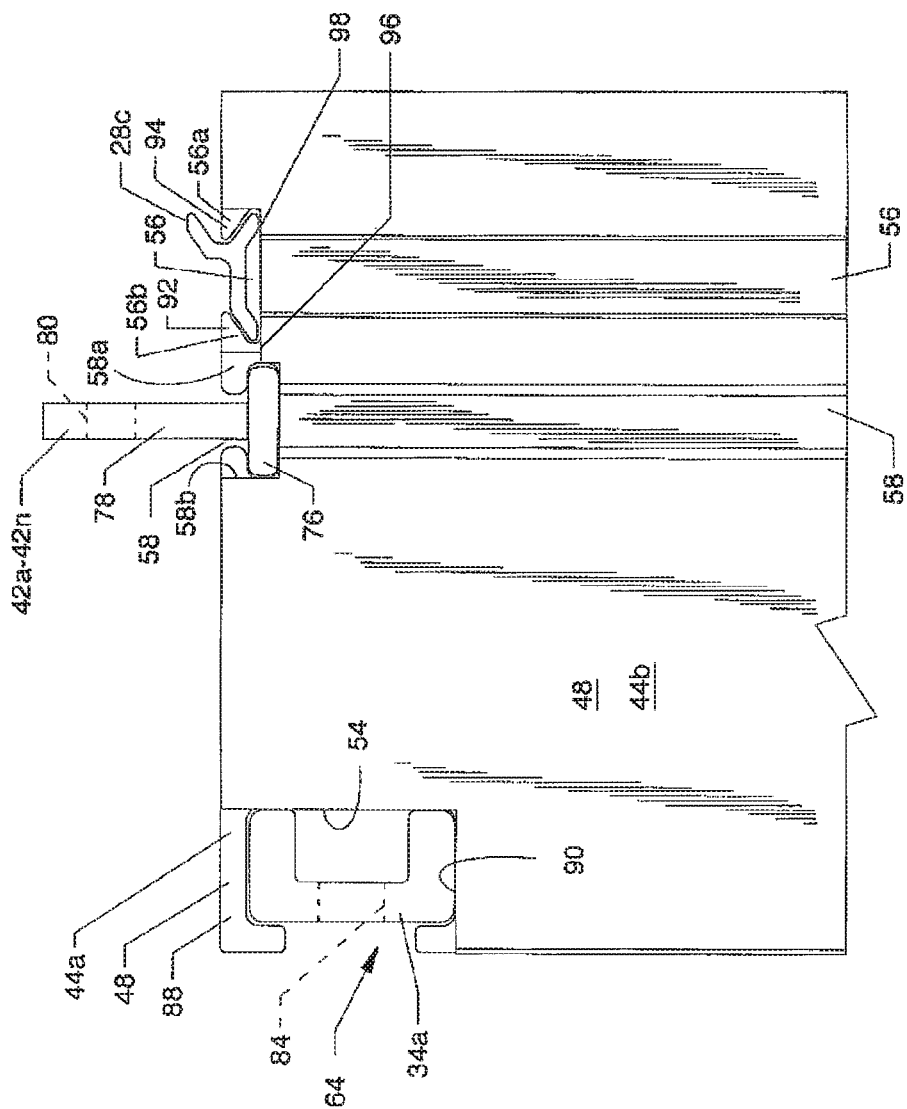
FIG. 7 is an end view of the top left corner of the slotted frame cabinet shown in FIG. 6 where horizontally aligned components are shown aligned within their respective slots.

Referring to FIGS. 6 and 7, cutouts 92 and 94 are shown at the end of the splice bar slot 56 of the slotted frame top 44a in order that the vertically oriented splice bar 28a can be inserted into the splice bar slot 56 of the slotted frame end 44b of the representative slotted frame cabinet 26. Similarly configured cutouts are located at the opposite end of the splice bar slot 56 of the slotted frame top 44a. Cutouts 96 and 98 are included at the top end of the splice bar slot 56 of the slotted frame end 44b (and cutouts similar to cutouts 96 and 98 are located at the top end of the splice bar slot 56 of the slotted frame end 44c) in order that horizontally oriented splice bars 28c can be inserted into the splice bar slot 56 of the slotted frame top 44a of the representative slotted frame cabinet 26. A widening of the lift eye slot 58 is shown at 58a and 58b (FIG. 7) for addition of lift eyes 42a-42n, as desired. Like and similar teachings, relationships, configurations, and components are included along and about the present invention as described or illustrated.

FIG. 7 is an end view of the top left corner of the slotted frame cabinet 26 shown in FIG. 6 where horizontally aligned components are shown aligned within their respective slots.

FIGS. 8-14 illustrate additional structure associated with the invention and the method of attachment of horizontally adjacent slotted frame cabinets, such as slotted frame cabinets 26a and 26b, using previously described structure and additional structure as described herein.

Figure 8:
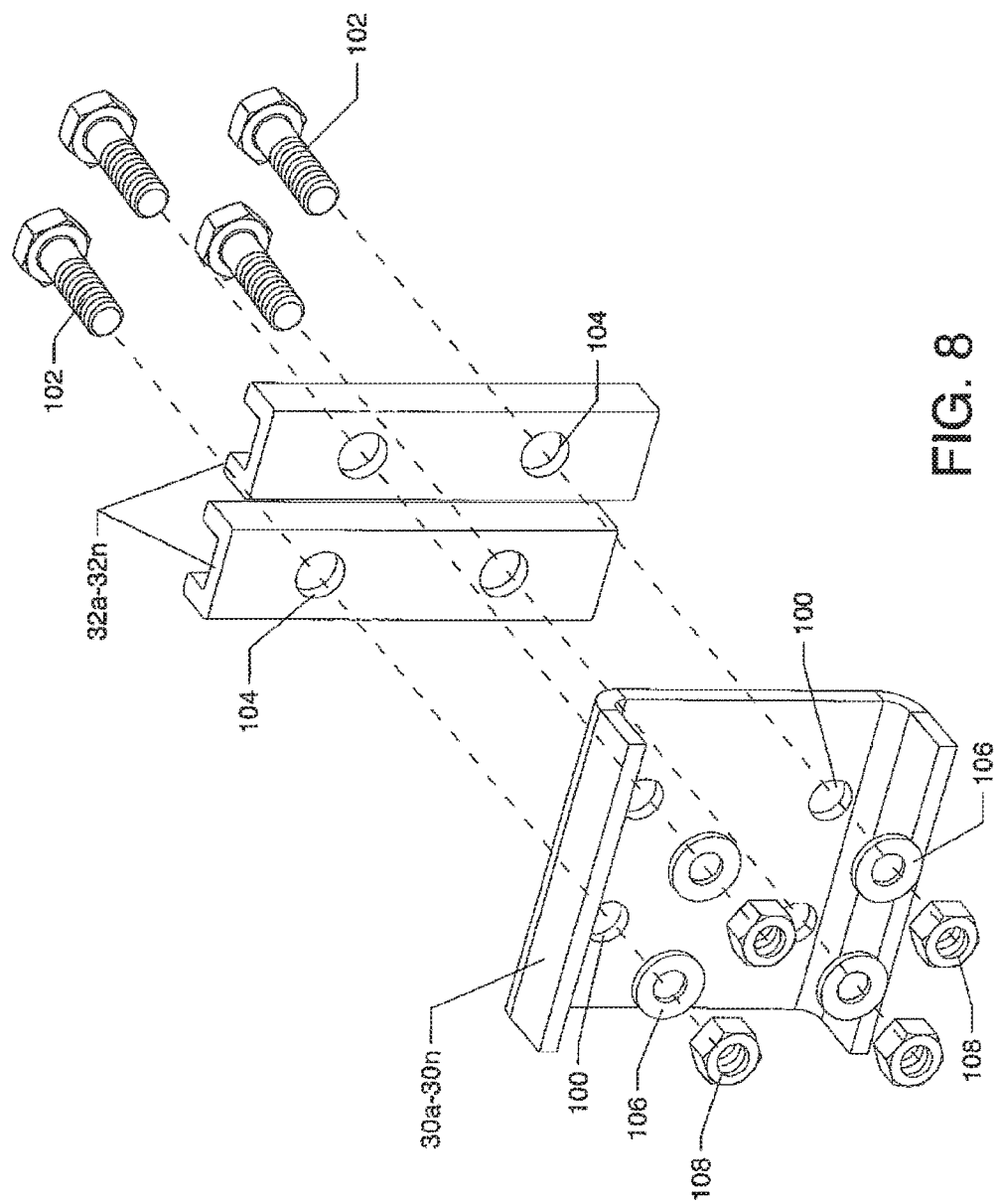
FIG. 8 is an exploded isometric rear view of a splice plate and two backing bars used with the splice plate and associated hardware.

FIG. 8 is an exploded isometric rear view of one of the splice plates 30a-30n and two of the backing bars 32a-32n used with the splice plates 30a-30n and associated hardware to, in part, secure horizontally adjacent slotted frame cabinets such as slotted frame cabinets 26a and 26b or horizontally adjacent slotted frame cabinets such as slotted frame cabinets 26c and 26n. The rear portion of the splice plates 30a-30n includes a plurality of holes 100. Bolts 102 extend through holes 104 in the backing bars 32a-32n, through the opening of some backing bar slots 64, and through the holes 100 of the backing plates 30a-30n, as well as through washers 106 and into nuts 108, as indicated. The heads of the bolts 102 align closely and fixingly contact and secure between the walls of the backing bars 32a-32n.

Figure 9:
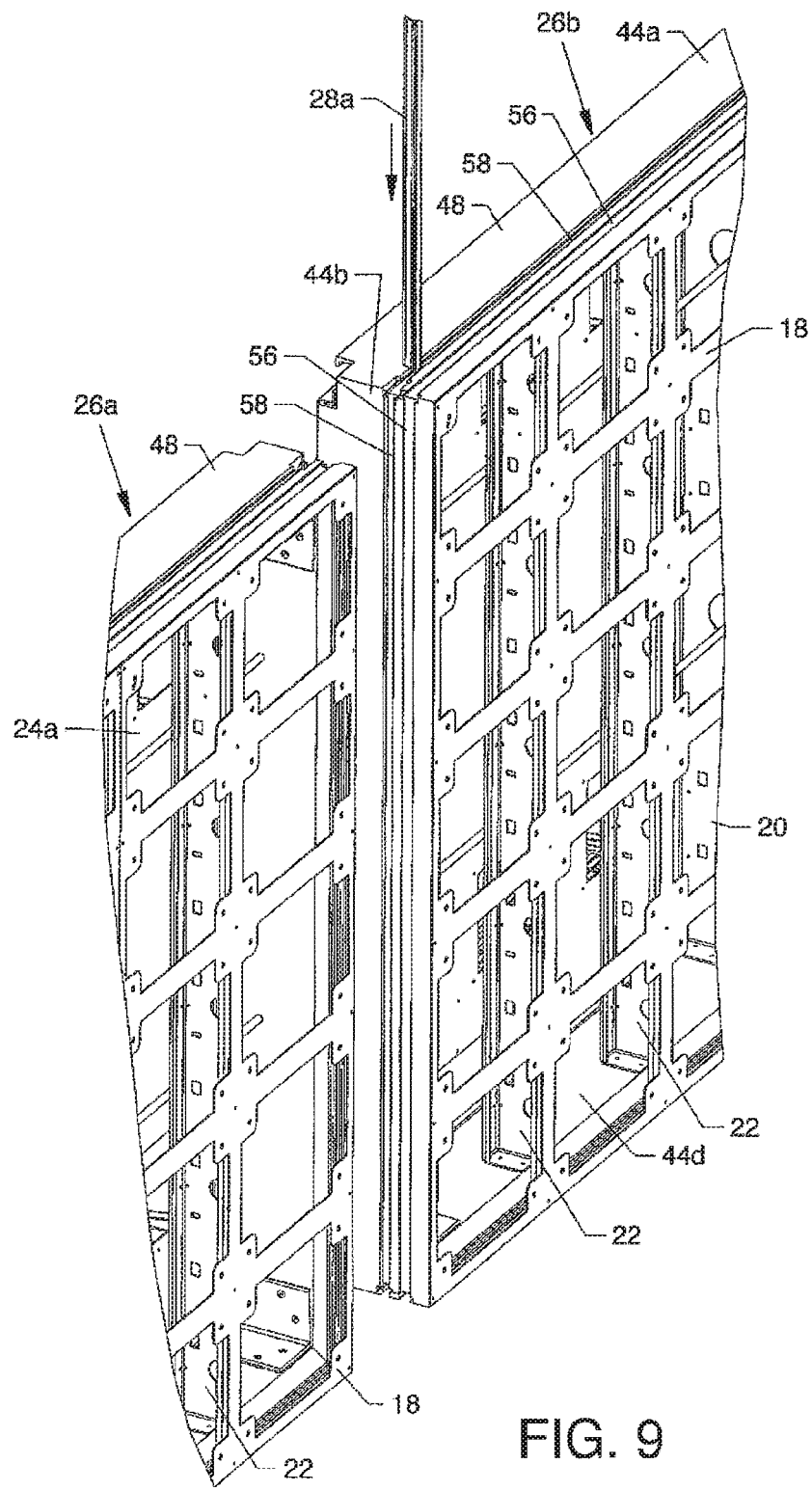
FIG. 9 shows an initial alignment of a slotted frame end of a slotted frame cabinet in close proximity to an adjacent slotted frame end of another slotted frame cabinet.
Figure 10:
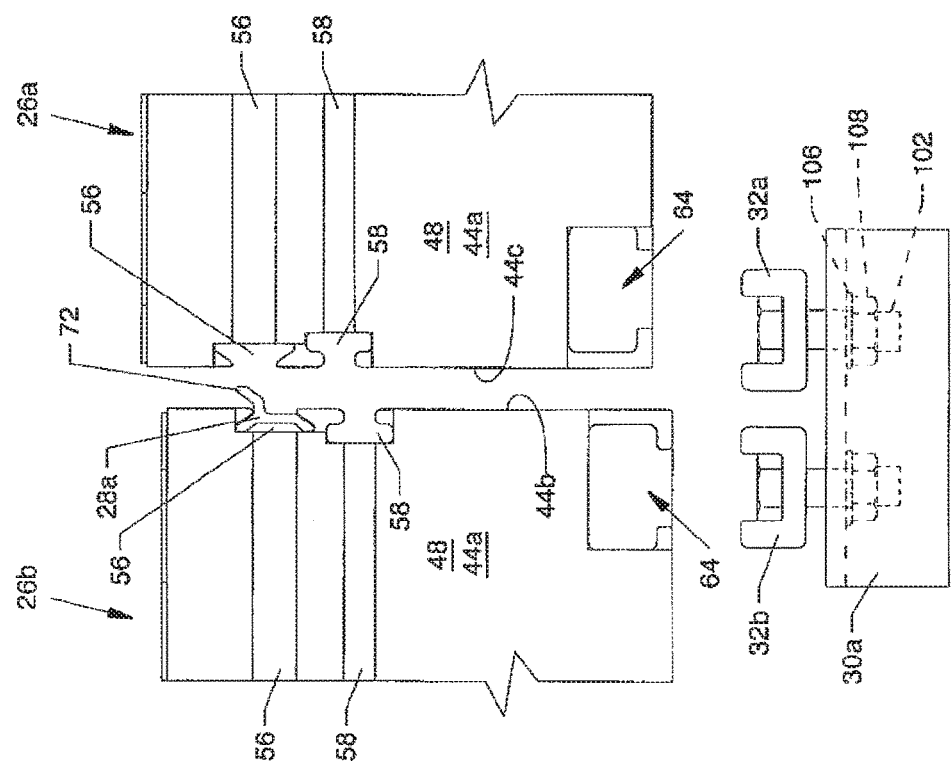
FIG. 10 is a top view showing a step where a vertically aligned splice bar is aligned in a splice bar slot in a slotted frame end of a slotted frame cabinet.

FIG. 9 shows the initial alignment of the slotted frame end 44b of the slotted frame cabinet 26b in close proximity to the slotted frame end 44c (not shown) of the slotted frame cabinet 26a. A vertically aligned splice bar 28a is shown distanced but aligned with the splice bar slot 56 of the slotted frame end 44b in the slotted frame cabinet 26b awaiting positioning therein. Preferably, the slotted frame cabinet 26b and the slotted frame cabinet 26a are offset from each other, as shown in FIG. 10. The display modules 16 are not shown for the purpose of brevity and clarity.

FIG. 10 is a top view showing a step where the vertically aligned splice bar 28a is aligned in the splice bar slot 56 in the slotted frame end 44b of the slotted frame cabinet 26b. The slotted frame cabinet 26b and the slotted frame cabinet 26a are offset from each other in order that the panel 72 of the vertically aligned splice bar 28a aligns with the opening of the splice bar slot 56 in the slotted frame end 44c of the slotted frame cabinet 26a.

Figure 11:
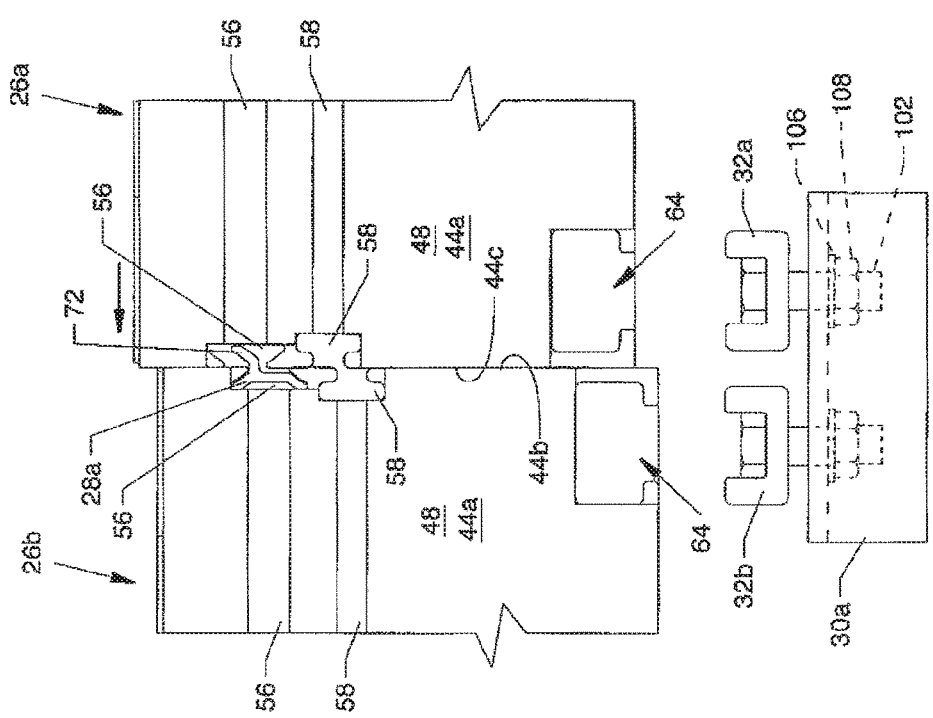
FIG. 11 is a top view showing a step where a slotted frame cabinet and a horizontally adjacent slotted frame cabinet are urged into offset intimate contact, whereby a panel of a splice bar enters into a splice bar slot in a slotted frame end of a horizontally adjacent slotted frame cabinet.

FIG. 11 is a top view showing a step where the slotted frame cabinet 26a and the slotted frame cabinet 26b are urged into offset intimate contact, whereby the panel 72 of the splice bar 28a enters into the splice bar slot 56 in the slotted frame end 44c of the slotted frame cabinet 26a.

Figure 12:
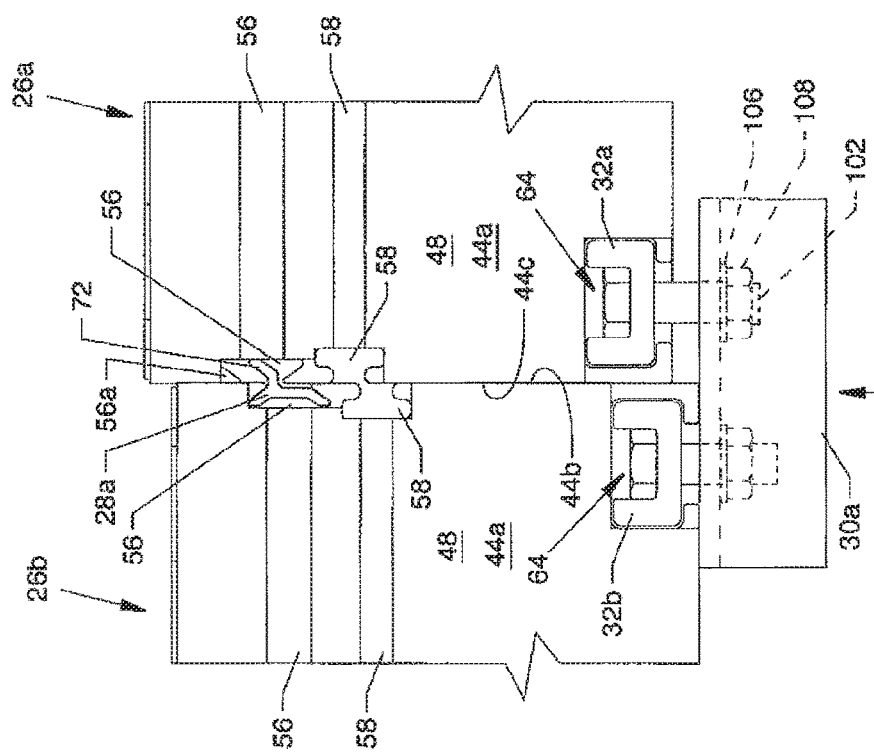
FIG. 12 is a top view showing a step where the vertically oriented backing bars in an assembly of the backing bars, splice plate bolts, washers and nuts are loaded in offset fashion into the vertically aligned rearwardly located backing bar slots.

FIG. 12 is a top view showing a step where the vertically oriented backing bars 32a and 32b, in an assembly with the splice plate 30a, bolts 102, washers 106, and nuts 108, can be loaded in an offset fashion into the vertically aligned rearwardly located backing bar slot 64 extending along the slotted frame end 44c of the slotted frame cabinet 26a and vertically aligned backing bar slot 64 extending along the slotted frame end 44b of the slotted frame cabinet 26b, respectively.

Figure 13:
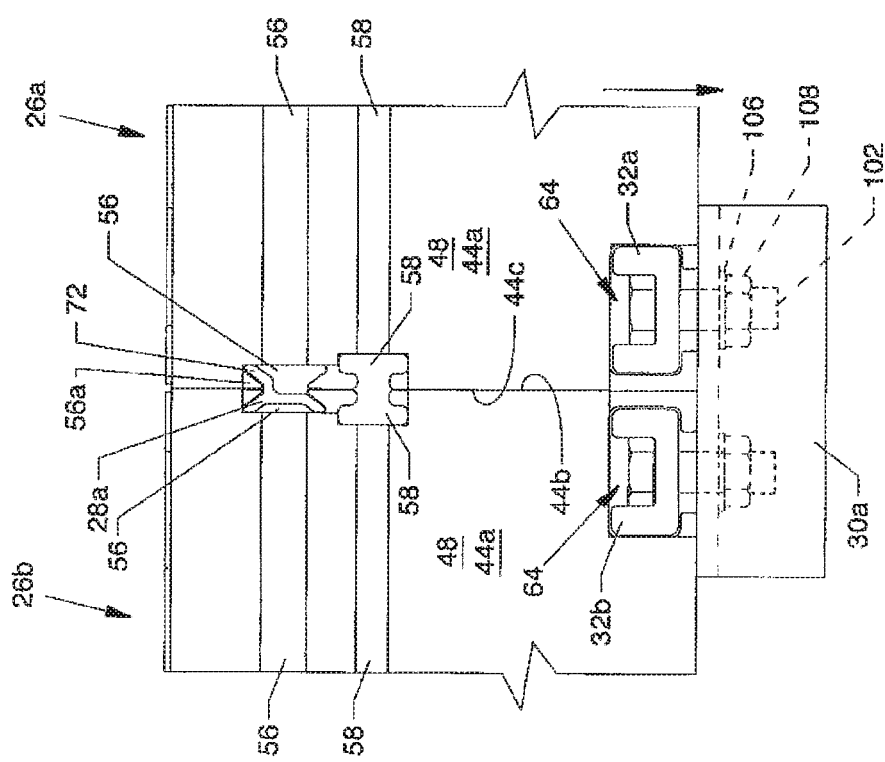
FIG. 13 is a top view showing a step where one or more nuts are tightened in order that a slotted frame cabinet is forcibly drawn into intimate and forced contact with the splice plate.

FIG. 13 is a top view showing a step where one or more nuts 108 are tightened in order that the slotted frame cabinet 26a is forcibly drawn into intimate contact with the splice plate 30a. The slotted frame cabinet 26b is shown in intimate contact with and secured to the splice plate 30a by the use of the backing bar 32b which is located in the backing bar slot 64 in the slotted frame end 44b of the slotted frame cabinet 26b. Force is applied by tightening nuts 108 to cause frictional engagement between the backing bars 32a, 32b, the slots 64 in which they are aligned, the nuts 108, the washers 106, and the splice plate 30a. In this example and during such forcible engagement, the slotted frame cabinet 26a is positioned rearwardly against the splice plate 30a to cause the forwardly located angled slot wall 56a (also shown in FIG. 4) of the slotted frame end 44c in the slotted frame cabinet 26a to intimately and lockingly contact the panel 72 of the splice bar 28a. Thus, securing of a slotted frame cabinet (26a) to a horizontally adjacent slotted frame cabinet (26b) is accomplished by use of a splice plate (30a) and associated backing bars (32a and 32b) at a rearward location and by the use of a splice bar (28a) at a forward location. In the alternative, the backing bars 32a and 32b, and bolts 102 can be loaded into the backing bar slots 64 and the splice plate 30a and associated hardware can be installed and secured, as indicated in different stages in FIG. 14, to draw the slotted frame cabinet 26a and the slotted frame cabinet 26b together in a suitable manner. Such actions also align the fronts of the slotted frame cabinet 26a and the slotted frame cabinet 26b and the backs of the slotted frame cabinet 26a and slotted frame cabinet 26b.

The capture of the splice bar 28a between the slotted frame end 44c of the slotted frame cabinet 26a and the slotted frame end 44b of the slotted frame cabinet 26b provides for vertical connection, in part, of the slotted frame cabinets 26a and 26b. Vertical connection between the slotted frame end 44c of the slotted frame cabinet 26a and the slotted frame end 44b of the slotted frame cabinet 26b is completed by the use of the splice plate 30a, the steps of which have just been described.

Figure 14:
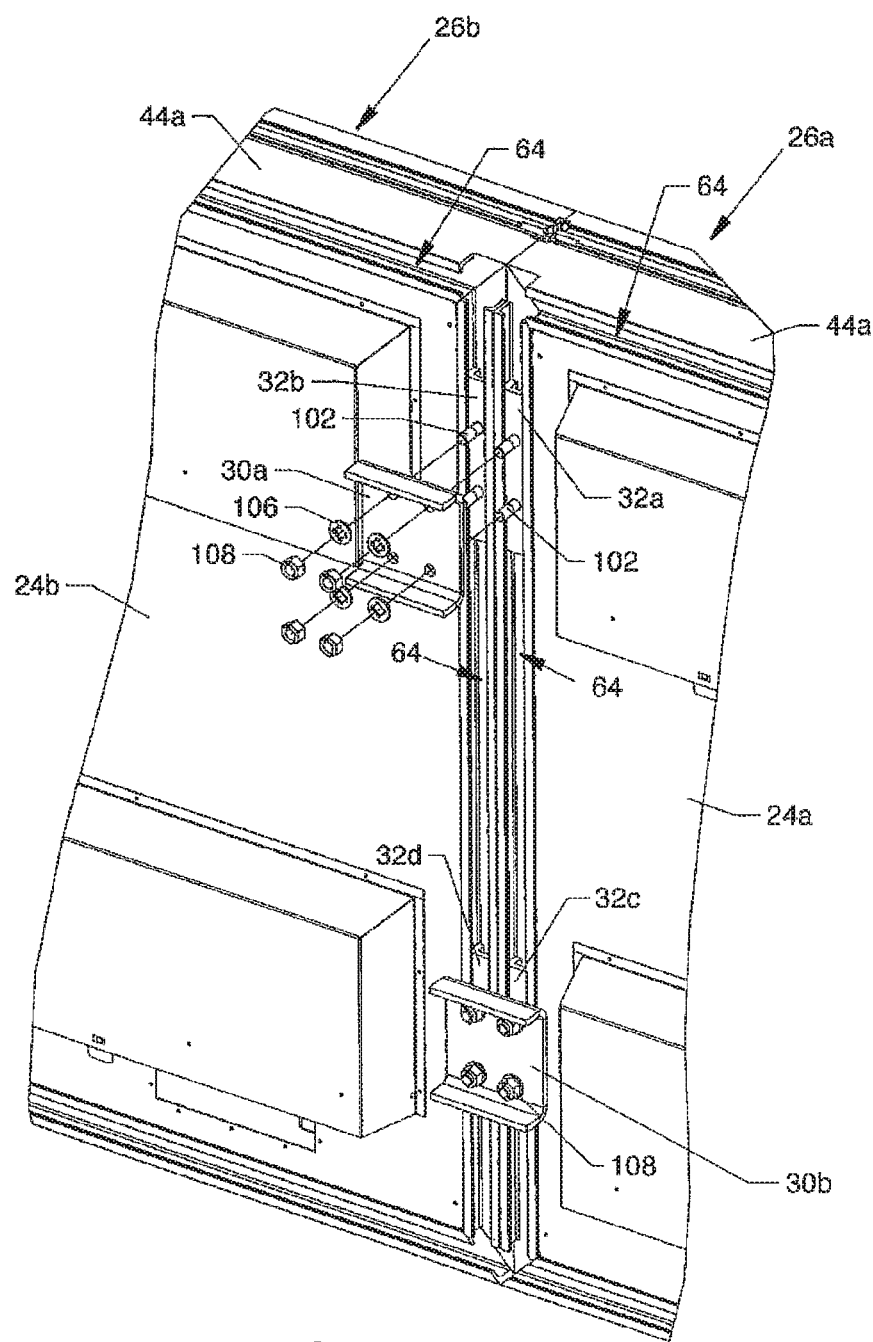
FIG. 14 shows the use of multiple splice plates, backing bars, and associated components to, in part, suitably connect horizontally adjacent slotted frame cabinets.

FIG. 14 shows the use of multiple splice plates 30a and 30b, backing bars 32a-32d, and associated components to, in part, suitably connect horizontally adjacent slotted frame cabinets 26a and 26b, as previously described. Horizontally adjacent slotted frame cabinets 26c and 26n are connected using like components in the same manner as previously described for connection of horizontally adjacent slotted frame cabinets 26a and 26b. Other horizontally adjacent slotted frame cabinets 26 can be attached using the above described methods in order to provide a longer electronic sign.

Figure 15:
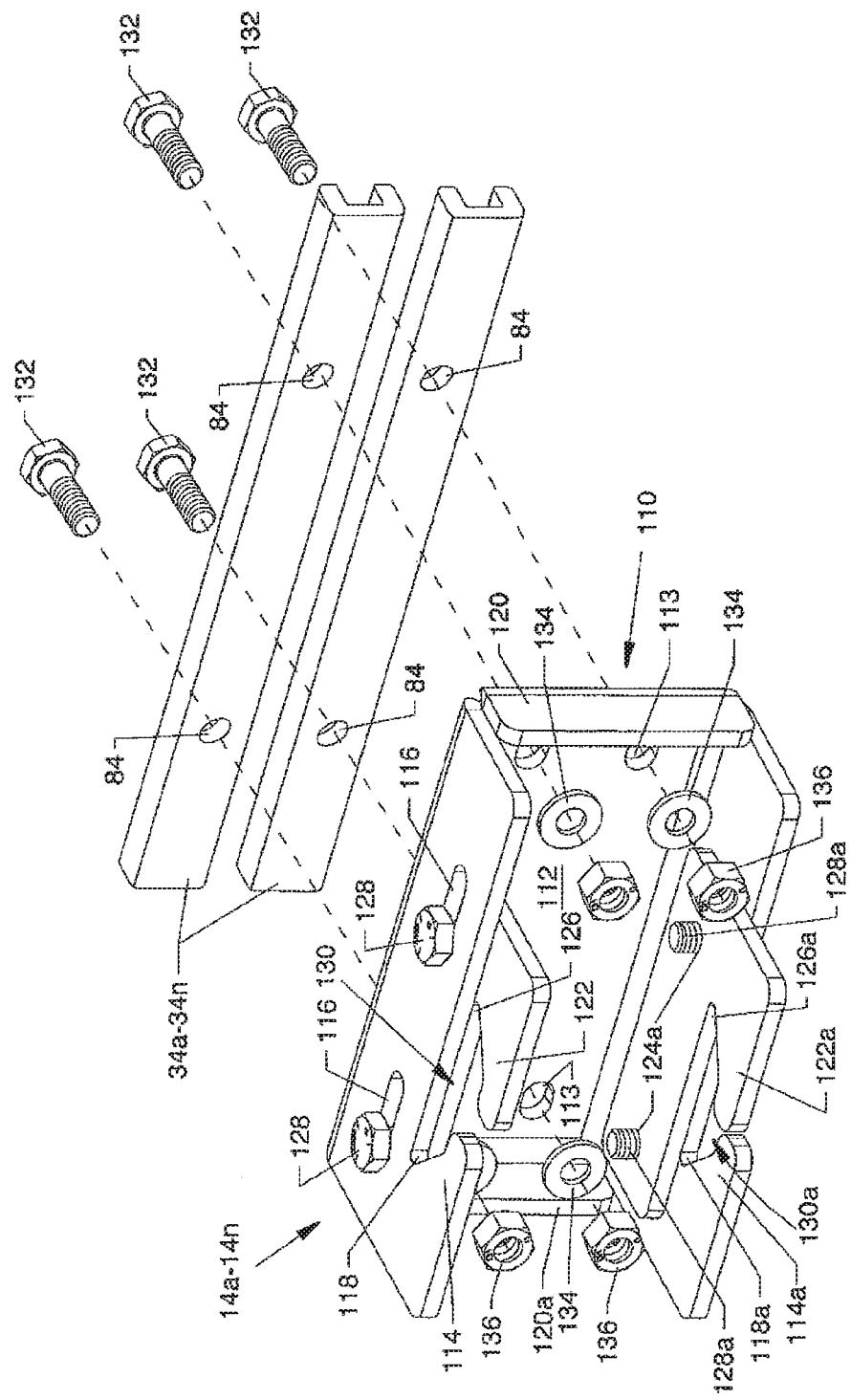
FIG. 15 is an isometric view of one of the mounting clamps and two of the backing bars used with the mounting clamps and associated hardware to, in part, secure horizontally adjacent slotted frame cabinets.
Figure 16:
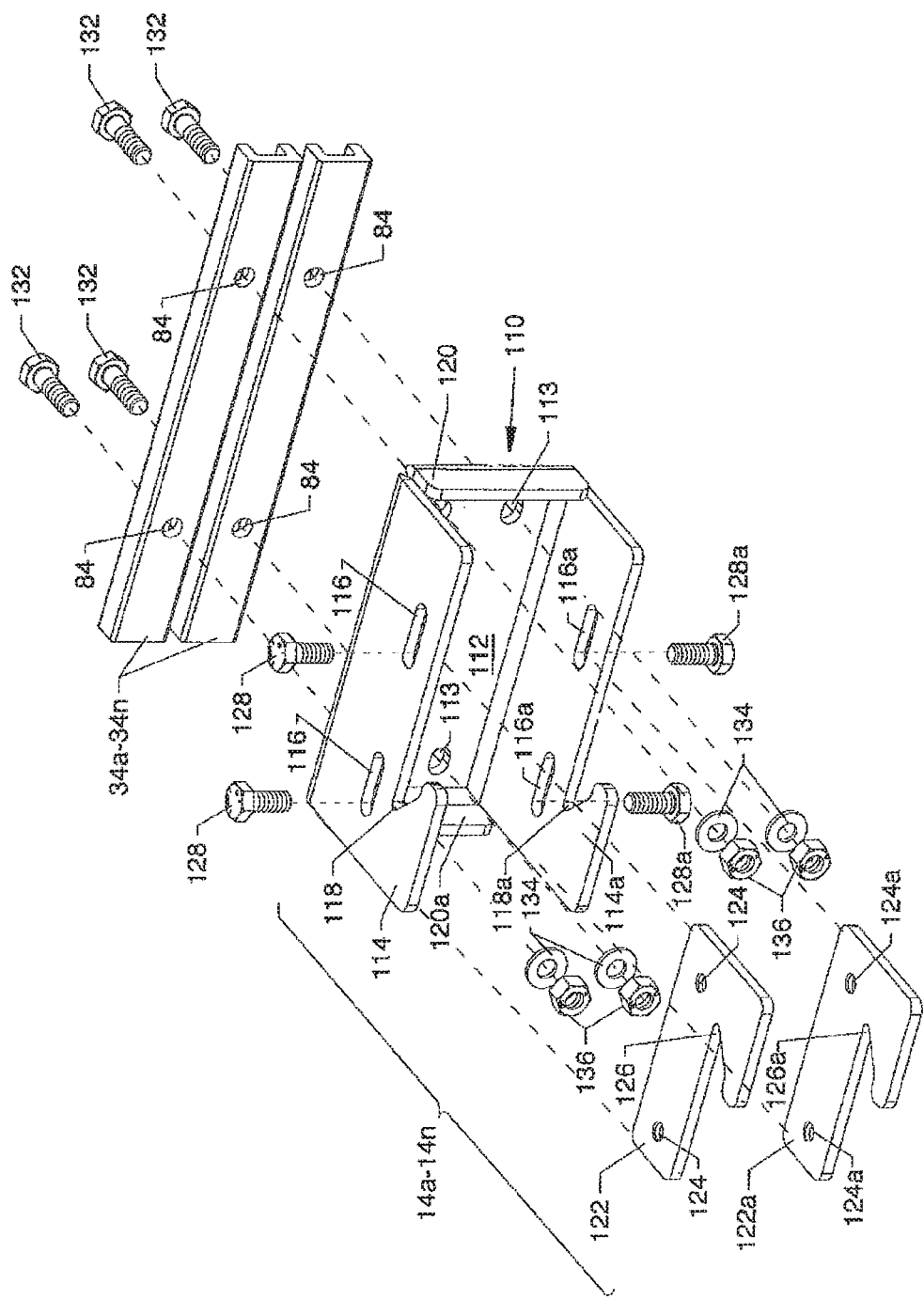
FIG. 16 is an exploded view of the components of FIG. 15.

FIG. 15 is an isometric view of one of the mounting clamps 14a-14n and two of the backing bars 34a-34n used with the mounting clamps 14a-14n and associated hardware to, in part, secure vertically adjacent slotted frame cabinets such as slotted frame cabinets 26a and 26c. FIG. 16 is an exploded view of the components of FIG. 15. The mounting clamps 14a-14n include a stationary bracket 110 having a rear panel 112 with holes 113 therein, a top jaw panel 114 having elongated slots 116 therein and a V-shaped capture jaw slot 118, a bottom jaw panel 114a, opposing the top jaw panel 114, having elongated slots 116a therein and a V-shaped capture jaw slot 118a, and opposed side panels 120 and 120a. The mounting clamps 14a-14n also include a positionable top jaw panel 122 having threaded holes 124 therein and a V-shaped capture jaw slot 126, a positionable bottom jaw panel 122a opposing the positionable top jaw panel 122 with threaded holes 124a therein and a V-shaped capture jaw slot 126a. The positionable top jaw panel 122 is aligned with and positionable along the bottom of the top jaw panel 114 of the stationary bracket 110 and is secured thereto by bolts 128 extending through the elongated slots 116 and into the threaded holes 124 of the top jaw panel 122 to provide a variable width lockable opening 130 between the V-shaped capture jaw slot 118 of the stationary bracket 110 and the V-shaped capture jaw slot 126. In a like manner, the positionable bottom jaw panel 122a is aligned to and positionable along the top of the bottom jaw panel 114a of the stationary bracket 110 and is secured thereto by bolts 128a extending through the elongated slots 116a and into the threaded holes 124a of the bottom jaw panel 122a to provide a variable width lockable opening 130a between the V-shaped capture jaw slot 118a of the stationary bracket 110 and the V-shaped capture jaw slot 126a. Backing bars 34a-34n are located in one or more horizontally oriented backing bar slots 64 and are attached to mounting clamps 14a-14n and by using some or all of the bolts 132 which extend through some or all of holes 84 of the backing bars 34a-34n, respectively, through the openings in the backing bar slots 64, through holes 113 in the stationary bracket 110 and into washers 134 and nuts 136.

Figure 17:
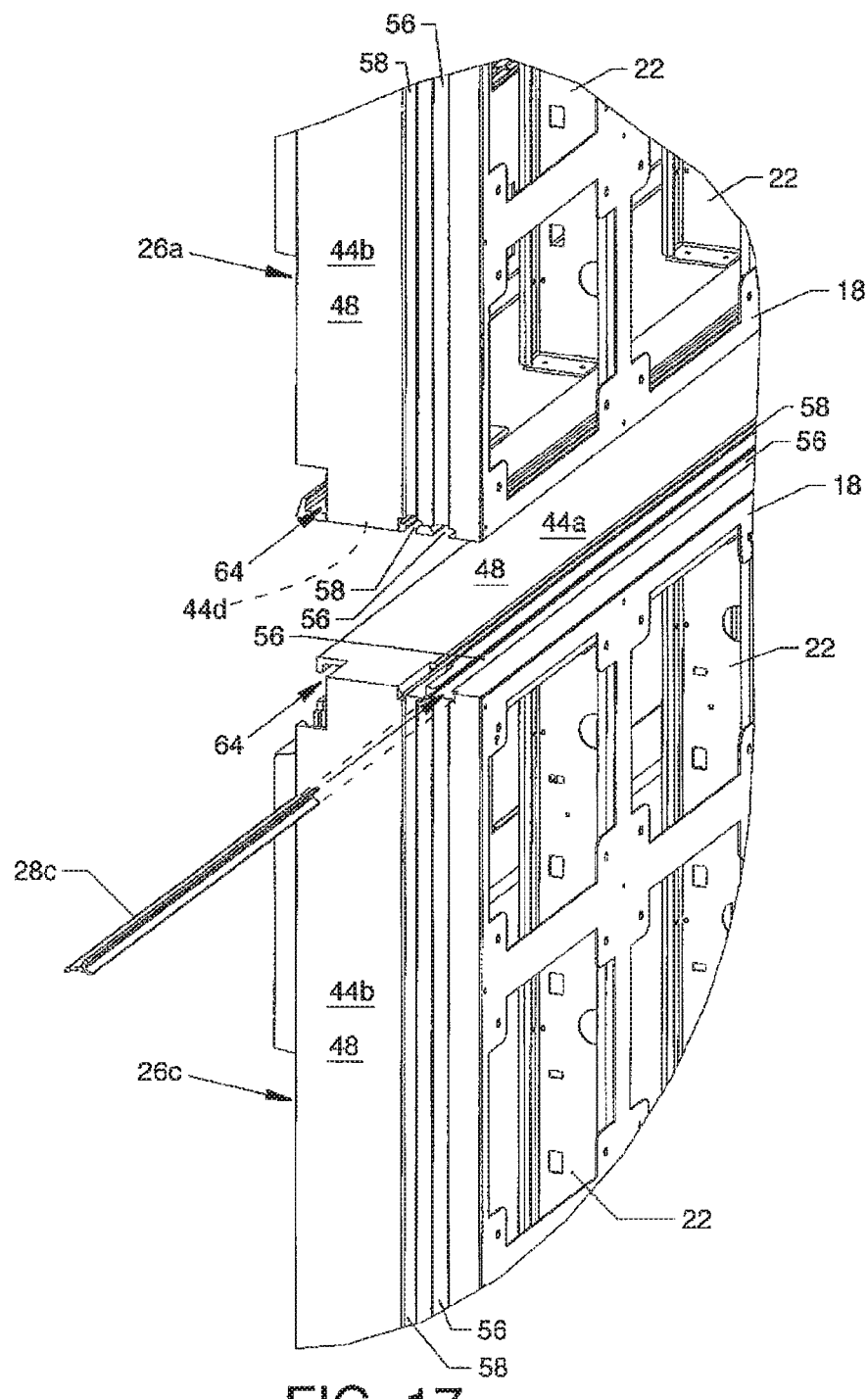
FIG. 17 shows the initial alignment of a slotted frame top of a lower slotted frame cabinet in close proximity to a slotted frame bottom of an upper slotted frame cabinet.
Figure 18:
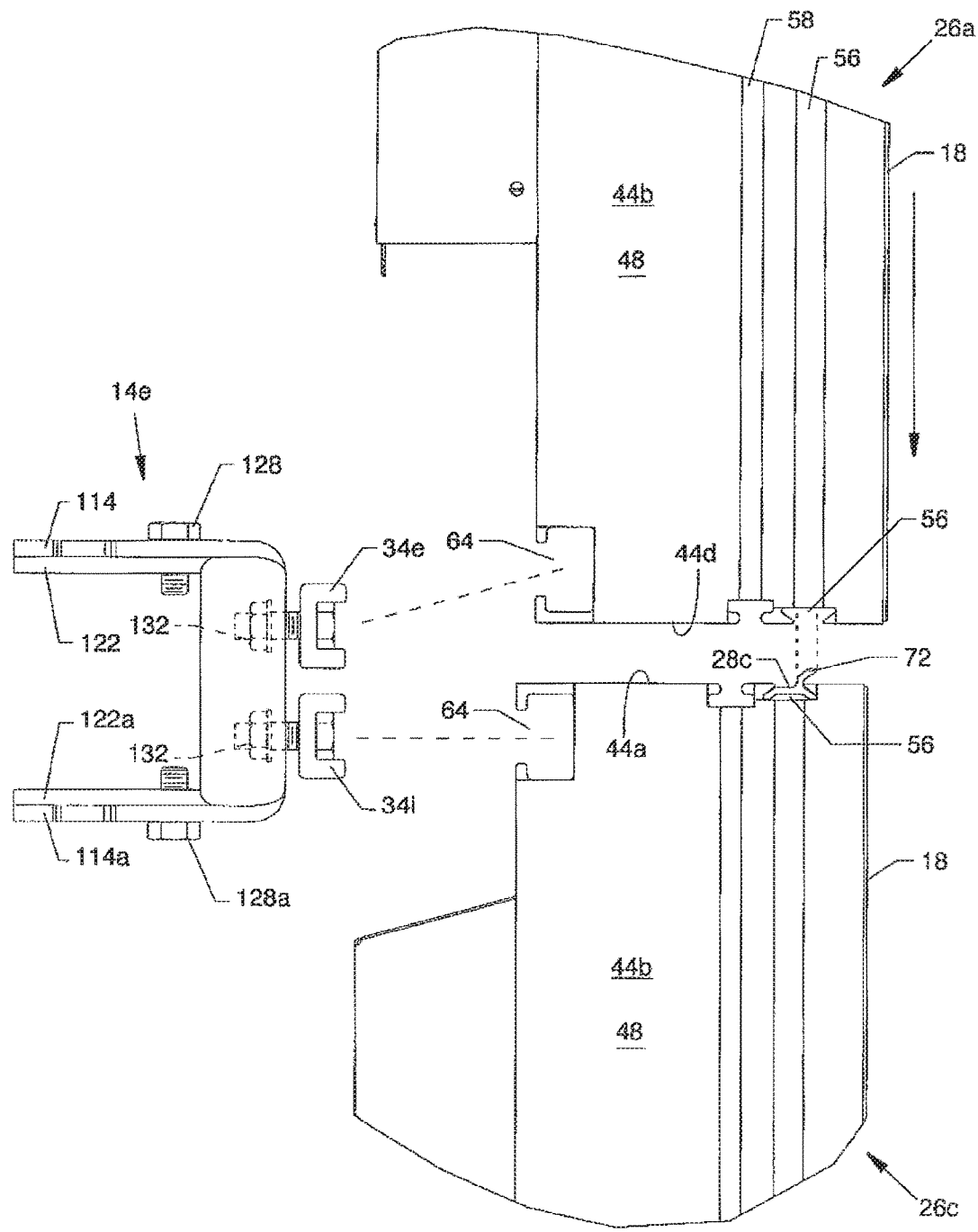
FIG. 18 is an end view showing a step where a horizontally aligned splice bar is aligned in the splice bar slot in the slotted frame top of a slotted frame cabinet.

FIG. 17 shows the initial alignment of the slotted frame top 44a of a lower slotted frame cabinet 26c in close proximity to the slotted frame bottom 44d of an upper slotted frame cabinet 26a. A portion of a horizontally aligned splice bar 28c is shown distanced but aligned with the splice bar slot 56 of the slotted frame top 44a in the slotted frame cabinet 26c awaiting positioning therein. Preferably, the slotted frame cabinet 26a and the slotted frame cabinet 26c are offset from each other, as shown in FIG. 18. The display modules 16 are not shown for the purpose of brevity and clarity.

FIG. 18 is an end view showing a step where the horizontally aligned splice bar 28c is aligned in the splice bar slot 56 in the slotted frame top 44a of the slotted frame cabinet 26c. The slotted frame cabinet 26c and the slotted frame cabinet 26a are offset from each other in order that the panel 72 of the horizontally aligned splice bar 28c aligns with the opening of the splice bar slot 56 in the slotted frame bottom 44d of the slotted frame cabinet 26a. An end view of two of the backing bars 34e and 34i, including an associated mounting clamp 14e, is shown awaiting engagement with the backing bar slot 64 located along the bottom of the slotted frame cabinet 26a and with the backing bar slot 64 located along the top of the slotted frame cabinet 26c.

Figure 19:
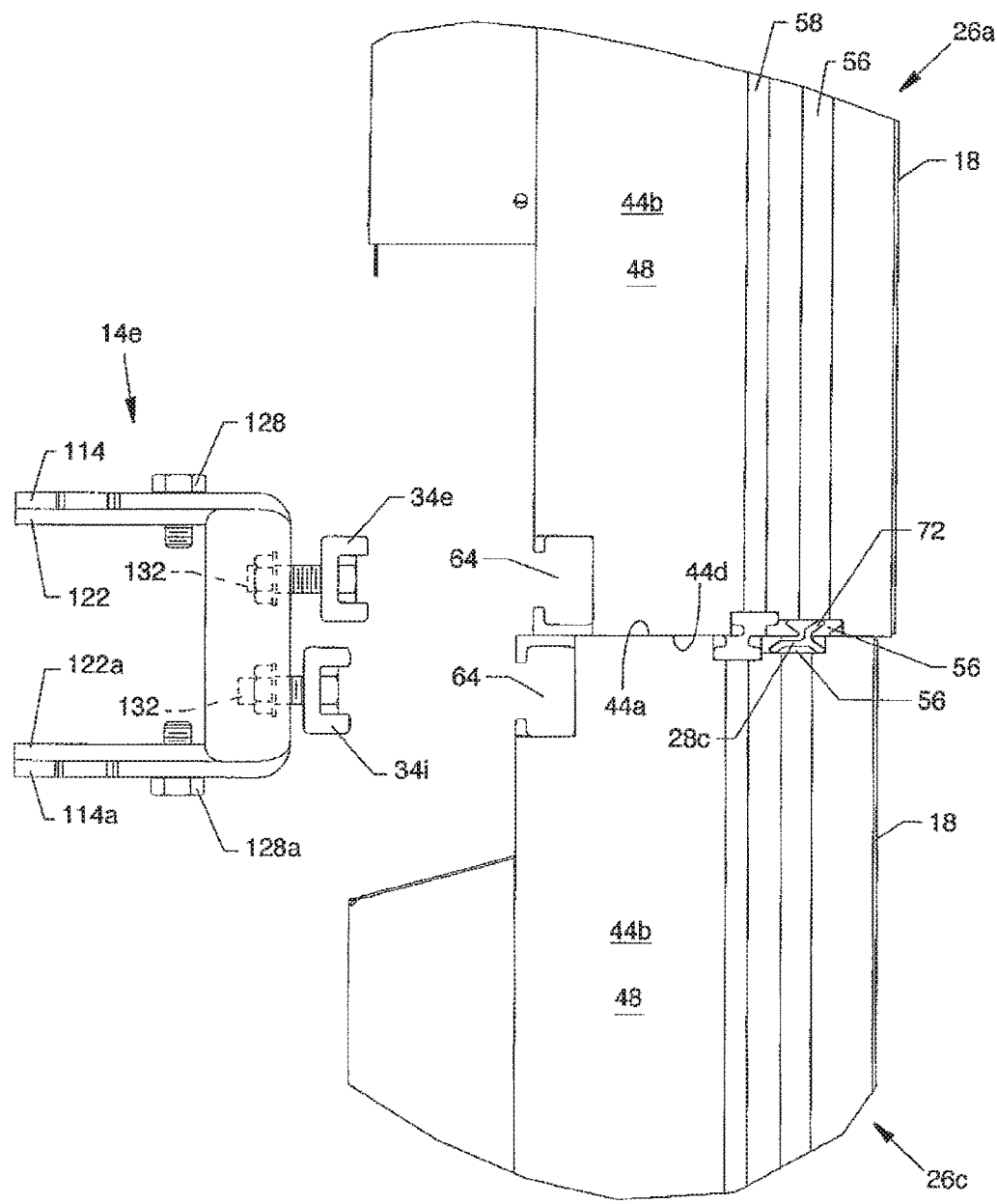
FIG. 19 is an end view showing a step where an upper slotted frame cabinet and a lower slotted frame cabinet are manually urged into offset intimate contact.

FIG. 19 is an end view showing a step where the slotted frame cabinet 26a and the slotted frame cabinet 26c are manually urged into offset intimate contact, whereby the panel 72 of the splice bar 28c enters into the splice bar slot 56 in the slotted frame bottom 44d of the slotted frame cabinet 26a.

Figure 20:
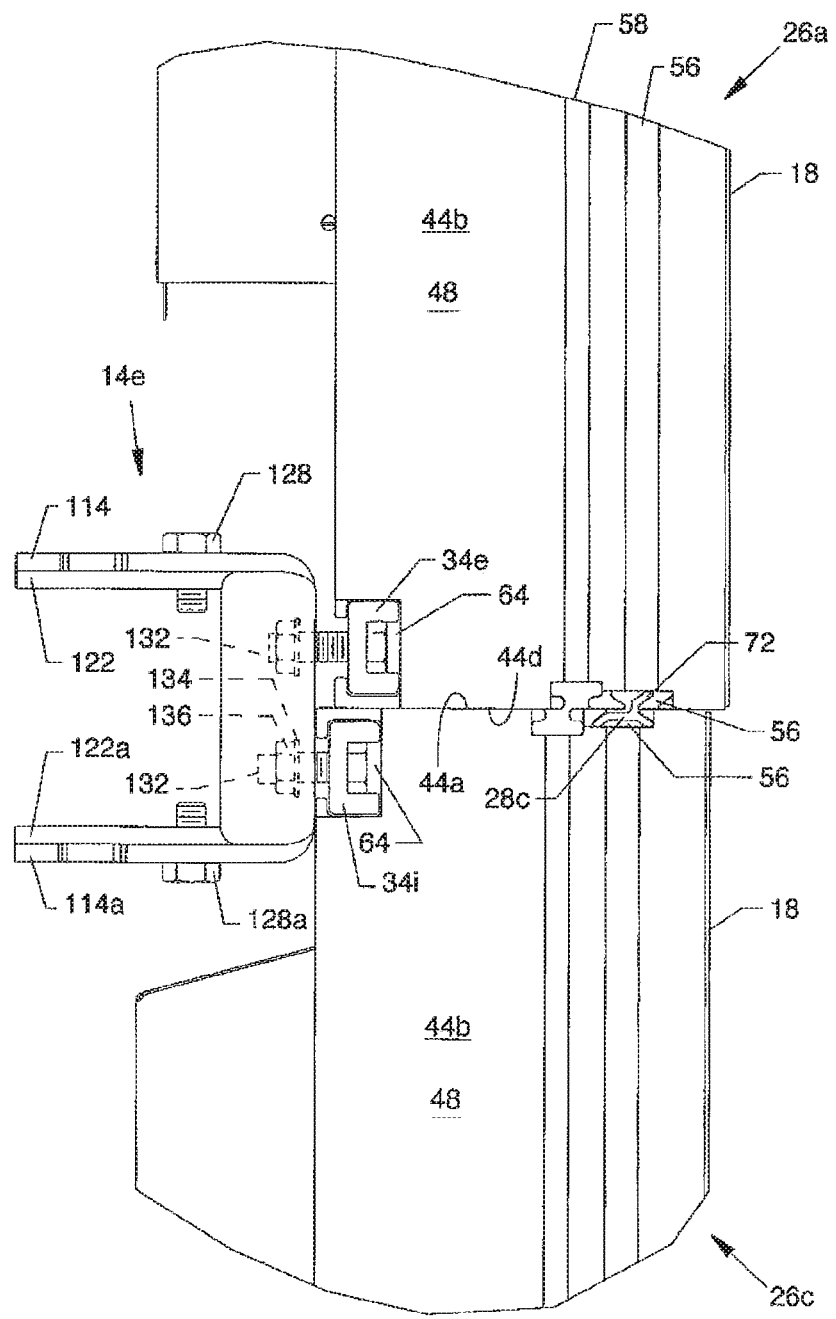
FIG. 20 is an end view showing a step where the horizontally oriented backing bars in an assembly consisting of the backing bars, a mounting clamp, bolts, washers, and nuts are loaded in an offset fashion into horizontally adjacent and aligned backing bar slots.

FIG. 20 is an end view showing a step where the horizontally oriented backing bars 34e and 34i are in an assembly consisting of the backing bars 34e and 34i, a mounting clamp 14e, bolts 132, washers 134, and nuts 136 and are loaded, in an offset manner, into the horizontally aligned backing bar slots 64 5 extending along the slotted frame bottom 44d of the slotted frame cabinet 26a and horizontally aligned backing bar slot 64 along the slotted frame top 44a of the slotted frame cabinet 26c, respectively.

Figure 21:
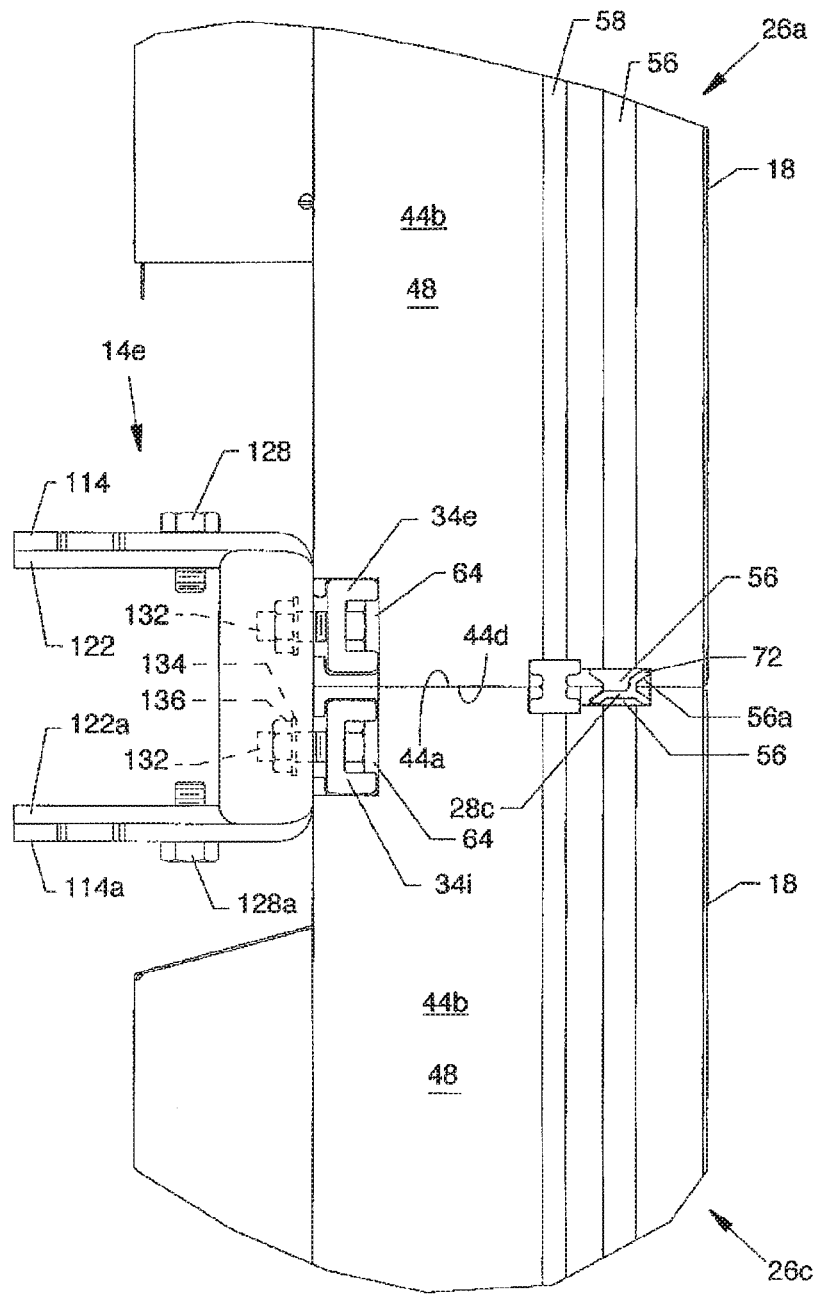
FIG. 21 is an end view showing a step where one or more nuts are tightened in order that a slotted frame cabinet is forcibly drawn into intimate and forced contact with a mounting clamp.
Figure 22:
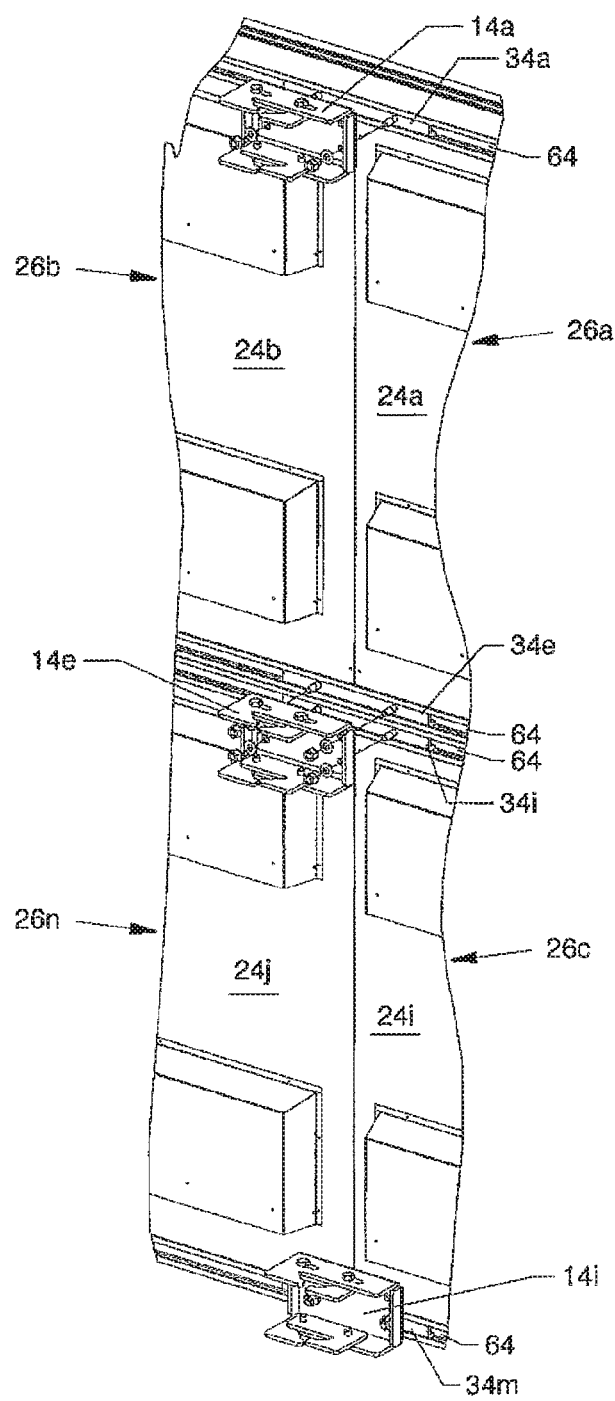
FIG. 22 shows the use of multiple mounting clamps, backing bars, and associated components to, in part, suitably connect horizontally adjacent slotted frame cabinets.

FIG. 21 is an end view showing a step where one or more nuts 136 are tightened in order that the slotted frame cabinet 26a is forcibly drawn into intimate contact with one or more of the mounting clamps 14a-14n, such as mounting clamp 14e. The slotted frame cabinet 26c is shown in intimate contact with and secured to the mounting clamp 14e by the use of the backing bar 34i which is located in the backing bar slot 64 in the slotted frame top 44a of the slotted frame cabinet 26c. Force is applied to cause frictional engagement across the backing bars 34e, 34i and the slots 64 in which they are aligned, the nuts 136, the washers 134, and the mounting clamp 14e. In this example and during such forcible engagement, the slotted frame cabinet 26a is positioned rearwardly against the mounting clamp 14e to cause the forwardly located angled slot wall 56a (also shown in FIG. 4) of the slotted frame bottom 44d in slotted frame cabinet 26a to intimately and lockingly contact the panel 72 of the splice bar 28c. Thus, securing of an upper slotted frame cabinet (26a) to a lower slotted frame cabinet (26c) is accomplished by use of a mounting clamp (14e) and associated backing bars (34e and 34i) at a rearward location and by the use of a splice bar (28c) at a forward location. In the alternative, the backing bars 34e and 34i and bolts 132 can be loaded into the backing bar slots 64 and the mounting clamp 14e and associated hardware can be installed and secured as indicated in FIG. 22 to draw the slotted frame cabinet 26a and the slotted frame cabinet 26c together in a suitable manner. Such actions also align the fronts and the backs of the slotted frame cabinet 26a and the slotted frame cabinet 26c.

The capture of the splice bar 28c between the slotted frame end 44d of the slotted frame cabinet 26a and the slotted frame end 44a of the slotted frame cabinet 26c provides for horizontal connection, in part, of the slotted frame cabinets 26a and 26c. Horizontal connection between the slotted frame end 44a of the slotted frame cabinet 26a and the slotted frame end 44d of the slotted frame cabinet 26c is completed by the use of the mounting clamp 14e the steps of which have just been described.

FIG. 22 shows the use of multiple mounting clamps 14a, 14e, 14i, backing bars 34a, 34e, 34i, and associated components to, in part, suitably connect vertically adjacent slotted frame cabinets 26a and 26c, as previously described. Vertically adjacent slotted frame cabinets 26b and 26n are connected using like components in the same manner as previously described for connecting vertically adjacent slotted frame cabinets 26a and 26c. Other vertically adjacent slotted frame cabinets 26 can be attached using the above described methods in order to provide a taller electronic sign. The mounting clamps 14a-14n are horizontally positionable within the horizontally oriented backing bars 64, respectively, in order to align with the support structures such as support structures 12a-12n (shown in FIG. 1).

Figure 23:
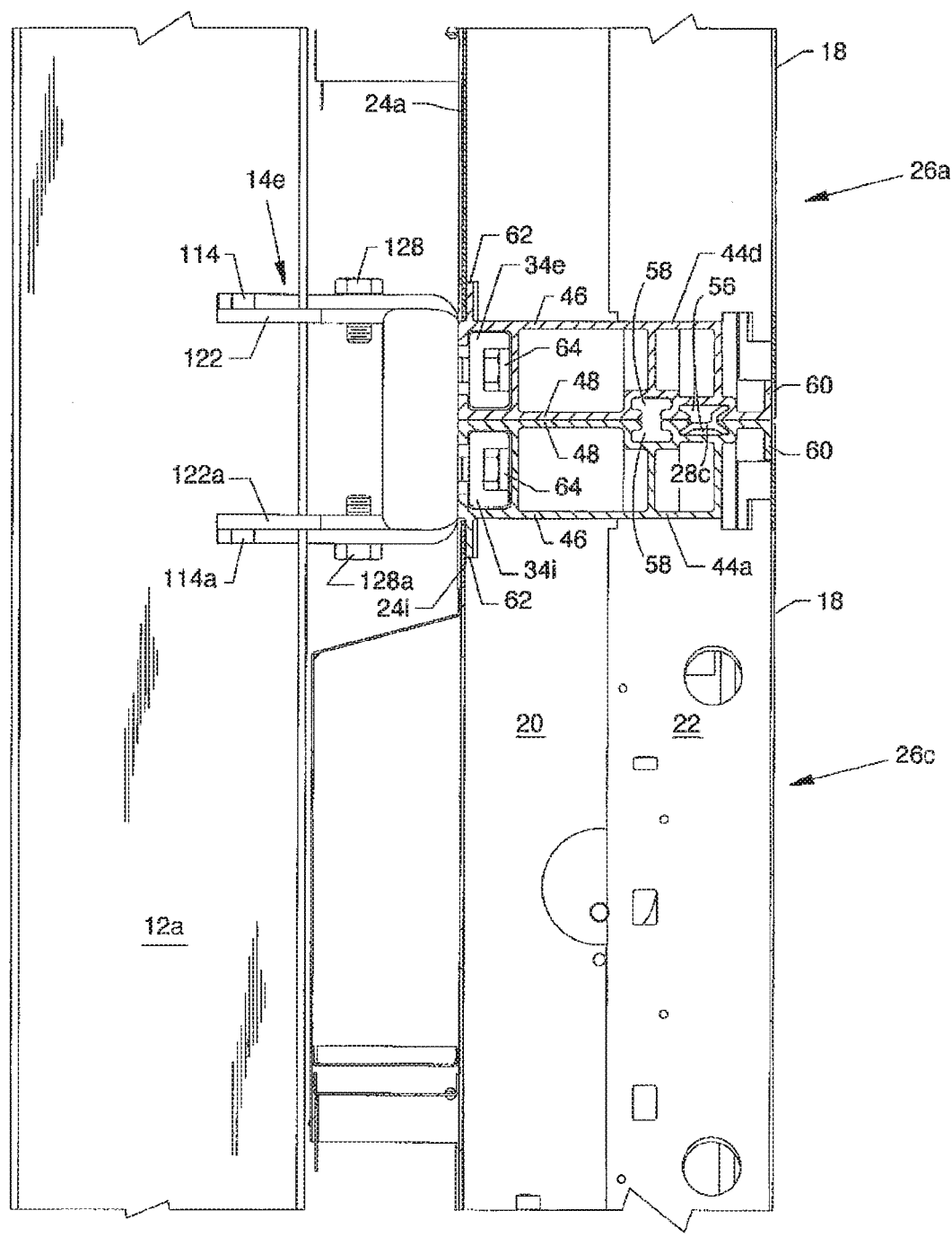
FIG. 23 is a cross section view showing a mounting clamp in use with splice bars to, in part, secure an upper slotted frame cabinet to a lower slotted frame cabinet, as well as showing the use of a mounting clamp to, in part, connect an upper slotted frame cabinet and lower slotted frame cabinet to a support structure.

FIG. 23 is a cross section view showing mounting clamp 14e in use along with the splice bar 28c to, in part, secure an upper slotted frame cabinet 26a to a lower slotted frame cabinet 26c using backing bars 34e and 34i. A single backing bar 34a or a single backing bar 34m, such as shown in FIG. 22, can be used at the tops or bottoms of slotted frame cabinets 26a-26n for fastening some of the mounting clamps 14a-14n to the slotted frame cabinets 26a-26n. Mounting clamp 14e is used to connect the upper slotted frame cabinet 26a and adjoining lower slotted frame cabinet 26c to a support structure 12a, as shown in FIGS. 23 and 24.

Figure 24:
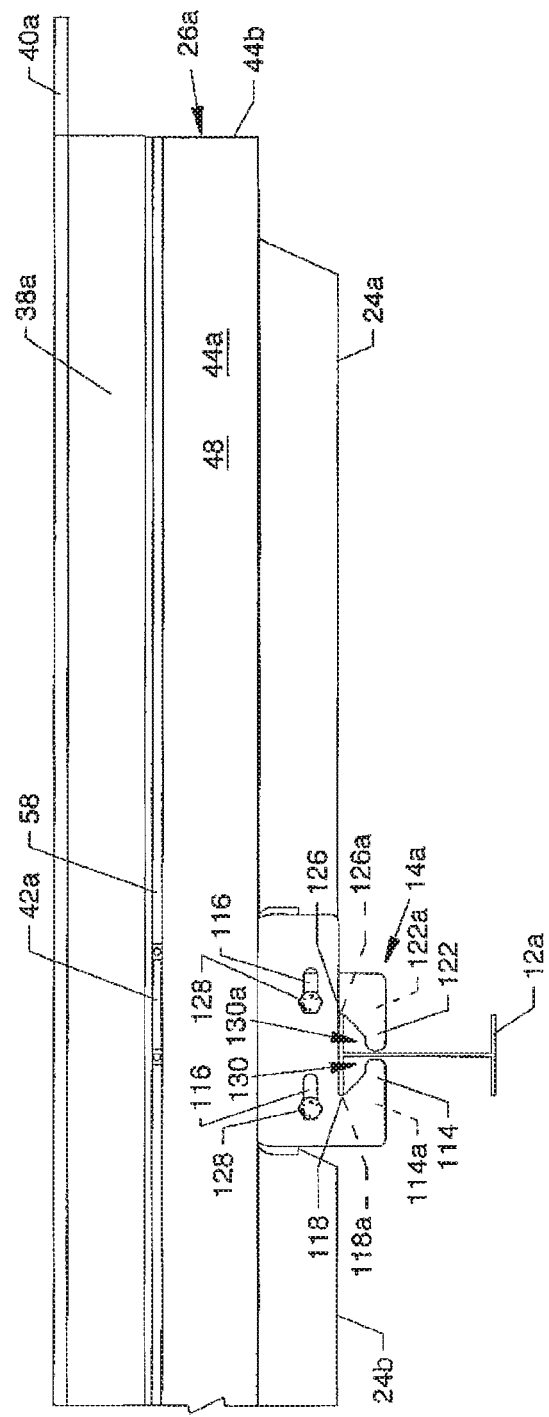
FIG. 24 is a top view showing the use of a mounting clamp to fasten a slotted frame cabinet to a vertically aligned support structure.

FIG. 24 is a top view showing the use of a mounting clamp 14a to fasten a slotted frame cabinet 26a to a vertically aligned support structure 12a. The bolts 128 and 128a can be loosened to allow the positionable top jaw panel 122 and the positionable bottom jaw panel 122a to be horizontally distanced from the top jaw panel 114 and the bottom jaw panel 114a in order to capture the vertical edges of one end of the support structure 12a. The electronic sign having slotted frame cabinets 10 can be maneuvered horizontally into contact with one or more of the support structures 12a-12n. Subsequently, the top jaw panel 122 and the bottom jaw panel 122a are positioned toward the top jaw panel 114 and the bottom jaw panel 114a in order to capture the inwardly located edges of the support structure 12a within the variable width lockable openings 130 and 130a, respectively, and more specifically, to capture the support structure 12a by intimate forced contact with the capture jaw slots 118, 118a, 126, 126a, respectively.

Figure 25:
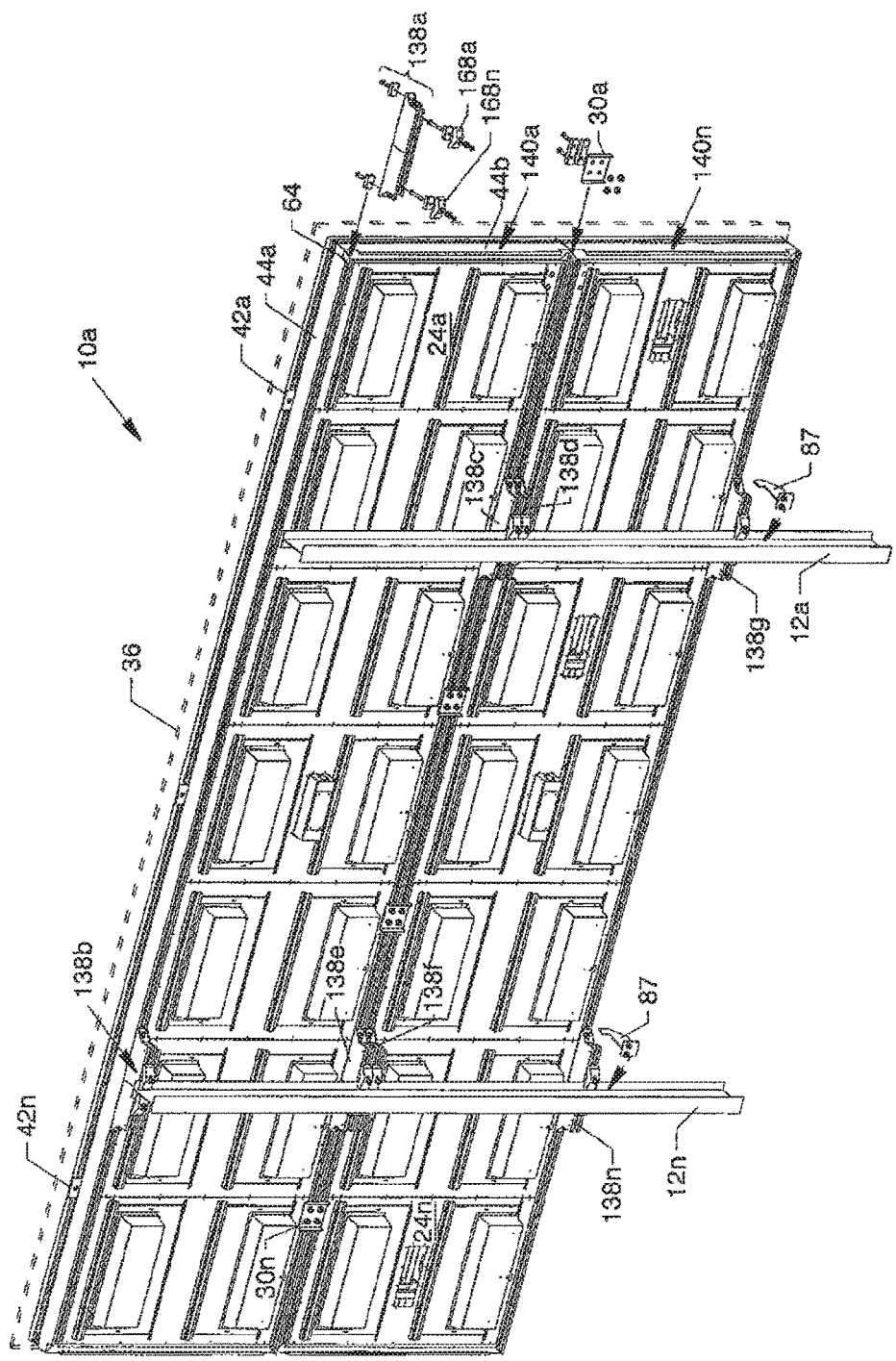
FIG. 25, an alternative embodiment, is an isometric rear view of an electronic sign having slotted frame cabinets.

FIG. 25, an alternative embodiment, is an isometric rear view of an electronic sign having slotted frame cabinets 10a constructed in a similar fashion such as used with reference to the electronic sign having slotted frame cabinets 10 in accordance with the teachings of the invention previously set forth in the accompanying figures where such alternative embodiment includes corresponding components, features, construction methods and the like. The electronic sign having slotted frame cabinets 10a can optionally include a shroud 36 shown in dashed lines at the front of a plurality of slotted frame cabinets 140a-140n. The electronic sign having slotted frame cabinets 10a is shown with the use of a plurality of multipurpose bracket assemblies 138a-138n and configured clamping devices in the form of rocker clamps 168a-168n where such multipurpose bracket assemblies 138a-138n can be used singly or in pairs for attachment of a plurality of slotted frame cabinets 140a-140n, which closely correspond in construction and features to the slotted frame cabinets 26a-26n, to the plurality of vertically oriented support structures 12a-12n. In the illustration, each of the slotted frame cabinets 140a-140n extend the full length of the electronic sign having slotted frame cabinets 10a and are joined at the top of the slotted frame cabinet 140n and the bottom of the slotted frame cabinet 140a by the use of one or more of the horizontally oriented splice bars 28c and by the use of the plurality of splice plates 30a-30n as previously described. Additional slotted frame cabinets 140a-140n can also be attached along the vertical edges thereof in a manner as previously described using one or more of the vertically oriented splice bars 28a or 28b and the plurality of splice plates 30a-30n in order to provide an electronic sign having slotted frame cabinets 10a having an increased length. Also shown are the plurality of support brackets 87 used as support during installation of the electronic sign having slotted frame cabinets 10a on the support structures 12a-12n to provide either temporary or permanent support.

Figure 26:
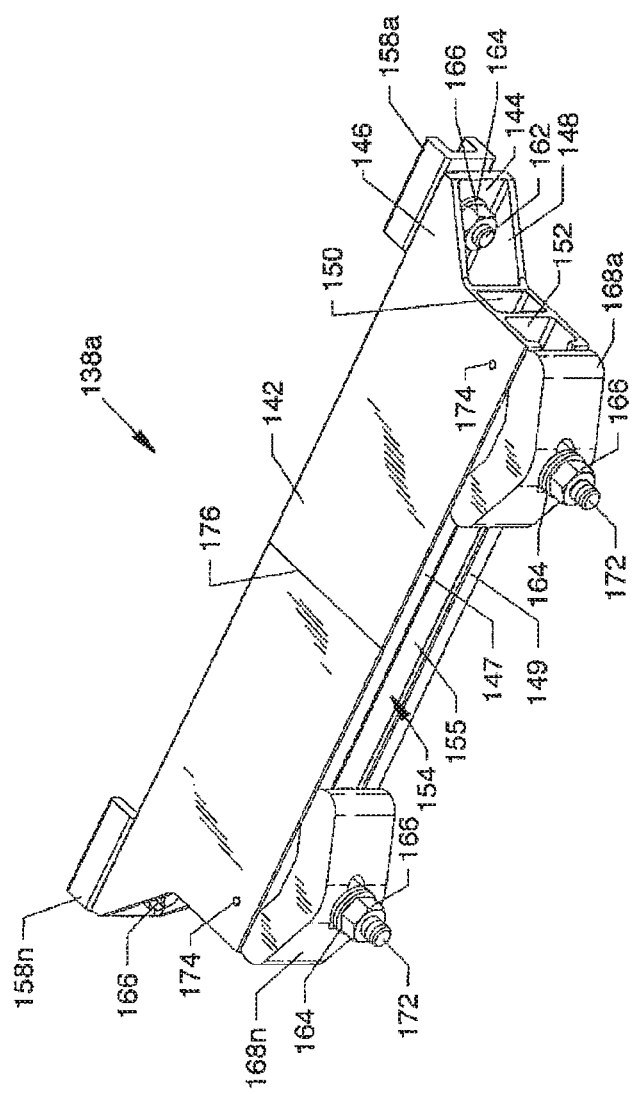
FIG. 26 is a view of an assembled multipurpose bracket assembly including rocker clamps.
Figure 27:
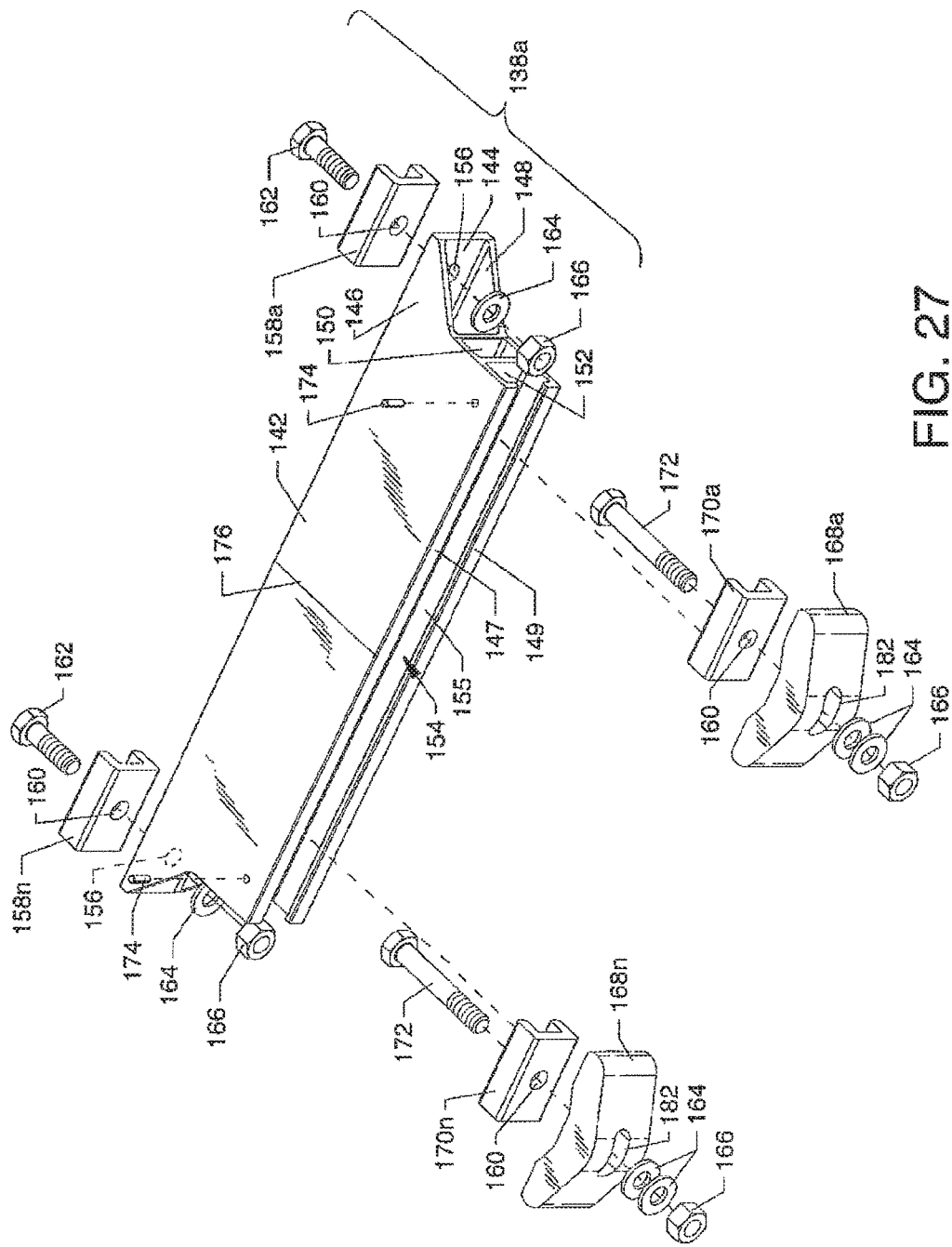
FIG. 27 is an exploded view of the multipurpose bracket assembly including rocker clamps.

FIG. 26 is a view of the assembled multipurpose bracket assembly 138a, and FIG. 27 is an exploded view of the multipurpose bracket assembly 138a in use with rocker clamps 168a-168n which can attach to the multipurpose bracket assembly 138a. With reference to FIGS. 26 and 27, the multipurpose bracket assembly 138a and configured clamping devices consisting of rocker clamps 168a and 168n and associated hardware is now described. A geometrically configured bracket or bracket member 142, which can be extruded, is central to the multipurpose bracket assembly 138a and includes a vertically oriented planar front panel 144, a horizontally oriented planar top panel 146 preferably extending at a right angle from the front panel 144, a lip 147 extending at a right angle from the rear section of the planar top panel 146, a horizontally oriented planar bottom panel 148 preferably extending at a right angle from the front panel 144, a lip 149 extending at a right angle from the rear section of the planar bottom panel 148, a vertically oriented inboard or strut panel 150 extending between the top panel 146 and the bottom panel 148, and a vertically oriented outboard or strut panel 152 extending between the top panel 146 and the bottom panel 148. The bracket 142 also includes an open backing bar slot 154 located between the rear section of the top panel 146, the lip 147, the rear section of the bottom panel 148, the lip 149, the outboard panel 152, and an opening 155 which is elongated extending along and between the lips 147 and 149. Holes 156 are located near the ends of the front panel 144. A plurality of backing bars 158a-158n each having a centrally located hole 160 adjustably secure to the front panel 144 by the use of bolts or other connection shafts having a head portion 162, washers 164 and connection nuts 166. Configured clamping devices which can be used with the multipurpose bracket assemblies 138a-138n include the plurality of rocker or other clamping device bodies 168a-168n for use with closely associated components including a plurality of backing bars 170a-170n, which preferably are similar to the backing bars or slidable channel members 158a-158n, bolts 172, washers 164, and nuts 166 to adjustably secure to the backing bar slot 154 of the multipurpose bracket assemblies 138a-138n. The structure and function of the rocker or pivoting clamps 168a-168n are described later in detail. Referring again to the multipurpose bracket assemblies 138a-138n, pins 174 extend through and frictionally engage the top panel 146 and extend into the backing bar slot 154 in order to maintain the backing bars 170a-170n within the backing bar slot 154, if required. A centerline reference 176 is included on the top panel 146 for the purpose of alignment of the multipurpose bracket assembly 138a to the electronic sign having slotted frame cabinets 10a and/or to the support structures 12a-12n.

Figure 28:
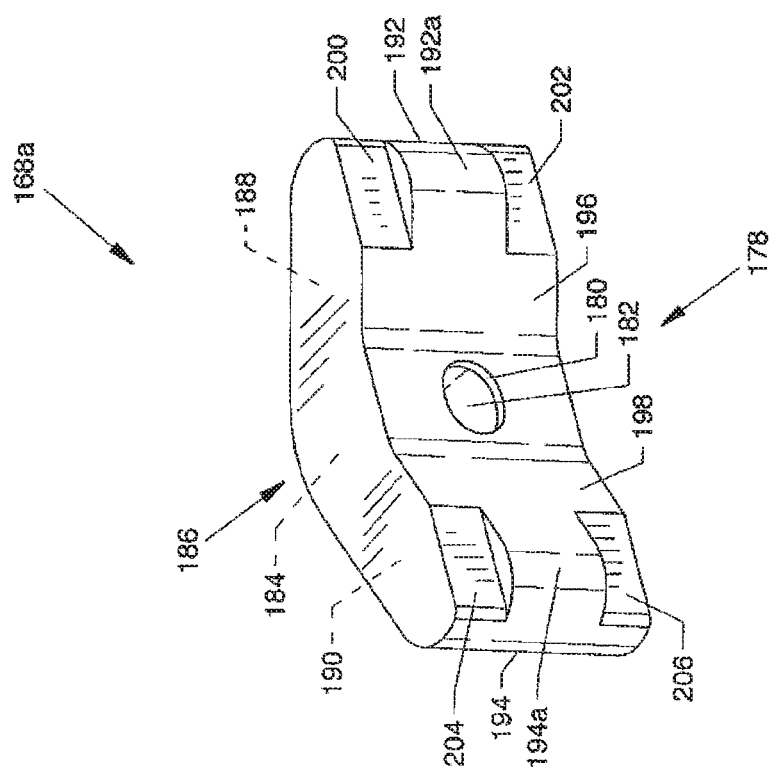
FIG. 28 is a front view of a rocker clamp.
Figure 29:
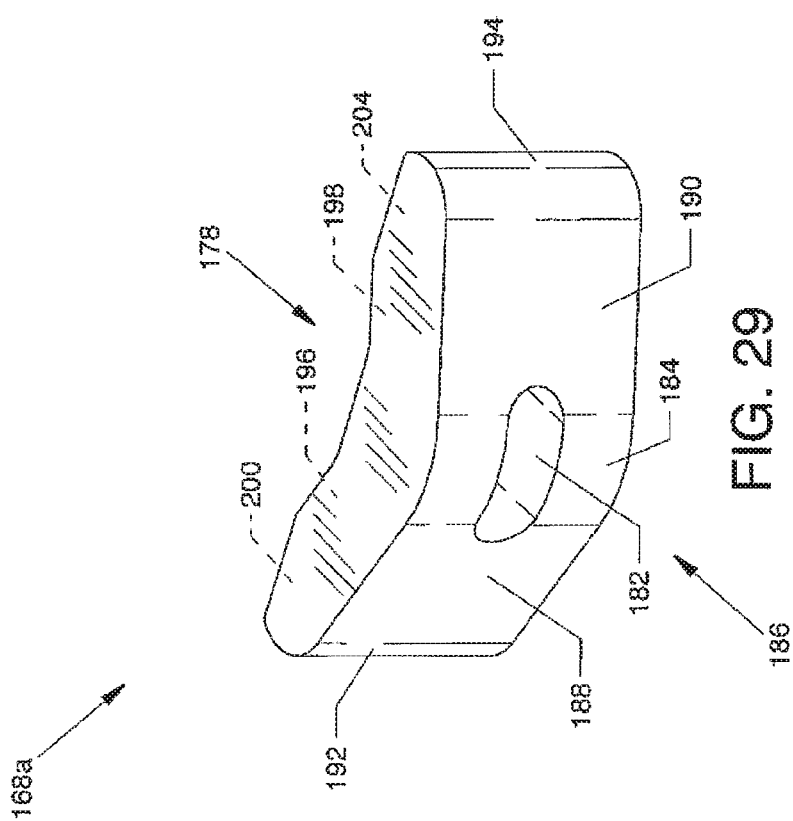
FIG. 29 is a rear view of the rocker clamp.
Figure 30:
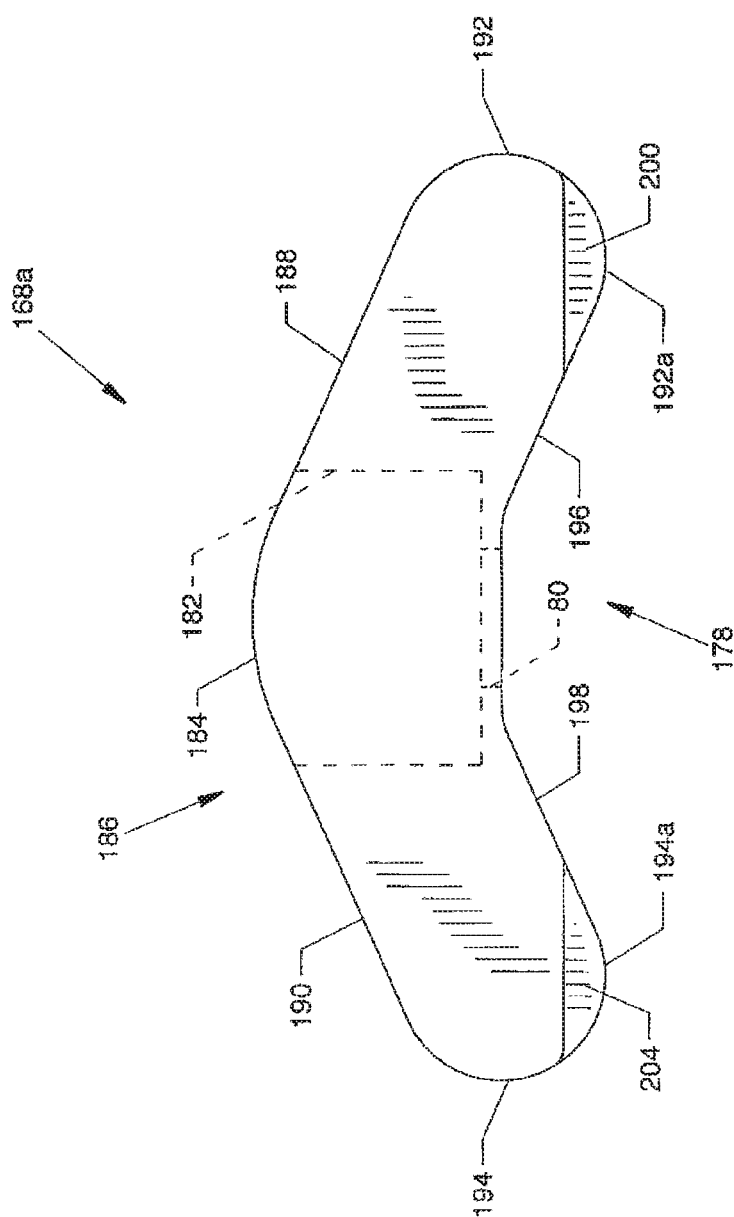
FIG. 30 is a top view of the rocker clamp.

FIGS. 28, 29 and 30 are front, rear, and top views of a rocker clamp 168a, respectively. The rocker clamp 168a is now described with reference to FIGS. 28, 29 and 30. As viewed from the top, as in FIG. 30, the rocker clamp 168a has a chevron shape. In FIG. 28 a geometrically configured front face 178 is shown including a centrally located shallow hole 180 which aligns, intersects and is continuous with an elongated hole 182 extending through the body of the rocker clamp 168a where such elongated hole 182 intersects an arcuate surface 184 on a geometrically configured rear face 186 shown in FIG. 29. The rear face 186 includes the arcuate surface 184 and planar surfaces 188 and 190 which adjoin and are continuous with the arcuate surface 184. Arcuate ends 192 and 194 adjoin and are continuous with the planar surfaces 188 and 190, respectively, and extent to intersect planar surfaces 196 and 198, respectively, on the front face 178 of the rocker clamp 168a.

FIG. 28 also shows structure for alignment of the rocker clamp 168a to the backing bar slot 154 of the bracket 142 and structure providing for contacting support structures 12a-12n. Paired and opposed recesses 200 and 202 and paired and opposed recesses 204 and 206 on the front face 178 intersect the arcuate surfaces 192 and 194 and the planar surfaces 196 and 198, as shown, leaving an arcuate section 192a and 194a of the arcuate surfaces 192 and 194 extending from between the recesses 200, 202 and 204, 206. For example and illustration of the use of one end of the rocker clamp 168a, the arcuate section 194a can align within the opening 155 of the bracket 142 and the recesses 204 and 206 can be used to align to and intimately and forcibly engage the exterior portions of the lips 147 and 149, respectively, as later described in detail. The other end of the rocker clamp 168a; i.e., the arcuate section 192a, can be used to intimately and forcibly engage a surface of the support structures 12a-12n, as later described in detail.

Figure 31:
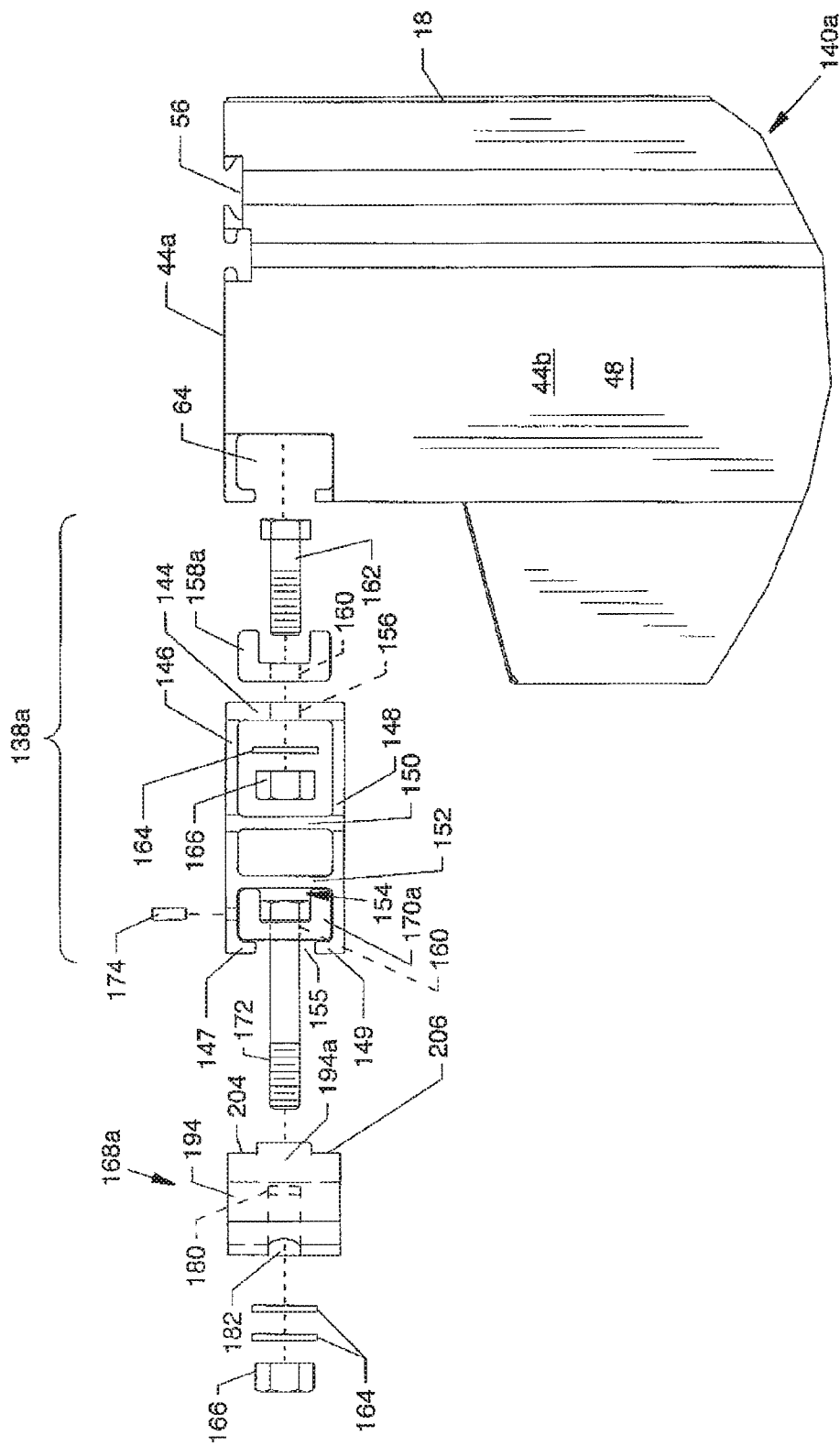
FIG. 31 is a partially exploded end view showing the general and mutual alignment of the components of the multipurpose bracket assembly with the backing bar slot of the slotted frame cabinet, as well as showing the alignment of the rocker clamp to the multipurpose bracket assembly.

FIG. 31 is a partially exploded end view showing the general and mutual alignment of the components of the multipurpose bracket assembly 138a with the backing bar slot 64 of the slotted frame cabinet 140a, as well as showing the alignment of the rocker clamp 168a to the multipurpose bracket assembly 138a. A more specific alignment of the components of the assembled multipurpose bracket assembly 138a and the engagement to the frame cabinet is shown in FIG. 36. Components of the multipurpose bracket assembly 138a can be installed as shown and described with reference to FIGS. 32-37.

Mode of Operation

Figure 32:
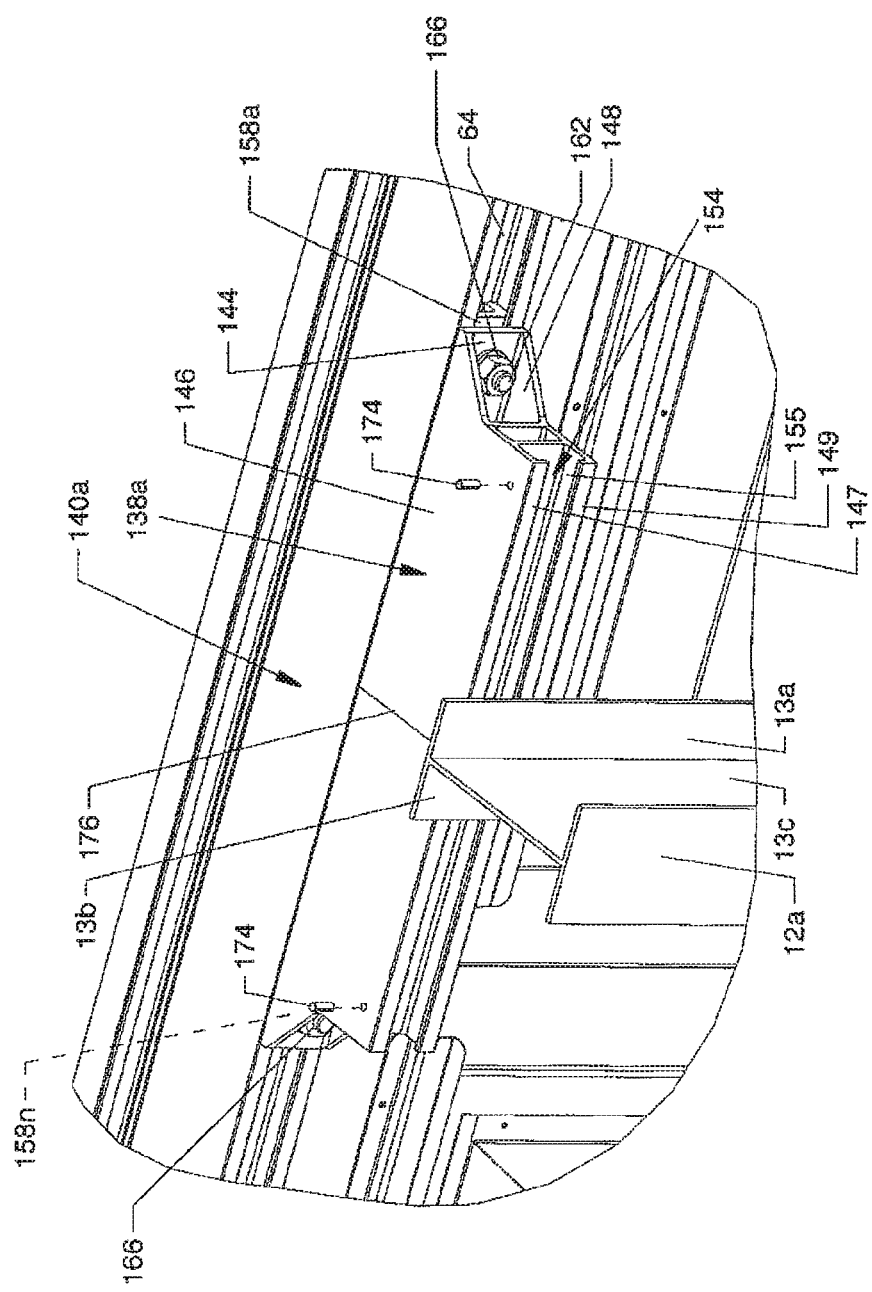
FIG. 32 is a view showing the mounting of the multipurpose bracket assembly secured to the backing bar slot of the slotted frame cabinet and in close unsecured alignment with the flange sections of the support structure.

FIG. 32 is a view showing the mounting of the multipurpose bracket assembly 138a secured to the backing bar slot 64 of the slotted frame cabinet 140a and in close unsecured alignment with the flange sections 13a and 13b of the support structure 12a such as, but not limited to, an I-beam. The support structure also includes a web 13c extending between the flange sections 13a and 13b. Initially, the support brackets 87 (not shown) can be secured to the lower region of the support structures 12a-12n and can be used along the bottom of the slotted frame cabinet 140a to support the weight of the slotted frame cabinet 140a. The end of the bolt 162 can first be inserted through the hole 160 of the backing bar 158a, and then the backing bar 158a can be inserted into the backing bar slot 64 of the slotted frame cabinet 140a, whereby the head of the bolt 162 is firmly engaged by the planar geometry of the backing bar 158a to prevent rotation of the bolt 162. Then the bolt 162 can pass through the hole 156 in the front panel 144 to engage a washer 164 and a nut 166. In the alternative, such components can be preassembled as a unit for engagement of the backing bar 158a with the backing bar slot 64. The like and opposed components such as, but not limited to, the backing bar 158n at other end can be used in the same manner. Subsequently and in either case, the multipurpose bracket assembly 138a can be positioned laterally and can reference the support structure 12a using the centerline reference 176 and the nuts 166 and the bolts 162 can be tightened to forcibly affix the backing bar 158a (and 158n) in the backing bar slot 64 and thus to the slotted frame cabinet 140a.

Figure 33:
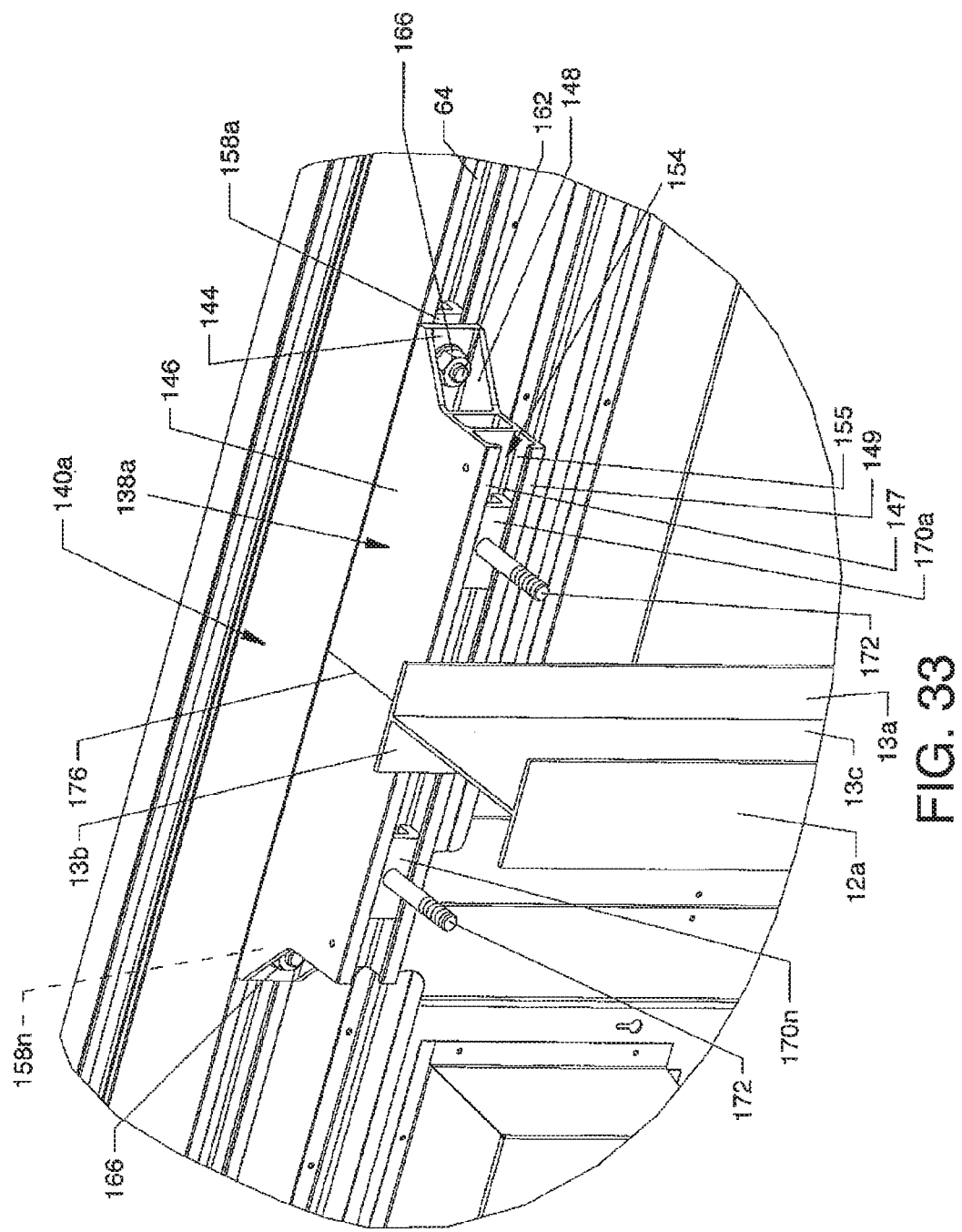
FIG. 33 is a view like FIG. 32 showing the addition of the backing bars and addition of the associated bolts.

FIG. 33 is a view like FIG. 32 showing the addition of the backing bars 170a-170n and of associated bolts 172. The bolts 172 are inserted through the holes 160 in the backing bars 170a-170n, whereby the heads of the bolts 162 are firmly engaged by the inner geometry of the backing bars 170a-170n to prevent rotation of the bolts 162. The backing bars 170a-170n are then inserted into the backing bar slot 154, whereby the shaft of the bolts 172 extend through the opening 155 of the backing bar slot 154. Preferably, the backing bars 170a-170n are positioned toward each other, whereby the shafts of the bolts 172 are brought into contact with the vertically oriented outwardly located edges of the flange sections 13a and 13b in order to enhance stability of the bolts 172 and closely associated components where such positioning is indicated in FIG. 35.

Figure 34:
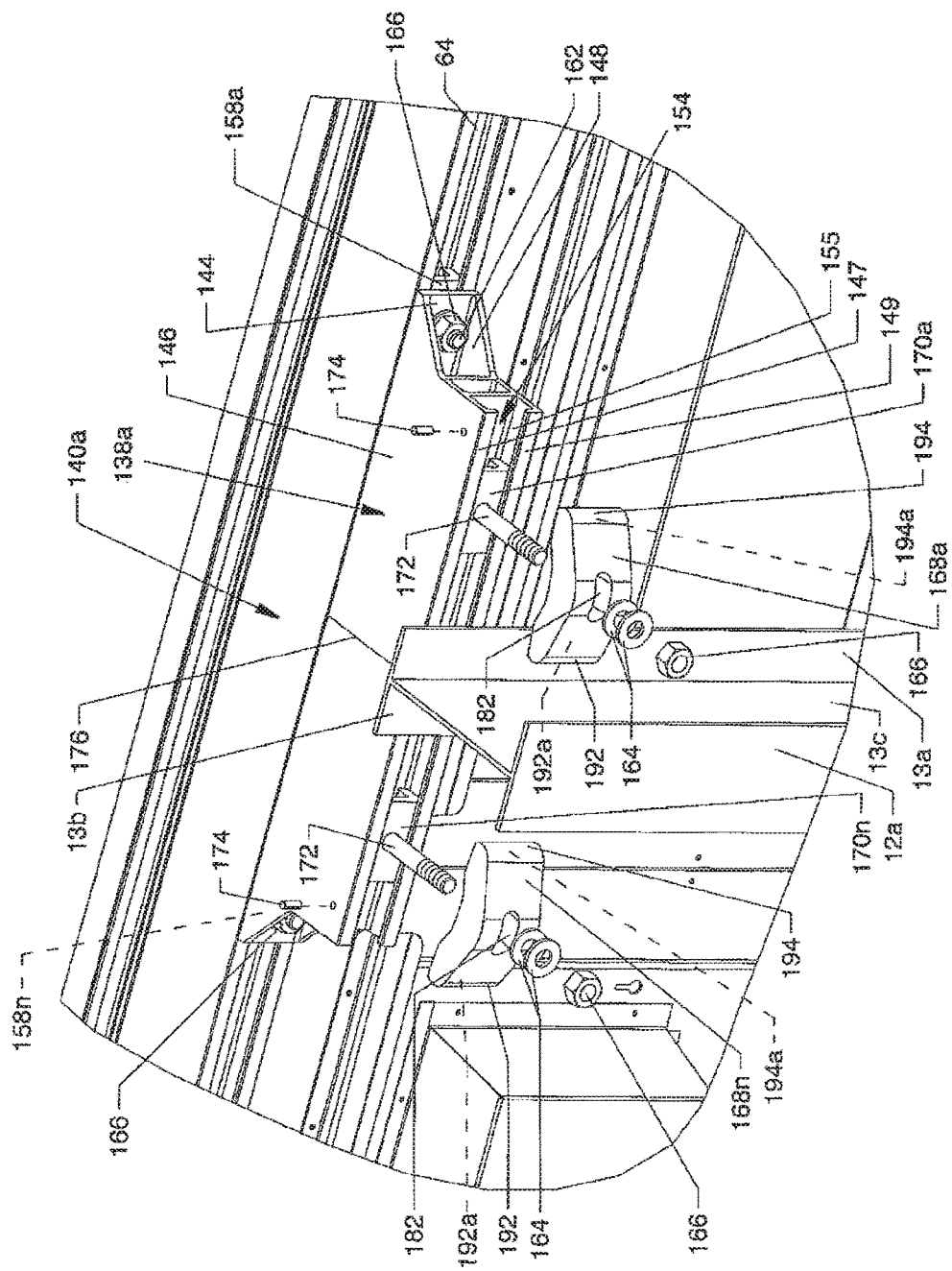
FIG. 34 is a view like FIG. 33 showing the alignment of nuts, washers and the rocker clamps and showing the bolts extending from the backing bars.

FIG. 34 is a view like FIG. 33 showing the alignment of nuts 166, washers 164, and the rocker clamps 168a-168n with the bolts 172 extending from the backing bars 170a-170n, respectively. For the purpose of illustration and clarity, such components are shown distanced from the flange sections 13a and 13b, but in use, such components are positioned toward one another in order to provide for contact of the inwardly located arcuate section 192a of the rocker clamp 168a with the flange section 13a and for contact of the inwardly located arcuate section 194a of the rocker clamp 168n with the flange section 13b as shown in FIG. 35.

Figure 35:
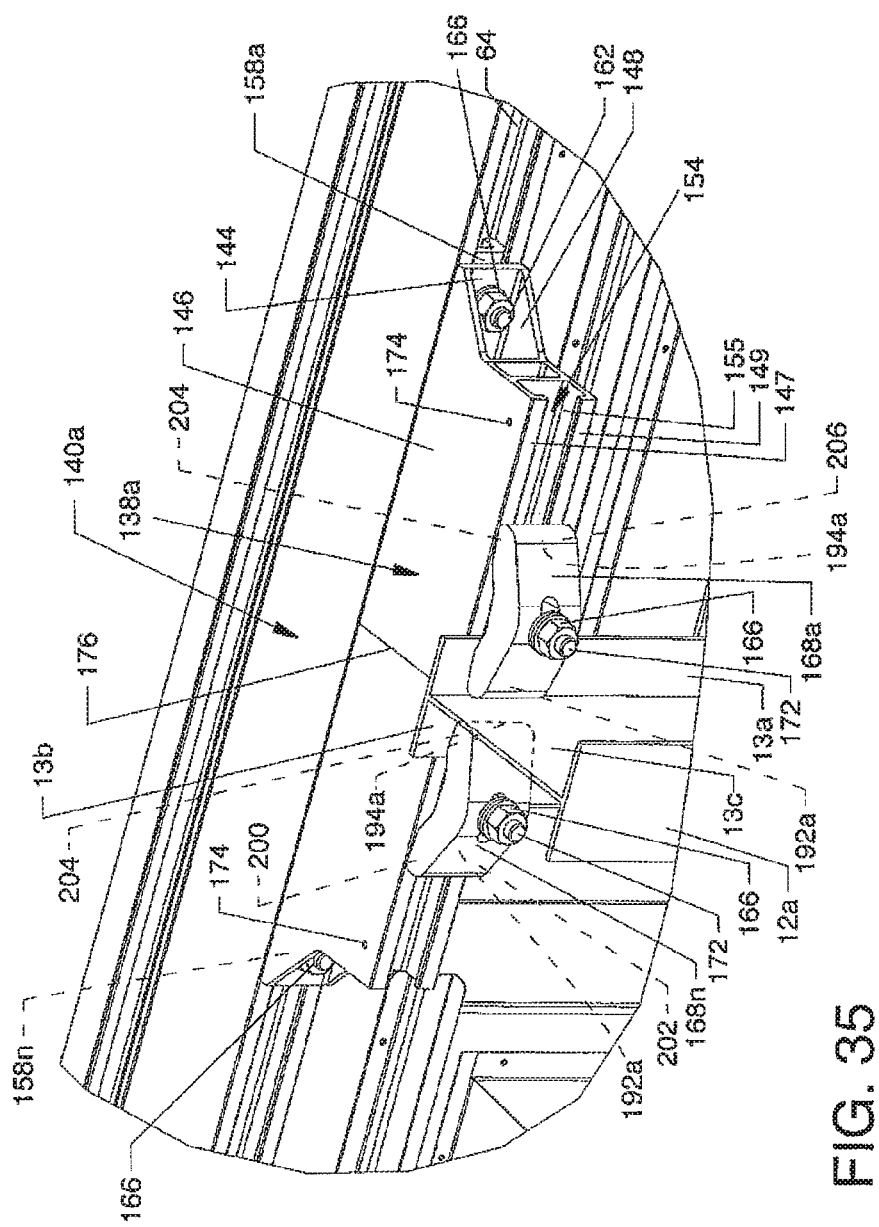
FIG. 35 is a view like FIG. 34 showing the forcible engagement of the rocker clamps with the multipurpose bracket assembly and with the flange sections of the support structure.
Figure 36:
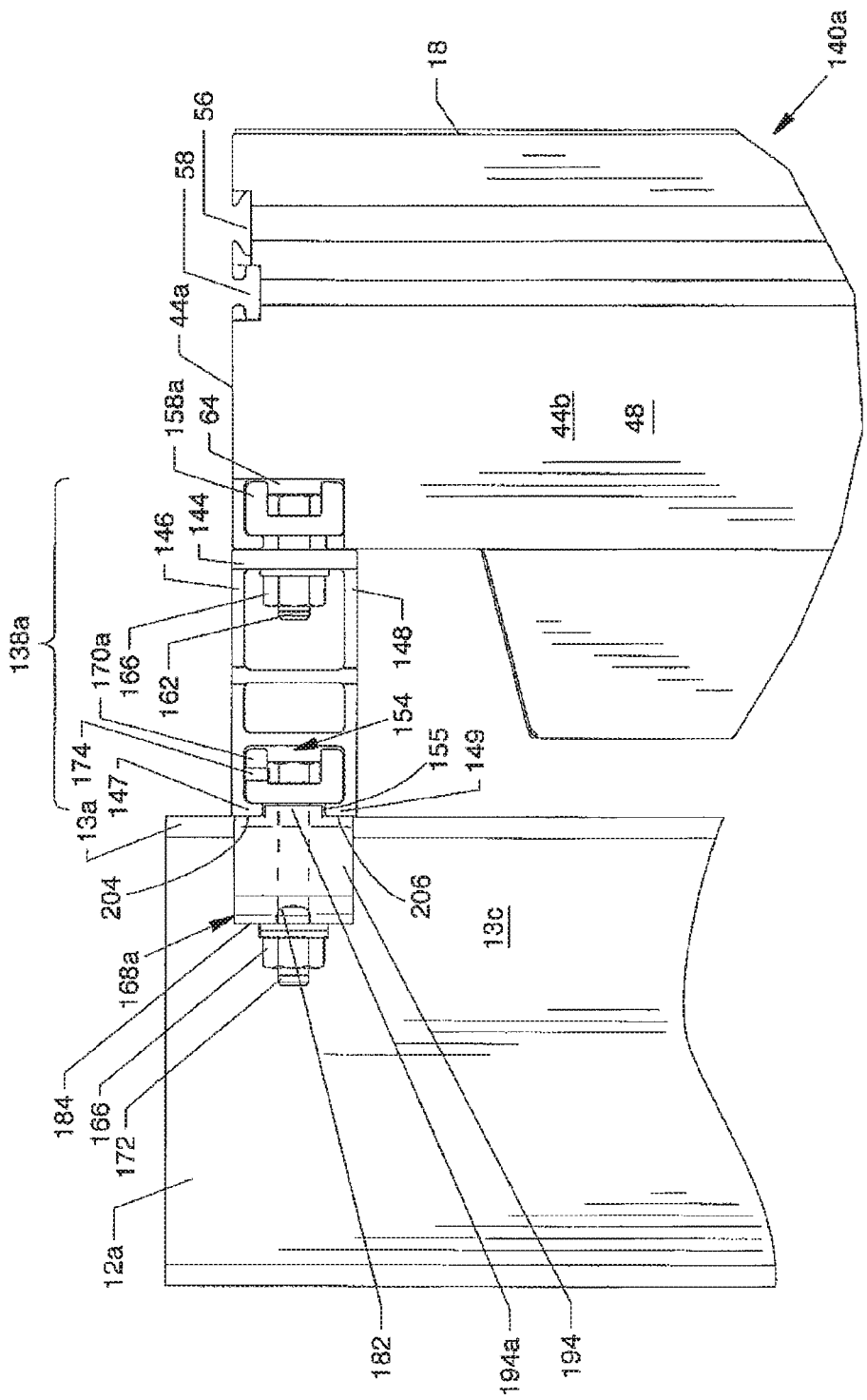
FIG. 36 is an end view showing the use of the multipurpose bracket assembly, including the use of a rocker clamp, to securely attach the slotted frame cabinet to the top region of the support structure.

FIG. 35 is a view like FIG. 34 showing the forcible engagement of the rocker clamps 168a and 168n with the multipurpose bracket assembly 138a and with the flange sections 13a and 13b of the support structure 12a. More specifically, the nuts 166 have been tightened to forcibly position the arcuate section 192a of the rocker clamp 168a against the flange section 13a and the arcuate section 194a of the rocker clamp 168n against the flange section 13b, respectively, of the support structure 12a. Tightening of the nuts 166 positions and ensures locating of the arcuate section 194a of the rocker clamp 168a and the arcuate section 192a of the rocker clamp 168n within the opening 155 and between the lip 147 and the lip 149 and also forcibly positions and ensures frictional engagement of the recesses 204 and 206 of the rocker clamp 168a and the recesses 200 and 202 of the rocker clamp 168n against the lip 147 and the lip 149, respectively, as partially illustrated. Pins 174 are shown fixedly extending through the top panel 146 to act as stops, thereby prohibiting inadvertent disengagement of the backing bars 170a-170n from the backing bar slot 154.

FIG. 36 is an end view showing the use of the multipurpose bracket assembly 138a to securely attach the slotted frame cabinet 140a to the top region of the support structure 12a. The use of the rocker clamp 168a is shown.

Figure 37:
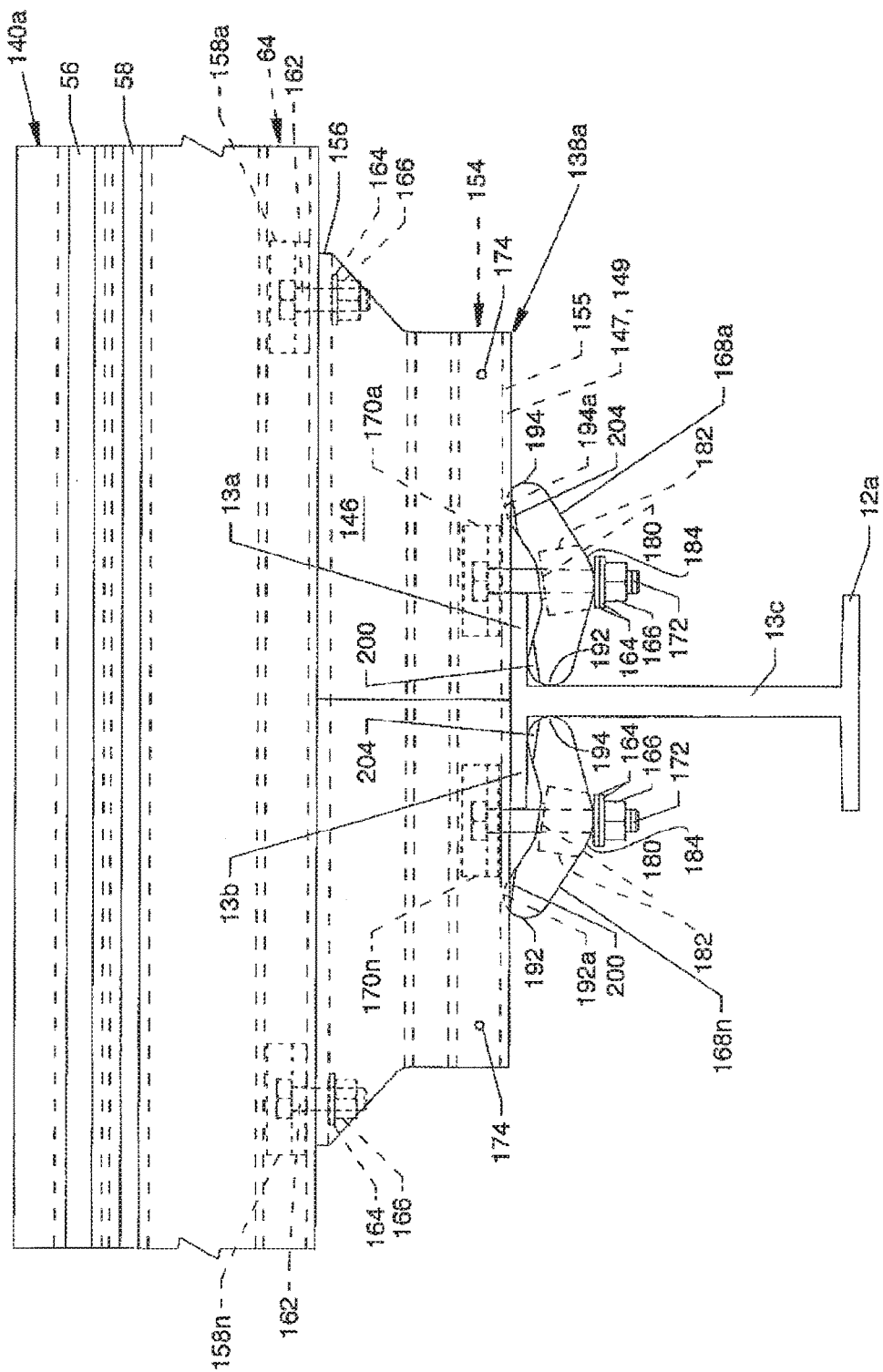
FIG. 37 is a top view showing the use of the multipurpose bracket assembly and the rocker clamp to securely attach the slotted frame cabinet to the top region of the support structure.

FIG. 37 is a top view showing the use of the multipurpose bracket assembly 138a and the rocker clamps 168a and 168n to securely attach the slotted frame cabinet 140a to the top region of the support structure 12a. Shown in particular is the intimate and angled engagement of the rocker clamps 168a and 168n to the support structure 12a and to the multipurpose bracket assembly 138a. More specifically, the rocker clamps 168a and 168n are self-aligning and are accommodated by various surfaces which do not necessarily align to the same plane and, as such, the rocker clamps 168a and 168n maintain an angled relationship with the bolts 172 and associated fasteners. Such an angled relationship is accommodated by and provided by the use of the elongated holes 182 central to the rocker clamps 168a and 168n and is also accommodated by and provided by the relationship of the washers 164 and nuts 166 where the washers 164 and nuts 166 bear unitarily and tangentially against the arcuate surface 184. Preferably, the arcuate end 192 of the rocker clamp 168a and the arcuate end 194 of the rocker clamp 168n align to the web 13c of the support structure 12a, thereby enhancing stability and alignment of the rocker clamps 168a and 168n with respect to the features of the support structure 12a and the bracket assembly 138a. The use of the rocker clamps 168a and 168n as an interface with the flange sections 13a and 13b of different widths and thickness of support structures 12a is highly desirable in that the rocker clamps 168a and 168n are angularly positionable about the shaft of the bolts 172 in association with the elongated holes 182 and that the backing bars 170a and 170n and the attached bolts 172 and attached rocker clamps 168a and 168n are horizontally positionable along the backing bar slot 154 in order to accommodate the thickness of the support structure web 13c and/or the combined width of the flange sections 13a and 13b.

Figure 38:
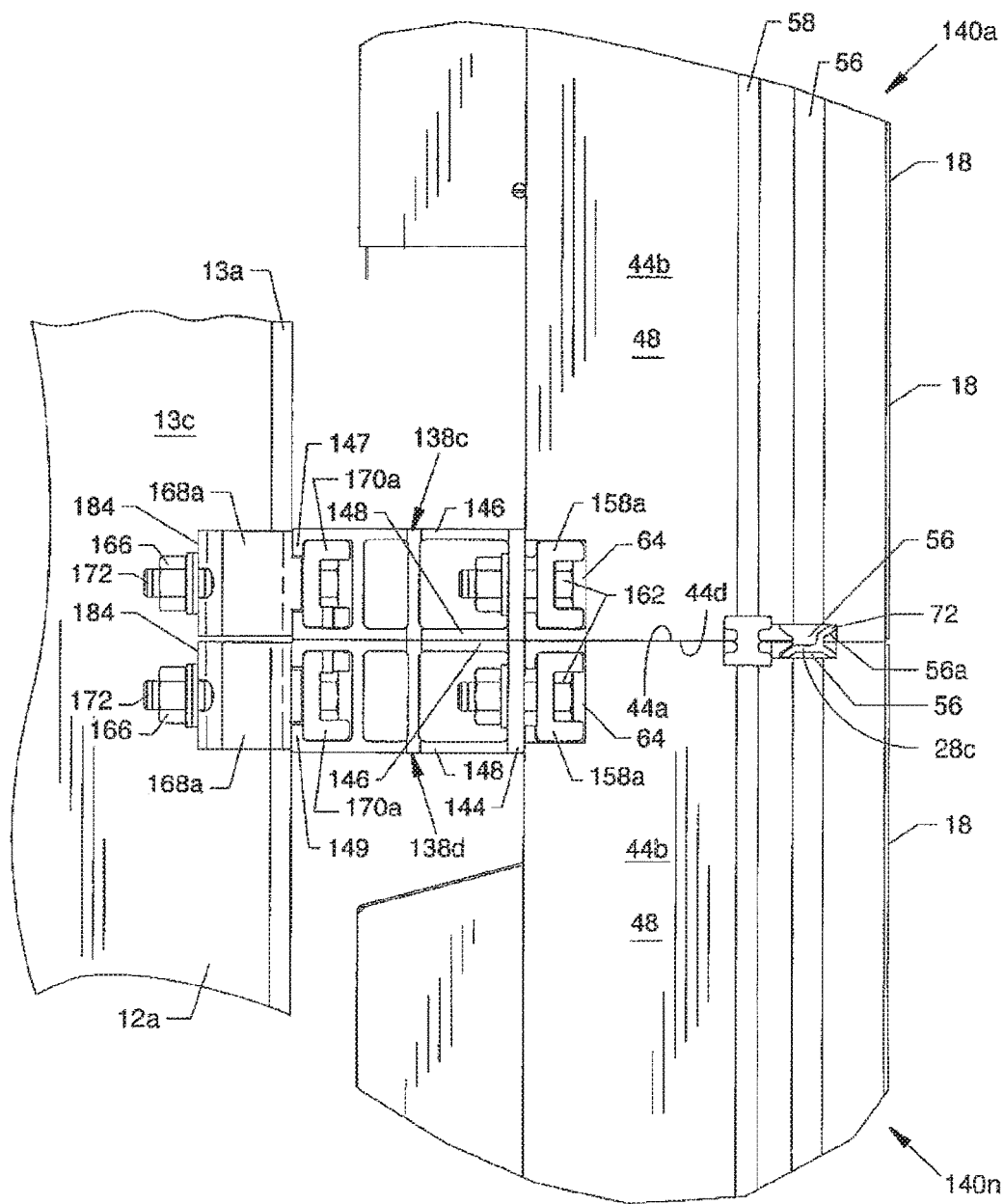
FIG. 38 is a side view showing the use of abutted multipurpose bracket assemblies in use with the rocker clamps to securely attach the lower region of a top slotted frame cabinet and the upper region of the bottom slotted frame cabinet to the midsection of the support structure.

FIG. 38 is a side view showing the use of abutted multipurpose bracket assemblies 138c and 138d in use with the rocker clamps 168a and 168n (168n not shown) to securely attach the lower region of the slotted frame cabinet 140a and the upper region of the slotted frame cabinet 140n to the midsection of the support structure 12a, such as shown in FIG. 25. A splice bar 28c is also used as previously described to attach the slotted frame bottom 44d of the slotted frame cabinet 140a and the slotted frame top 44a of the slotted frame cabinet 140n.

Figure 39:
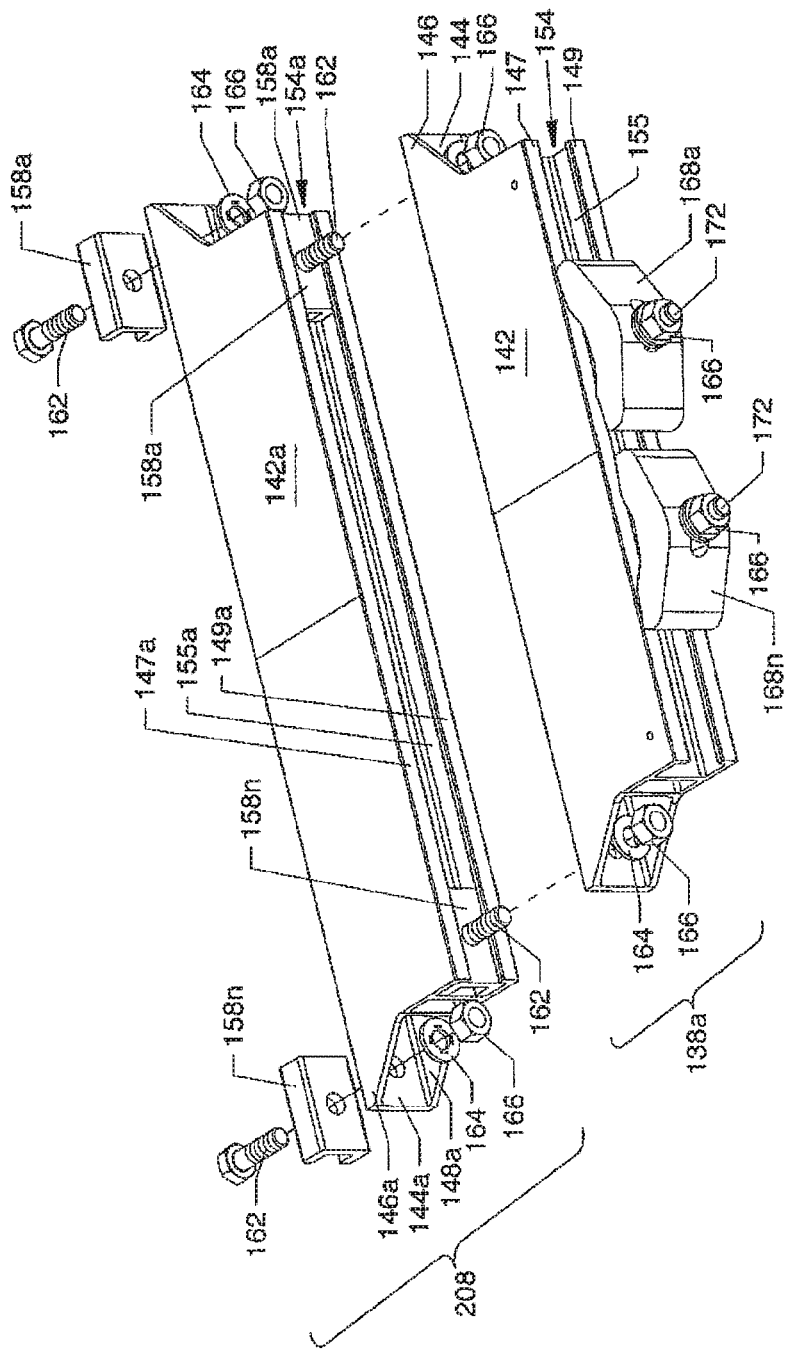
FIG. 39 is a partially exploded view of an elongated multipurpose bracket assembly, a plurality of which can be used in conjunction with the plurality of multipurpose bracket assemblies in order to provide for greater spacing between the support structures and the slotted frame cabinets.

FIG. 39 is a partially exploded view of an elongated multipurpose bracket assembly 208, a plurality of which can be used in conjunction with the plurality of multipurpose bracket assemblies 138a-138n in order to provide for greater spacing between the support structures 12a-12n and the slotted frame cabinets 140a-140n. The elongated multipurpose bracket assembly 208 is similar in many respects to the multipurpose bracket assemblies 138a-138n and uses similar or elongated components and features which may include reference numerals suffixed with the letter "a" corresponding to those components or features which may be differently sized or slightly modified, such as an elongated bracket 142a, for example. Some components and features of elongated multipurpose bracket assembly 208 can be sized accordingly to provide for suitable alignment and use between the multipurpose bracket assemblies 138a-138n and the slotted frame cabinets 140a-140n. For example, a front panel 144a, a top panel 146a, a bottom panel 148a, and closely associated features are elongated. Also, an elongated backing bar slot 154a corresponding in function to the backing bar slot 154 of the multipurpose bracket assemblies 138a-138n, and also corresponding to the size of the backing bar slot 64 of the slotted frame cabinets 140a-140n, is provided at the rear of the elongated multipurpose bracket assembly 208 for accommodation of additional sets of backing bars 158a-158n, the latter of which secure to the front panel 144 of the bracket 142 by bolts 162, washers 164 and nuts 166. Another set of backing bars 158a-158n aligns with the elongated front panel 144a of the elongated bracket 142a and secure thereto by the use of bolts 162, washers 164 and nuts 166. This set of backing bars 158a-158n aligns and secures within the backing bar slot(s) 64 of the slotted frame cabinets 140a-140n.

Figure 40:
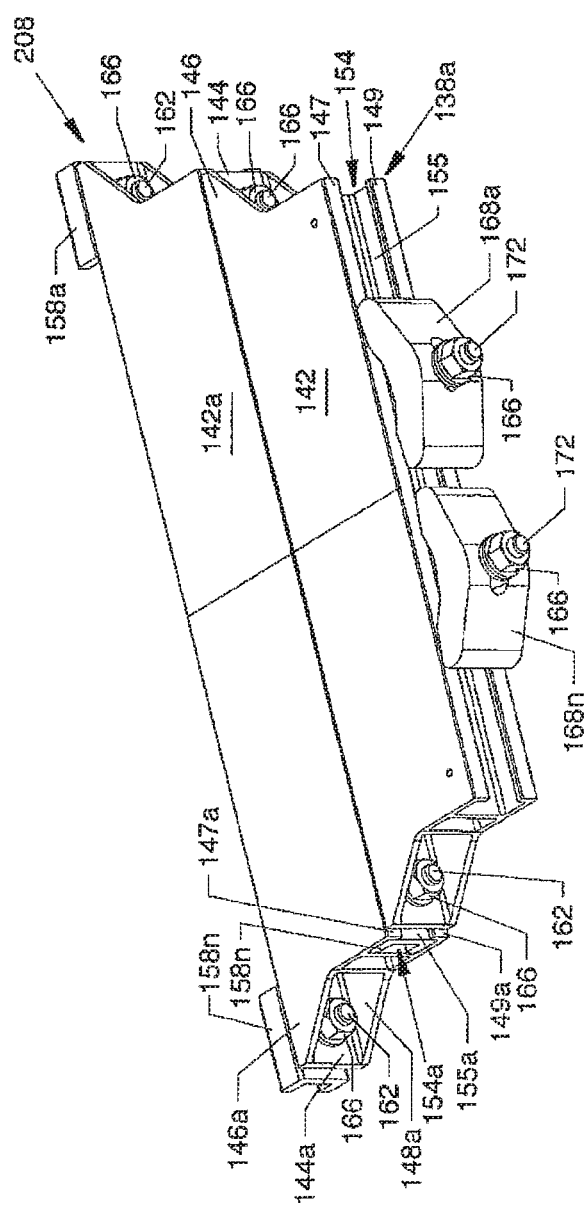
FIG. 40 is an assembled view of an elongated multipurpose bracket assembly attached to and used in conjunction with a multipurpose bracket assembly.

FIG. 40 is an assembled view of the elongated multipurpose bracket assembly 208 attached to and used in conjunction with the multipurpose bracket assembly 138a.

Figure 41:
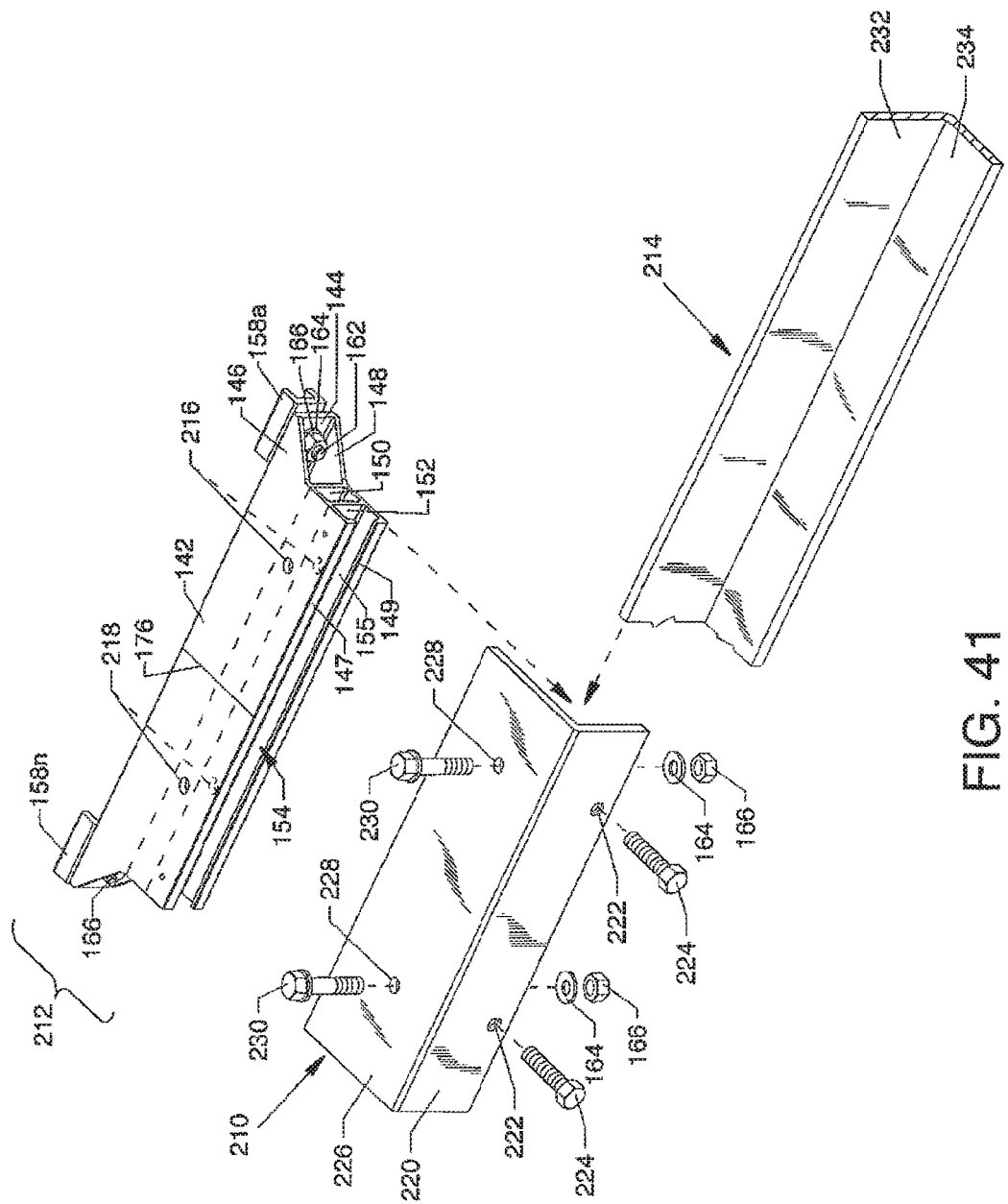
FIG. 41, an alternative embodiment, is an exploded view showing the alignment and use of a configured clamping device in the form of an extension fixture, which can be used to secure an electronic sign having slotted frame cabinets (not shown) and a multipurpose bracket assembly to a horizontally oriented support structure.
Figure 42:
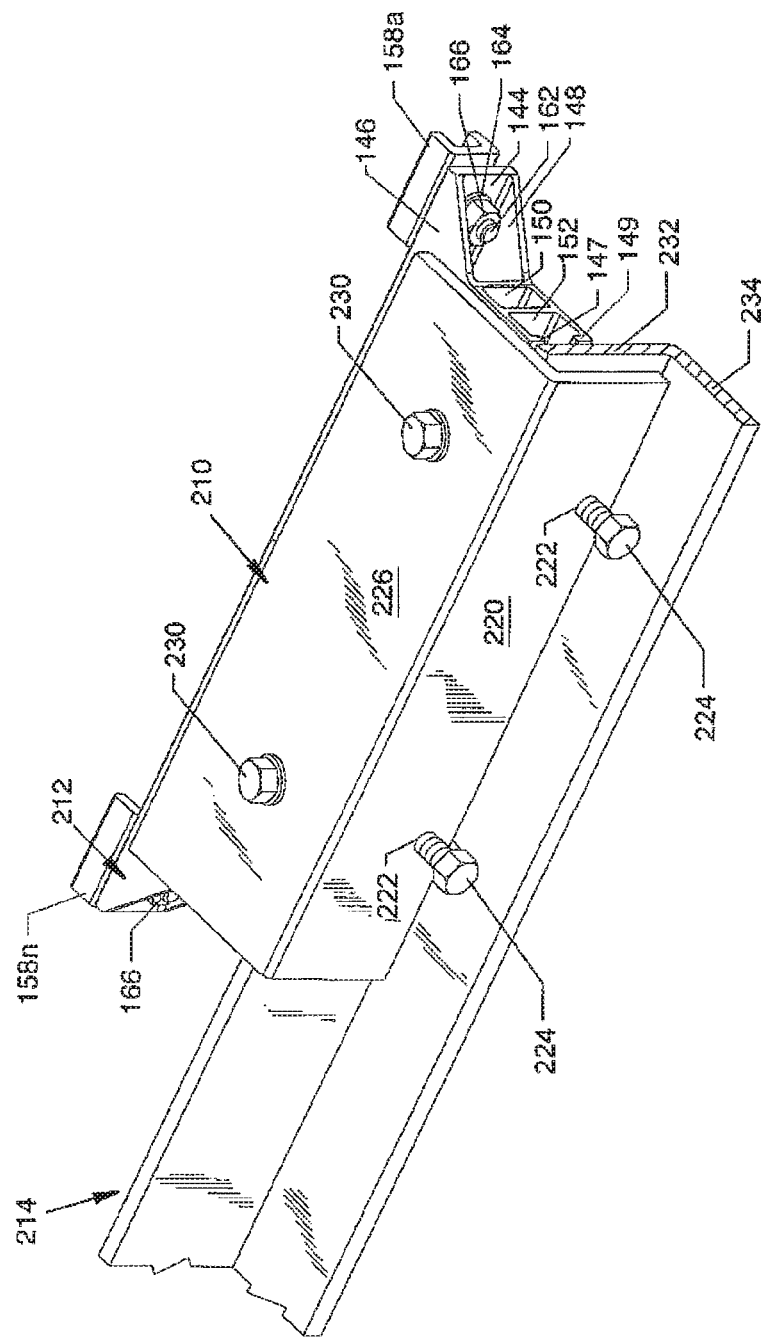
FIG. 42 is an assembled view showing the alignment and use of a configured clamping device in the form of an extension fixture, which can be used to secure an electronic sign having slotted frame cabinets (not shown) and a multipurpose bracket assembly to a horizontally oriented support structure.

FIG. 41 is an exploded view and FIG. 42 is an assembled view showing the alignment and use of a configured clamping device in the form of an extension fixture 210, an alternative embodiment, which is used to secure an electronic sign having slotted frame cabinets 10a (not shown) and a multipurpose bracket assembly 212 to a horizontally oriented support structure 214. The multipurpose bracket assembly 212 is similar in construction to the multipurpose bracket assemblies 138a-138n, but includes a hole set consisting of holes 216 extending through the top panel 146 and the bottom panel 148 and a hole set consisting of holes 218 extending through the top panel 146 and the bottom panel 148. The hole sets 216 and 218 extend through the top panel 146 and the bottom panel 148 in alignment between the inboard panel 150 and the outboard panel 152. The robust extension fixture 210 includes a panel 220 which is vertically oriented having threaded holes 222 extending therethrough for threaded accommodation of clamping bolts 224 and also includes a horizontally oriented panel 226 extending from the panel 220 including holes 228 extending therethrough for accommodation of the bolts 230. Washers 164 and nuts 166 are provided for use with the bolts 230. The foreshortened horizontally oriented support structure 214 includes a panel 232 which is vertically oriented and a panel 234 extending from the panel 232 which is horizontally oriented.

Figure 43:
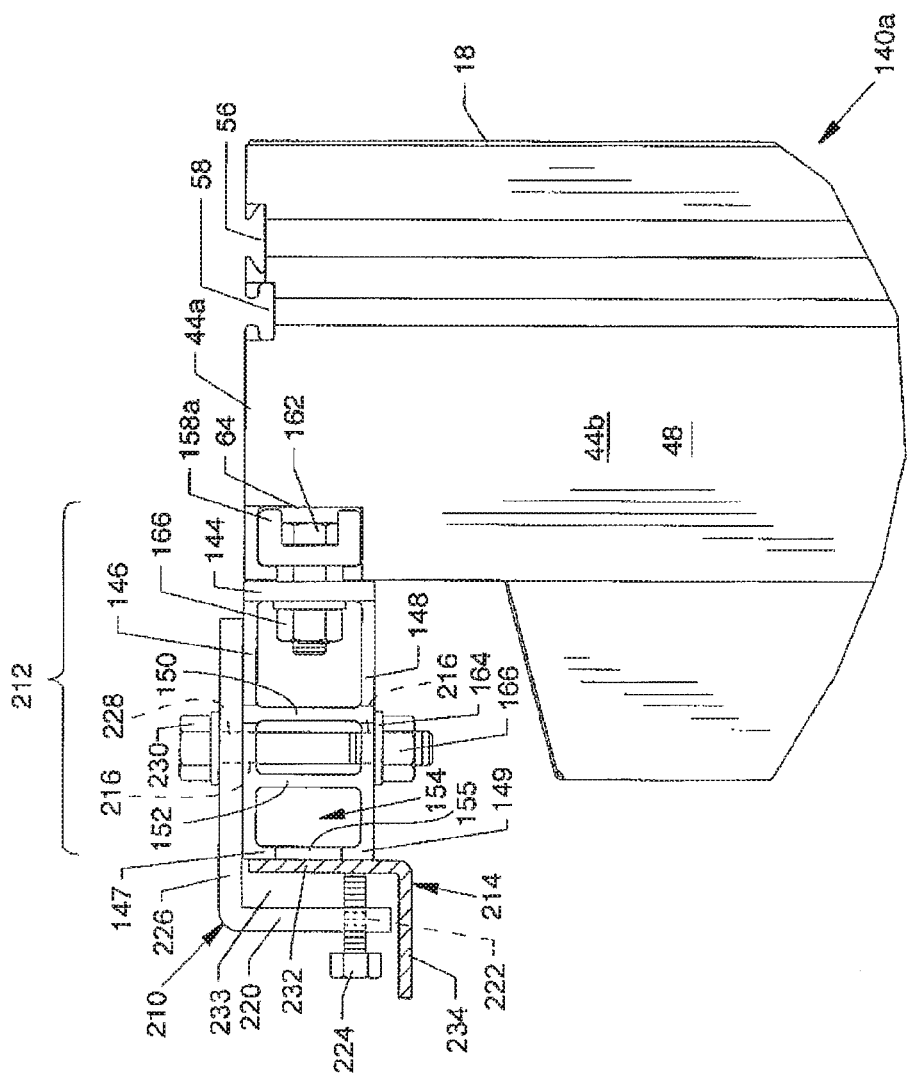
FIG. 43 is an end view showing the alignment and use of the extension fixture which is used to secure the slotted frame cabinet of an electronic sign having slotted frame cabinets (not shown) and the connected multipurpose bracket assembly to a horizontally oriented support structure.

FIG. 43 is an end view showing the alignment and use of the extension fixture 210 which is used to secure the slotted frame cabinet 140a of an electronic sign having slotted frame cabinets 10a (not shown) and the connected multipurpose bracket assembly 212 to a horizontally oriented support structure 214.

Mode of Operation

With reference to FIGS. 42 and 43, the use of the extension fixture 210 with the multipurpose bracket assembly 212 and the horizontally oriented support structure 214 is further described. Bolts 230 extend through the holes 228 in the panel 226 of the extension fixture 210 and through the hole sets 216 and 218 of the multipurpose bracket assembly 212 and are held captive therein by the use of washers 164 and nuts 166 in order to secure the extension fixture 210 to the multipurpose bracket assembly 212. The inboard panel 150 and the outboard panel 152, each extending between the top panel 146 and the bottom panel 148 of the bracket 142, provide support between the top panel 146 and the bottom panel 148 when the bolts 230 and nuts 166 are tightened. The securing of the multipurpose bracket assembly 212 and the attached extension fixture 210 and slotted frame cabinet 140a to the horizontal oriented support structure 214, in combination, is accomplished, whereby the multipurpose bracket assembly 212 and the attached extension fixture 210 and slotted frame cabinet 140a are maneuvered to facilitate use of the vertically oriented panel 232 of the horizontally oriented support structure 214. More specifically, the clamping bolts 224 are backed out of the threaded holes 222 in order to allow use of a space 233 between the panel 220 of the extension fixture 210 and the lips 147 and 149 of the multipurpose bracket assembly 212 in order to accommodate the panel 232 of the horizontally oriented support structure 214. Subsequently, the clamping bolts 224 are rotated and advanced to contact the panel 232 in order to urge and forcibly position the multipurpose bracket assembly 212, and thus the lips 147 and 149 of the multipurpose bracket assembly 212 against the panel 232 of the horizontally oriented support structure 214. Such action secures the combined structures consisting of the multipurpose bracket assembly 212, the attached extension fixture 210 and slotted frame cabinet 140a to be fixedly secured to the horizontally oriented support structure 214.

Figure 44:
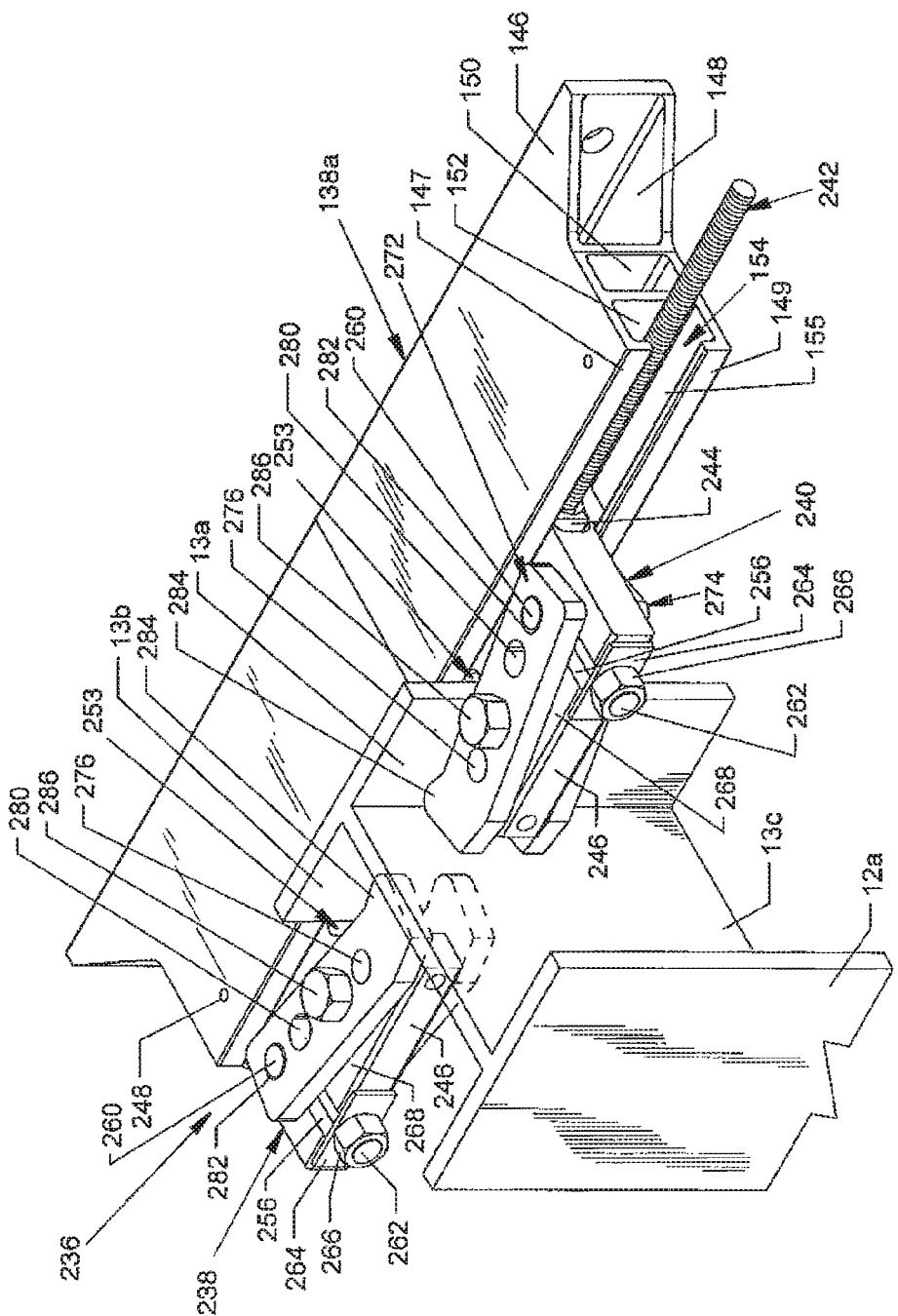
FIG. 44, an alternative embodiment, illustrates one of a plurality of multipurpose bracket assemblies in use with a configured clamping device in the form of a multiple point clamping mechanism.
Figure 45:
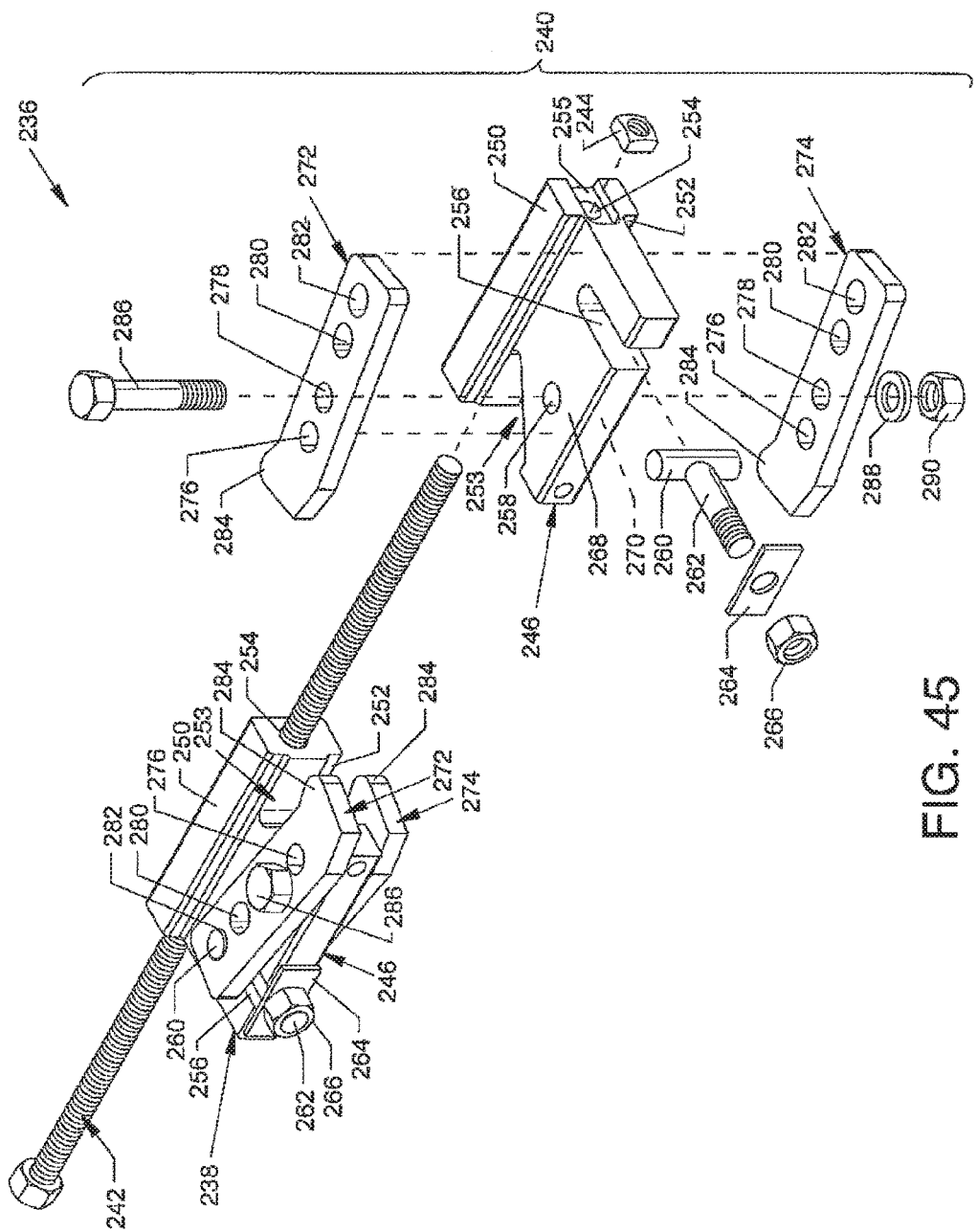
FIG. 45 is an exploded view of the multiple point clamping mechanism.

FIG. 44, an alternative embodiment, illustrates one of a plurality of multipurpose bracket assemblies 138a-138n in use with a configured clamping device in the form of a multiple point clamping mechanism 236, an alternative embodiment, consisting of substantially similar opposed multiple point clamps 238 and 240, an elongated bolt 242 and four-sided nut 244, collectively, used for attachment of a plurality of slotted frame cabinets 26a-26n or slotted frame cabinets 140a and 140n and an included multipurpose bracket assembly 138a to the plurality of support structures 12a-12n. FIG. 45 is an exploded view of the multiple point clamping mechanism 236. This alternative embodiment is further described with reference to FIGS. 44 and 45. The opposed multiple point clamps 238 and 240 are substantially mirror images of each other, but the multiple point clamp 240 includes a nut accommodation feature not found in the multiple point clamp 238, as later described in detail. The multiple point clamp 240 is now described where such description also applies to the opposed multiple point clamp 238. A central component of the multiple point clamp 240 includes a clamp body 246, portions of which are slideable and positionable within the backing bar slot 154 of the multipurpose bracket assembly 138a in order that the multiple point clamp 240 can be slideably positioned along and within the backing bar slot 154. The multiple point clamp 238 is also slideable and positionable within the backing bar slot 154, but preferably is fixed in position therein by the use of one or more pins, set screws or other suitable fasteners which extend through one or more holes in a hole set 248 extending through the top panel 146 and the bottom panel 148 of the multipurpose bracket assembly 138a to engage the multiple point clamp 238. The one-piece clamp body 246 includes opposed top and bottom slide bars 250 and 252 extending along one edge which slideably align and secure within the backing bar slot 154 of the multipurpose bracket assembly 138a. A V-shaped slot 253 is located along one side of the clamp body 246 for accommodation of the flange sections 13a and 13b of the support structures 12a-12n. A horizontally aligned bore 254 extends along the clamp body 246 paralleling the opposed top and bottom slide bars 250 and 252. A recess 255 located only in the multiple point clamp 240 is included intersecting the ends of the junction of the top and bottom slide bars 250 and 252 and the bore 254 for fixed and static engagement of the sides of the four-sided nut 244. The elongated bolt 242 extends through the bores 254 of the clamp bodies 246 to engage the four-sided nut 244 which is aligned within the recess 255 at one end of the clamp body 246 of the multiple point clamp 240, thereby providing structure which is used to forcibly urge the multiple point clamp 240 along the backing bar slot 154 and toward the opposed multiple point clamp 238. An open slot 256 extends, as illustrated, through the clamp body 246 and in perpendicular alignment with respect to the bore 254. A pivot hole 258 also extends through the clamp body 246. A vertically oriented pivot pin 260 is aligned perpendicular to and attached to one end of a horizontally oriented threaded adjustment rod 262. The threaded end of the adjustment rod 262 extends through a robust rectangular washer 264 in order to accommodate an adjustment nut 266. The rectangular washer 264 aligns across the open end of the open slot 256 in order to provide a bearing surface between the adjustment nut 266 and the corresponding edge of the clamp body 246. The pivot pin 260 suitably aligns within the open slot 256 of the clamp body 246. The vertical dimension of the pivot pin 260 exceeds the general thickness of the clamp body 246, whereby the top and bottom ends of the pivot pin 260 extend beyond the top and bottom surfaces 268 and 270 of the clamp body 246 in order to align within the accommodational features of a top lever clamp 272 and features of a bottom lever clamp 274, as partially shown in FIG. 44, where such accommodational features include end connector holes 282. The top and bottom lever clamps 272 and 274 each have the following features or components, including an end pivot hole 276, a mid-pivot hole 278, a mid-oblong connector hole 280, an end connector hole 282, and forwardly located contact nodes 284 extending and protruding outwardly from one edge of the top and bottom lever clamps 272 and 274. A pivot pin in the form of a pivot bolt 286 aligns with the mid-pivot hole 278 of the top lever clamp 272, with the pivot hole 258 of the clamp body 246, with the mid-pivot hole 278 of the bottom lever clamp 274, with a washer 288, and is secured therein by a nut 290. Advancement of the adjustment nut 266 along the threaded portion of the threaded adjustment rod 262 can tightening adjust the position of the threaded adjustment rod 262, and thus the position of the pivot pin 260 within the open slot 256, whereby the top and bottom lever clamps 272 and 274 are pivoted about the pivot bolts 286 in order to cause forcible contact of the nodes 284 with the flange sections 13a and 13b of the support structure 12a.

Mode of Operation

Figure 46:
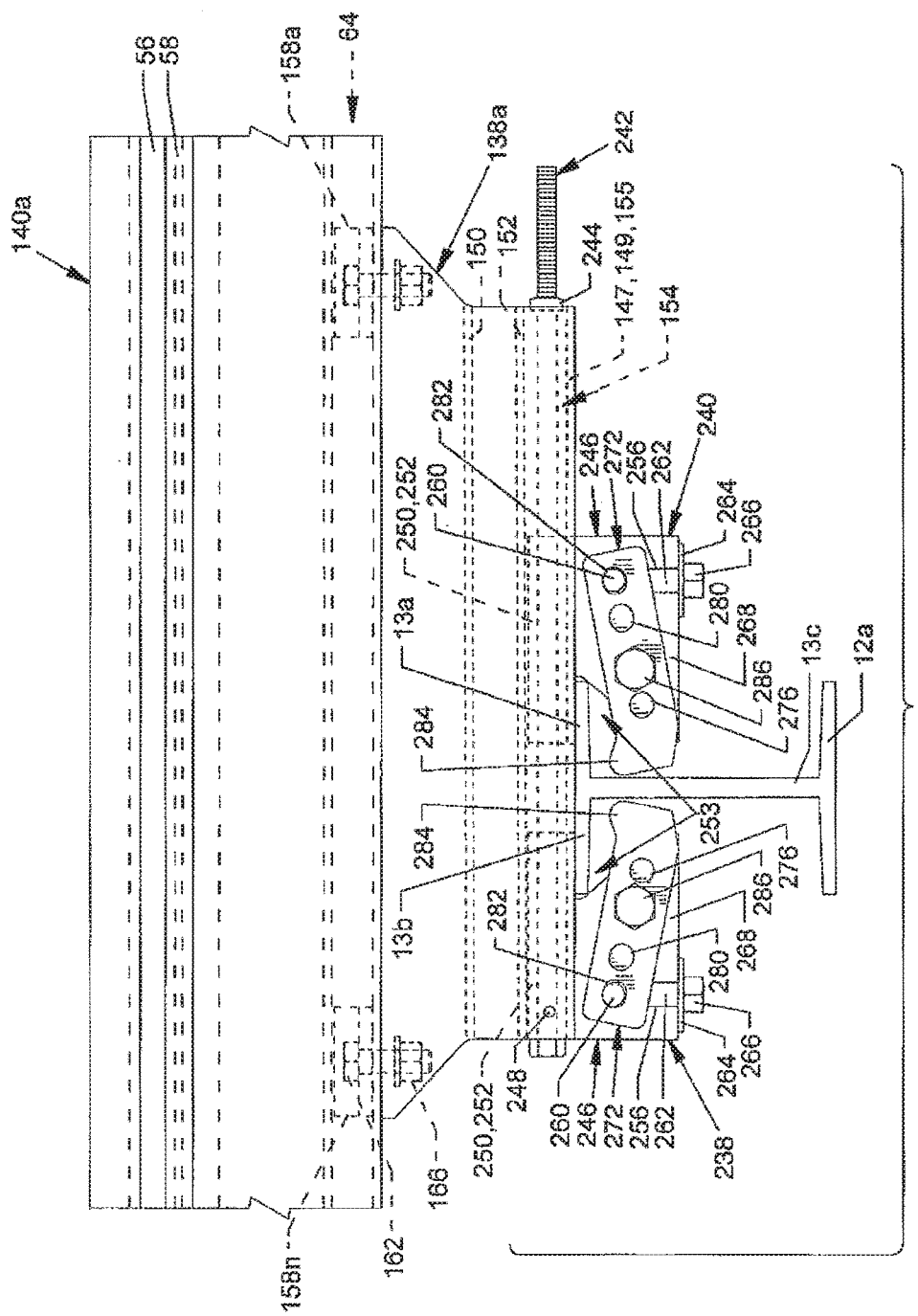
FIGS. 46 and 47 are top views illustrating the mode of operation of the multiple point clamping mechanism used for attachment of the slotted frame cabinet and an included multipurpose bracket assembly and multiple point clamping mechanism to a support structure of the plurality of support structures.
Figure 47:
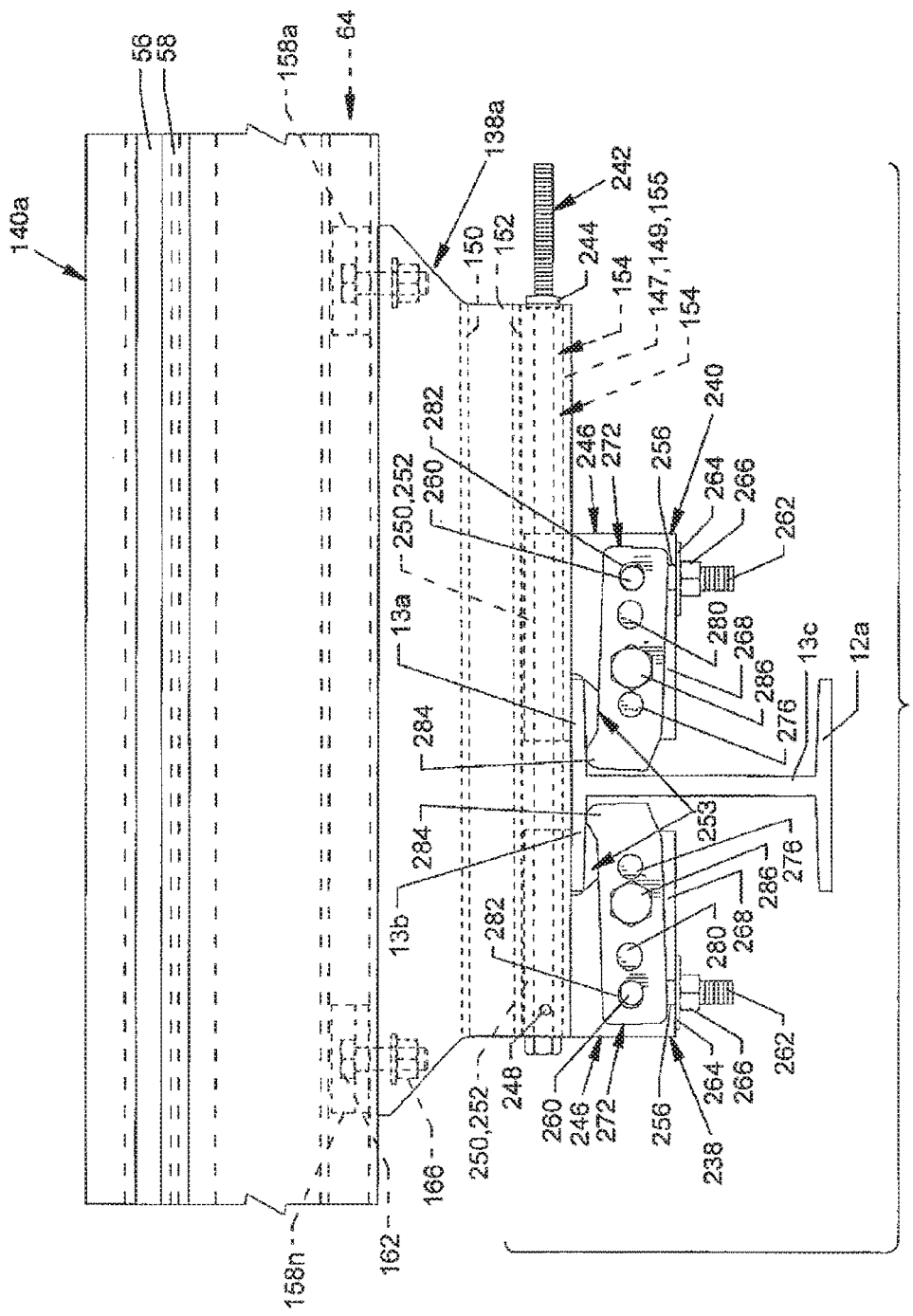

FIGS. 46 and 47 are top views illustrating the mode of operation of the multiple point clamping mechanism 236 used for attachment of the slotted frame cabinet 140a of the plurality of slotted frame cabinets 140a and 140n (or of one of the slotted frame cabinets 26a-26n of a plurality of slotted frame cabinets 26a-26n which are not shown) and an included multipurpose bracket assembly 138a and multiple point clamping mechanism 236 to a support structure 12a of the plurality of support structures 12a-120. The multiple point clamping mechanism 236 provides multiple combined methods of clamping to the support structure 12a.

Briefly, a first method as shown in FIG. 46 involves intimate and forced engagement of the V-shaped slots 253 of opposed multiple point clamps 238 and 240 with the vertically oriented outer edges of the flange sections 13b and 13a, and a second and additional method in combination with the first method as shown in FIG. 47 involves intimate and forced engagement of the contact nodes 284 of the opposed top and bottom lever clamps 272 and 274 located on the opposed multiple point clamps 238 and 240 with flange sections 13b and 13a of the support structure 12a.

The first attachment method is described with reference to FIG. 46. Prior to attachment of the combined multipurpose bracket assembly 138a, the slotted frame cabinet 140a and the multiple point clamping mechanism 236 to the support structure 12a, the elongated bolt 242 can be rotatingly actuated sufficiently in order to allow the multiple point clamp 240 to be freely and manually positioned along and to one end of the backing bar slot 154 in order to allow sufficient room for positioning of the lips 147 and 149 of the multipurpose bracket assembly 138a against the flange sections 13a and 13b of the support structure 12a. In FIG. 46, portions of the multiple point clamps 238 and 240 of the multiple point clamping mechanism 236 are shown in intimate and forced engagement with the vertically oriented outer edges of the flange sections 13b and 13a, respectively, of the support structure 12a. More specifically, such intimate and forced engagement can be accomplished where the multiple point clamp 238 is positioned along and then fixed in a static position within one end of the backing bar slot 154 of the multipurpose bracket assembly 138a, as previously described, and where the multiple point damp 240 is subsequently positioned along the backing bar slot 154 by action of the elongated bolt 242, whereby the four-sided nut 244 applies direct pressure to the clamp body 246 in order to force the multiple point clamp 240 toward the opposed multiple point clamp 238, thus forcibly capturing the vertically aligned outer edges of the flange sections 13b and 13a within the opposed V-shaped slots 253 of the multiple point clamps 238 and 240. Such action provides for multiple point contact of the V-shaped slots 253 of the multiple point clamps 238 and 240 with the vertically aligned outer edges of the flange sections 13b and 13a.

The second method in combination with the first method is demonstrated in FIG. 47 and involves the intimate and forced engagement of the contact nodes 284 of the opposed top lever clamps 272 (and bottom lever clamps 274) located on the opposed multiple point clamps 238 and 240 with flange sections 13b and 13a of the support structure 12a. More specifically, the top lever clamps 272 (and bottom lever clamps 274) are pivoted around the pivot bolts 286, as previously described, by the actuation of the adjustment nuts 266, whereby the pivot pins 260 traverse the open slots 256 and are drawn toward the adjustment nuts 266. The top and bottom ends of the pivot pins 260, which are in intimate contact with and in engagement with the end connector holes 282, transfer linear force of the adjustment rod 262 to the top lever clamps 272 (and bottom lever clamps 274) to cause rotational and forcible movement of the top lever clamps 272 (and bottom lever clamps 274) about the pivot bolts 286 in order to cause forcible contact of the nodes 284 with the flange sections 13b and 13a of the support structure 12a. Such action provides for multiple point contact of the nodes 284 with the flange sections 13b and 13a of the support structure 12a and provides for intimate and forcible contact of the flange sections 13b and 13a with the top and bottom lips 147 and 149 of the multipurpose bracket assembly 138a.

Although the use of pivot bolts 286 extending through the mid-pivot holes 278 of the top lever clamps 272 and the bottom lever clamps 274 and the use of the top and bottom ends of the pivot pins 260 in engagement with the opposed end connector holes 282 of the top lever clamps 272 and the bottom lever clamps 274 is shown and described, a greater mechanical advantage can be realized by the use of other hole combinations to provide a greater lever arm force applied to the geometry of mounting structures, such as the mounting structure 12a. More specifically, the use of pivot bolts 286 extending through the end pivot holes 276 of the top lever clamps 272 and the bottom lever clamps 274 and the use of the top and bottom ends of the pivot pins 260 with the mid-oblong connector holes 280 of the top lever clamps 272 and the bottom lever clamps 274 can be used to such end. The use of different relationships and hole usage can also provide for greater adaptability to variously dimensioned mounting structures, such as the mounting structure 12a. Although the multiple point clamps 238 and 240 may be shown and described as assemblies, it is appreciated that there may be situations where site installation of such may be accomplished whereby the components comprising the multiple point clamps 238 and 240 structures may not initially be a complete assembled structure, but instead may be assembled in stages adding one or more parts at a time in order to facilitate installation.

Although the use of the multiple point clamping mechanisms 236 is described in conjunction with one or more multipurpose bracket assemblies 138a-138n and one or more slotted frame cabinets 26a-26n or 140a-140n, it is appreciated that multiple point clamping mechanisms 236 may be used without multipurpose bracket assemblies 138a-138n for direct interfacing with the backing bar slots 64 of one or more slotted frame cabinets 26a-26n or 140a-140n provided that clearance around any rear cabinet geometrically configured projections is considered.

The above Detailed Description includes references to the accompanying drawings, which form a part of the Detailed Description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "including" and "comprising" are open-ended, that is, a system, assembly, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more features thereof) can be used in combination with each other. Other embodiments can be used, such as by one of ordinary skill in the art upon reviewing the above description. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

What is claimed is:

1. An assembly for at least partially supporting a display relative to a support structure, the assembly comprising:
   one or more cabinets defining a mounting channel, the mounting channel including one or more retaining lips defining a slot-like opening into the mounting channel, each of the one or more retaining lips including a continuous slidable surface facing an interior of the mounting channel;
   one or more mounting clamps positionable along the mounting channel at any desired location along a longitudinal length of the mounting channel, and directly or indirectly couplable to the mounting channel, each of the one or more mounting clamps having first and second engagement portions extending in opposing directions along a longitudinal length of the slot-like opening and selectively movable toward and away from the slot-like opening, the first and second engagement portions each including one or more outer portions each positionable adjacent to an exterior surface of a corresponding one of the one or more retaining lips, wherein the first engagement portion is configured to engage the one or more retaining lips and the second engagement portion is configured to engage the support structure; and
   one or more members configured to slide at least partially within the mounting channel along the continuous planar slidable surface of the one or more retaining lips in a first direction, and inhibit being pulled from the mounting channel in a second direction that is substantially perpendicular to the first direction.

2. The assembly of claim 1, wherein the first and second engagement portions of the one or more mounting clamps are portions of a rocker clamp.

3. The assembly of claim 2, wherein the rocker clamp includes a chevron-shaped body.

4. The assembly of claim 2, wherein the chevron-shaped body includes, at a first end, the first engagement portion configured to extend at least partially across the slot-like opening and, at a second end, the second engagement portion configured to selectively contact the support structure.

5. The assembly of claim 1, wherein each of the one or more members include one or more fastener heads or internally threaded connection members.

6. The assembly of claim 1, wherein each of the one or more members include a shaft at least partially extending out of the slot-like opening and through a lumen of a corresponding one of the one or more mounting clamps.

7. The assembly of claim 1, wherein the mounting track is manufactured using an extruding process.

8. The assembly of claim 1, wherein the second engagement portion includes an arcuate outer surface configured to selectively contact the support structure.

9. An assembly for at least partially supporting an electronic display relative to a support structure, the assembly comprising:
   one or more cabinets including one or more retaining lips defining a slot-like opening and partially defining a mounting channel; and
   a mounting clamp assembly, including:
   a connection member; and
   a mounting clamp body having first and second engagement portions extending in opposing directions along a longitudinal length of the slot-like opening and a lumen positioned between the first and second engagement portions and sized to allow passage of at least a portion of the connection member at least partially therethrough, the first and second engagement portions each including one or more outer portions positionable adjacent to an exterior surface of each of the one or more retaining lips;
   wherein the connection member is movable between a first position and a second position relative to the mounting clamp body,
   wherein the first engagement portion of the mounting clamp body is tilted toward the slotlike opening such that the one or more outer portions of the first engagement portion are clampingly engaged with the one or more retaining lips when the connection member is in the first position; and
   wherein the first engagement portion of the mounting clamp body is tilted away away from the slot-like opening such that the first engagement portion is clampingly disengaged with the one or more retaining lips when the connection member is in the second position.

10. The assembly of claim 9, wherein the mounting clamp assembly, further comprises a slidable member configured to be received into the mounting channel.

11. The assembly of claim 10, wherein the slidable member includes a shaft that at least partially extends out of the slot-like opening and is coupled to the mounting clamp assembly.

12. The assembly of claim 9, wherein the mounting clamp body is configured to pivot about the portion of the connection member at the lumen when the connection member moves between the first and second position.

13. The assembly of claim 9, wherein the mounting clamp body has a chevron shape.

14. The assembly of claim 9, wherein the second engagement portion includes an arcuate outer surface configured to selectively contact the support structure.

15. The assembly of claim 9, wherein the connection member includes a connection shaft and a connection body threadingly engaged with the connection shaft, wherein the lumen is sized to allow passage of the connection shaft, and wherein the first position of the connection member comprises the connection body being rotated in a first direction relative to the connection shaft and the second position of the connection member comprises the connection body being rotated in a second direction relative to the connection shaft.

16. A system for at least partially supporting an electronic display relative to a support structure, the system comprising:

one or more cabinets including one or more retaining lips defining a slot-like opening and partially defining a mounting channel; and one or more mounting clamp assemblies each including:

a member configured to slide at least partially within the mounting channel along a first direction, wherein the one or more retaining lips inhibit the member from being pulled from the mounting channel in a second direction that is substantially perpendicular to the first direction, the member including a shaft sized and structured to extend through the slot-like opening; and a mounting clamp positionable along the mounting track at any desired location along a longitudinal length of the mounting channel, and directly or indirectly couplable to the mounting channel, the mounting clamp having first and second engagement portions extending in opposing directions along a longitudinal length of the slot-like opening, the mounting clamp further including a lumen positioned between the first and second engagement portions and sized to allow passage of the shaft of the member at least partially therethrough;

wherein the first engagement portion is configured to engage at least a portion of the one or more retaining lips and the second engagement portion is configured to engage the support structure.

17. The system of claim 16, wherein the mounting amp includes a chevron-shaped body.

18. The system of claim 16, wherein the first engagement portion of the mounting clamp is configured to extend at least partially across the slot-like opening.

19. The system of claim 16, wherein the member includes a fastener head or an internally threaded connection member.

20. The system of claim 16, wherein the second engagement portion includes an arcuate outer surface configured to selectively contact the support structure.

* * * * *